(12) United States Patent
Kubota et al.

(10) Patent No.: US 11,510,122 B2
(45) Date of Patent: Nov. 22, 2022

(54) TECHNIQUES FOR PROVIDING UPLINK-BASED MOBILITY

(71) Applicant: QUALCOMM Incorporated, San Diego, CA (US)

(72) Inventors: Keiichi Kubota, Tokyo (JP); Gavin Bernard Horn, La Jolla, CA (US); Tingfang Ji, San Diego, CA (US); Joseph Binamira Soriaga, San Diego, CA (US); Kambiz Azarian Yazdi, San Diego, CA (US); Saurabha Rangrao Tavildar, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 53 days.

(21) Appl. No.: 17/327,272

(22) Filed: May 21, 2021

(65) Prior Publication Data

US 2021/0274409 A1   Sep. 2, 2021

Related U.S. Application Data

(62) Division of application No. 15/192,513, filed on Jun. 24, 2016, now Pat. No. 11,026,142.
(Continued)

(51) Int. Cl.
*H04W 36/00* (2009.01)
*H04W 36/08* (2009.01)
(Continued)

(52) U.S. Cl.
CPC ............ *H04W 36/08* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS 6,519,248 B1   2/2003 Valko
8,891,489 B2   11/2014 Attar et al.
(Continued)

FOREIGN PATENT DOCUMENTS

CN   102651910 A   8/2012
CN   105228238 A   1/2016
(Continued)

OTHER PUBLICATIONS

3GPP TS 36.331: "3rd Generation Partnership Project; Technical Specification Group Radio Access Network; Evolved Universal Terrestrial Radio Access (E-UTRA); Radio Resource Control (RRC); Protocol Specification (Release 10)", V10.4.0 (Dec. 2011), XP050555028, Dec. 20, 2011, 296 Pages.
(Continued)

*Primary Examiner* — Jenkey Van
(74) *Attorney, Agent, or Firm* — Qualcomm IP Dept.; James Hunt Yancey, Jr.

(57) ABSTRACT

Techniques are described for wireless communication. A method for wireless communication at a user equipment (UE) includes identifying, while the UE is in a connected mode with a network, a radio resource configuration of the UE, selecting a dedicated set of resources for the UE or a common set of resources for a plurality of UEs based at least in part on the identified radio resource configuration, and transmitting a pilot signal to the network using the selected set of resources. Methods for wireless communication at a network access device and a network access device controller are also described.

30 Claims, 26 Drawing Sheets

Related U.S. Application Data

(60) Provisional application No. 62/280,920, filed on Jan. 20, 2016.

(51) Int. Cl.
*H04L 5/00* (2006.01)
*H04L 43/10* (2022.01)
*H04W 72/04* (2009.01)
*H04W 36/30* (2009.01)
*H04W 76/28* (2018.01)
*H04W 36/16* (2009.01)
*H04W 36/34* (2009.01)

(52) U.S. Cl.
CPC ............ *H04L 5/0051* (2013.01); *H04L 43/10* (2013.01); *H04W 36/165* (2013.01); *H04W 36/30* (2013.01); *H04W 72/0453* (2013.01); *H04W 76/28* (2018.02); *H04W 36/34* (2013.01)

(56) References Cited

U.S. PATENT DOCUMENTS

| | | | |
|---|---|---|---|
| 10,172,177 | B2 | 1/2019 | Gheorghiu et al. |
| 2009/0028112 | A1 | 1/2009 | Attar et al. |
| 2010/0067479 | A1 | 3/2010 | Choi et al. |
| 2010/0118752 | A1 | 5/2010 | Suzuki et al. |
| 2011/0098054 | A1 | 4/2011 | Gorokhov et al. |
| 2011/0110398 | A1 | 5/2011 | Zhang et al. |
| 2011/0249558 | A1 | 10/2011 | Raaf et al. |
| 2011/0292895 | A1 | 12/2011 | Wager et al. |
| 2012/0113938 | A1 | 5/2012 | Larsson et al. |
| 2012/0252513 | A1 | 10/2012 | Kiyoshima et al. |
| 2012/0320847 | A1 | 12/2012 | Nam et al. |
| 2013/0188612 | A1 | 7/2013 | Dinan |
| 2014/0153536 | A1 | 6/2014 | Ouchi et al. |
| 2014/0256328 | A1* | 9/2014 | Li ................... H04W 36/0058 455/444 |
| 2014/0321416 | A1 | 10/2014 | Pragada et al. |
| 2014/0376482 | A1 | 12/2014 | Kim et al. |
| 2015/0063253 | A1 | 3/2015 | Barbieri et al. |
| 2015/0296522 | A1 | 10/2015 | Bergstrom et al. |
| 2017/0208516 | A1 | 7/2017 | Kubota et al. |
| 2018/0323917 | A1 | 11/2018 | Um et al. |
| 2018/0332618 | A1 | 11/2018 | Kakishima et al. |
| 2020/0314933 | A1* | 10/2020 | Tang ................... H04W 72/042 |

FOREIGN PATENT DOCUMENTS

| | | |
|---|---|---|
| JP | 2011250386 A | 12/2011 |
| WO | WO2010124241 | 10/2010 |
| WO | WO2010124241 A3 | 10/2010 |
| WO | WO2013164024 A1 | 11/2013 |
| WO | WO2014172270 A2 | 10/2014 |

OTHER PUBLICATIONS

European Search Report—EP20196978—Search Authority—Munich—dated Oct. 6, 2020.
International Preliminary Report on Patentability—PCT/US2017/013963, The International Bureau of WIPO—Geneva, Switzerland, dated May 22, 2018.
International Search Report and Written Opinion—PCT/US2017/013963—ISA/EPO—dated Jun. 12, 2017.
International Search Report and Written Opinion—PCT/US2017/013963—ISA/EPO—dated Sep. 13, 2017.
ISA/EPO, Partial International Search Report of the International Searching Authority, International App. No. PCT/US2017/013963, dated Apr. 21, 2017, European Patent Office, Rijswijk, NL, 18 Pages.
Nam Y-H., et al., "Evolution of Reference Signals for LTE-Advanced Systems", IEEE Communications Magazine, IEEE Service Center, Piscataway, NJ, Feb. 9, 2012, pp. 132-138, vol. 50, No. 2, XP011417049, Feb. 1, 2012, ISSN: 0163-6804, DOI: 10.1109/MCOM.2012.6146492.
NTT DOCOMO, et al., "RRC_Connected DRX and Dedicated UL Resources", 3GPP TSG RAN WG2 #60bis, 3GPP Draft, R2-080462, Sevilla, Spain, Jan. 14-18, 2008, 2 Pages, Jan. 8, 2008, XP050138308.
Qualcomm Europe, "RAN Level "Keep-Alive" Signaling", 3GPP TSG-RAN WG2 Meeting #61-bis, R2-081551 (re-submission of R2-081096), Shenzhen, China, Mar. 31-Apr. 4, 2008, 3 Pages, Mar. 25, 2008, XP050139287.
Qualcomm Incorporated et al., "NR RRC States Definition", 3GPP TSG-RAN WG2 Meeting #94, R2-164095, Nanjing, China May 23-27, 2016, pp. 1-4.
Qualcomm Incorporated et al., "RRC States for NR", 3GPP TSG-RAN WG2 Meeting #93bis, R2-162742, Dubrovnik, Croatial Apr. 11-15, 2016, pp. 1-4.
Qualcomm Incorporated: "Reduction of RRC Signaling," 3GPP TSG-SA1#56, S1-113305, Dublin, EI, Aug. 8-12, 2011, 1 page.
Taiwan Search Report—TW106101507—TIPO—dated Jan 15, 2021.
Zhang J., et al., "Mobility Enhancement and Performance Evaluation for 5G Ultra Dense Networks", IEEE Wireless Communications and Networking Conference (WCNC), Track 3: Mobile and Wireless Networks, Mar. 9, 2015, XP032786398, DOI: 10.1109/WCNC.2015.7127740 [retrieved on Jun. 17, 2015], pp. 1793-1798.

* cited by examiner

TECHNIQUES FOR PROVIDING UPLINK-BASED MOBILITY

CROSS REFERENCES

The present Application for Patent is a Divisional of U.S. patent application Ser. No. 15/192,513 by Kubota, et al., entitled "Techniques For Providing Uplink-Based Mobility" filed Jun. 24, 2016, which claims priority to U.S. Provisional Patent Application No. 62/280,920 by Kubota et al., entitled "Techniques for Providing User Equipment-Centric Mobility," filed Jan. 20, 2016, assigned to the assignee hereof.

BACKGROUND

Field of the Disclosure

The present disclosure, for example, relates to wireless communication systems, and more particularly to techniques for providing uplink-based mobility.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission and reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, etc.). A base station or DU may communicate with a set of UEs on downlink channels (e.g., for transmissions from a base station or to a UE) and uplink channels (e.g., for transmissions from a UE to a base station or distributed unit).

Some next generation or 5G networks may support an uplink-based medium access control (MAC) layer. In these networks, a UE may transmit a pilot signal (e.g., a reference signal) for network access devices (e.g., distributed units) to receive and measure. Based on measurements of the pilot signal by one or more network access devices, the network may identify a serving cell (or serving distributed unit) for the UE. As the UE moves within the network, the network may make at least some mobility decisions for the UE (e.g., decisions to initiate a handover of the UE from one serving cell to another serving cell) transparently to the UE (e.g., without notifying the UE of the mobility decision, or without involving the UE in the mobility decision).

SUMMARY

The present disclosure, for example, relates to techniques for providing uplink-based mobility, which in some examples may be referred to as user equipment (UE) centric mobility. In accordance with the described techniques, a network may provide a common set of resources (e.g., one or more component carriers or channels of a radio frequency spectrum band, one or more sub-carriers of a radio frequency spectrum band, one or more resource blocks of a subframe, one or more durations of time, periodic time increments between resource availability, etc.) that any UE may use to transmit a pilot signal to the network. The network may also allocate a dedicated set of resources to each of one or more UEs. Upon initially accessing the network, a UE may transmit a pilot signal to the network using the common set of resources. After accessing the network, the UE may continue to transmit a pilot signal to the network using the common set of resources (e.g., if the UE is relatively inactive, traffic between the UE and the network is relatively low, etc.); or, when a dedicated set of resources has been allocated to the UE, the UE may transmit a pilot signal to the network using the dedicated set of resources instead of the common set of resources. In some cases, a dedicated set of resources may be allocated to an active UE (e.g., a UE having a higher level of traffic to transmit/receive to/from the network), and the UE may be configured to use the dedicated set of resources when the dedicated set of resources is available. In other cases, the UE may determine when or whether to use the dedicated set of resources. In some examples, procedures for handling UE mobility may vary, depending on whether a UE is operating in a radio resource configuration associated with transmitting pilots using a dedicated set of resources to transmit a pilot signal or operating in a radio resource configuration associated with transmitting pilots using a common set of resources to transmit a pilot signal.

A method for wireless communication at a UE is described. The method may include: identifying, while the UE is in a connected mode with a network, a radio resource configuration of the UE; selecting a dedicated set of resources for the UE or a common set of resources for a plurality of UEs based at least in part on the identified radio resource configuration; and transmitting a pilot signal to the network using the selected set of resources.

An apparatus for wireless communication at a UE is described. The apparatus may include a processor and memory in electronic communication with the processor. The processor and the memory may be configured to: identify, while the UE is in a connected mode with a network, a radio resource configuration of the UE; select a dedicated set of resources for the UE or a common set of resources for a plurality of UEs based at least in part on the identified radio resource configuration; and transmit a pilot signal to the network using the selected set of resources.

An apparatus for wireless communication at a UE is described. The apparatus may include: means for identifying, while the UE is in a connected mode with a network, a radio resource configuration of the UE; means for selecting a dedicated set of resources for the UE or a common set of resources for a plurality of UEs based at least in part on the identified radio resource configuration; and means for transmitting a pilot signal to the network using the selected set of resources.

A non-transitory computer-readable medium storing computer-executable code for wireless communication at a UE is described. The code may be executable by a processor to: identify, while the UE is in a connected mode with a network, a radio resource configuration of the UE; select a dedicated set of resources for the UE or a common set of resources for a plurality of UEs based at least in part on the identified radio resource configuration; and transmit a pilot signal to the network using the selected set of resources.

In some examples of the method, apparatuses, or non-transitory computer-readable medium, the identified radio resource configuration of the UE may include a radio resource control (RRC) configuration.

In some examples of the method, apparatuses, or non-transitory computer-readable medium, the identified radio resource configuration of the UE comprises an RRC dedicated state or an RRC common state.

Some examples of the method, apparatuses, or non-transitory computer-readable medium may include operations, features, means, or instructions for: identifying a serving cell for the UE based at least in part on a keep alive signal received from the serving cell for the UE, the keep alive signal based at least in part on the pilot signal.

Some examples of the method, apparatuses, or non-transitory computer-readable medium may include operations, features, means, or instructions for: receiving the keep alive signal using the selected set of resources.

Some examples of the method, apparatuses, or non-transitory computer-readable medium may include operations, features, means, or instructions for: receiving an allocation of the common set of resources in at least one of: a synchronization signal, or system information, or a unicast message, or a combination thereof.

Some examples of the method, apparatuses, or non-transitory computer-readable medium may include operations, features, means, or instructions for: identifying an allocation of the common set of resources based at least in part on a type of the UE.

Some examples of the method, apparatuses, or non-transitory computer-readable medium may include operations, features, means, or instructions for: receiving an allocation of the dedicated set of resources in at least one of: a unicast message, or a timing of the unicast message, or a combination thereof.

In some examples of the method, apparatuses, or non-transitory computer-readable medium, the pilot signal may be transmitted periodically based at least in part on a discontinuous reception (DRX) configuration of the UE or a discontinuous transmission (DTX) configuration of the UE.

Some examples of the method, apparatuses, or non-transitory computer-readable medium may include operations, features, means, or instructions for: identifying a zone in which the UE is located; and configuring the pilot signal based at least in part on the identified zone.

In some examples of the method, apparatuses, or non-transitory computer-readable medium, the dedicated set of resources may be associated with a more granular periodicity than the common set of resources.

A method for wireless communication at a network access device is described. The method may include: identifying at least one dedicated set of resources for at least one UE in a first set of UEs, wherein the network access device is a member of a monitoring set of network access devices for each UE in the first set of UEs; measuring a first set of pilot signals received from the first set of UEs on the at least one dedicated set of resources, and a second set of pilot signals received from a second set of UEs using a common set of resources; and identifying, based at least in part on measurements of the first set of pilot signals and the second set of pilot signals, a third set of UEs for which the network access device operates as a serving cell.

An apparatus for wireless communication at a network access device is described. The method may include a processor and memory in electronic communication with the processor. The processor and the memory may be configured to: identify at least one dedicated set of resources for at least one UE in a first set of UEs, wherein the network access device is a member of a monitoring set of network access devices for each UE in the first set of UEs; measure a first set of pilot signals received from the first set of UEs on the at least one dedicated set of resources, and a second set of pilot signals received from a second set of UEs using a common set of resources; and identify, based at least in part on measurements of the first set of pilot signals and the second set of pilot signals, a third set of UEs for which the network access device operates as a serving cell.

Another apparatus for wireless communication at a network access device is described. The apparatus may include: means for identifying at least one dedicated set of resources for at least one UE in a first set of UEs, wherein the network access device is a member of a monitoring set of network access devices for each UE in the first set of UEs; means for measuring a first set of pilot signals received from the first set of UEs on the at least one dedicated set of resources, and a second set of pilot signals received from a second set of UEs using a common set of resources; and means for identifying, based at least in part on measurements of the first set of pilot signals and the second set of pilot signals, a third set of UEs for which the network access device operates as a serving cell.

A non-transitory computer-readable medium storing computer-executable code for wireless communication at a network access device is described. The code may be executable by a processor to: identify at least one dedicated set of resources for at least one UE in a first set of UEs, wherein the network access device is a member of a monitoring set of network access devices for each UE in the first set of UEs; measure a first set of pilot signals received from the first set of UEs on the at least one dedicated set of resources, and a second set of pilot signals received from a second set of UEs using a common set of resources; and identify, based at least in part on measurements of the first set of pilot signals and the second set of pilot signals, a third set of UEs for which the network access device operates as a serving cell.

In some examples of the method, apparatuses, or non-transitory computer-readable medium, the third set of UEs may include at least one UE in the first set of UEs, or at least one UE in the second set of UEs, or a combination thereof.

Some examples of the method, apparatuses, or non-transitory computer-readable medium may include operations, features, means, or instructions for: transmitting a dedicated keep alive signal to each UE that is a member of both the first set of UEs and the third set of UEs, or transmitting a common keep alive signal to each UE that is a member of both the second set of UEs and the third set of UEs, or a combination thereof.

Some examples of the method, apparatuses, or non-transitory computer-readable medium may include operations, features, means, or instructions for: determining whether a pilot signal received from a UE on the common set of resources satisfies at least one threshold; and transmitting a keep alive signal to the UE, using the common set of resources, upon determining the pilot signal satisfies the at least one threshold.

Some examples of the method, apparatuses, or non-transitory computer-readable medium may include operations, features, means, or instructions for: receiving, from another network access device, a reconfiguration message for a UE that is a member of both the first set of UEs and the third set of UEs, the reconfiguration message identifying a reconfigured dedicated set of resources to be used, by the UE, after a handover of the UE from the network access device to a different network access device; and forwarding the reconfiguration message to the UE.

Some examples of the method, apparatuses, or non-transitory computer-readable medium may include operations, features, means, or instructions for: receiving, from another network access device, a reconfiguration message for a UE that is being handed over to the network access device, the reconfiguration message identifying a reconfigured dedicated set of resources to be used, by the UE, after a handover of the UE to the network access device; forwarding the reconfiguration message to the UE; and adding the UE to the first set of UEs and the third set of UEs.

Some examples of the method, apparatuses, or non-transitory computer-readable medium may include operations, features, means, or instructions for: receiving a reconfiguration complete message from a UE which has been handed over to the network access device; and forwarding the reconfiguration complete message to another network access device.

Some examples of the method, apparatuses, or non-transitory computer-readable medium may include operations, features, means, or instructions for: transmitting at least one of the measurements of the first set of pilot signals or at least one of the measurements of the second set of pilot signals to another network access device; and receiving, from the other network access device, updates to the third set of UEs.

Some examples of the method, apparatuses, or non-transitory computer-readable medium may include operations, features, means, or instructions for: selecting the at least one of the measurements of the first set of pilot signals or the at least one of the measurements of the second set of pilot signals based at least in part on a periodic measurement reporting criteria or an event-driven measurement reporting criteria.

Some examples of the method, apparatuses, or non-transitory computer-readable medium may include operations, features, means, or instructions for: receiving additional measurements of the first set of pilot signals or the second set of pilot signals from at least one other network access device, wherein the identifying the third set of UEs is based at least in part on the additional measurements.

Some examples of the method, apparatuses, or non-transitory computer-readable medium may include operations, features, means, or instructions for: receiving, from another network access device, an update to the first set of UEs.

In some examples of the method, apparatuses, or non-transitory computer-readable medium, the network access device includes a distributed unit.

A method for wireless communication is described. The method may include: receiving, from each cell of a plurality of cells, measurements of a first set of pilot signals transmitted by a first set of UEs operating with a first radio resource configuration while connected to a network, and of a second set of pilot signals transmitted by a second set of UEs operating with a second radio resource configuration while connected to the network; identifying, for each UE in the first set of UEs and each UE in the second set of UEs, based at least in part on the measurements, a serving cell for the respective UE; identifying, for each UE in the first set of UEs, a monitoring set of cells to monitor for pilot signals transmitted by the respective UE; and indicating, to each cell, a first set of UEs for which the respective cell is a serving cell, and a second set of UEs for which the respective cell is a member of a monitoring set of cells.

An apparatus for wireless communication is described. The apparatus may include a processor and memory in electronic communication with the processor. The processor and the memory may be configured to: receive, from each cell of a plurality of cells, measurements of a first set of pilot signals transmitted by a first set of UEs operating with a first radio resource configuration while connected to a network, and of a second set of pilot signals transmitted by a second set of UEs operating with a second radio resource configuration while connected to the network; identify, for each UE in the first set of UEs and each UE in the second set of UEs, based at least in part on the measurements, a serving cell for the respective UE; identify, for each UE in the first set of UEs, a monitoring set of cells to monitor for pilot signals transmitted by the respective UE; and indicate, to each cell, a first set of UEs for which the respective cell is a serving cell, and a second set of UEs for which the respective cell is a member of a monitoring set of cells.

Another apparatus for wireless communication is described. The apparatus may include: means for receiving, from each cell of a plurality of cells, measurements of a first set of pilot signals transmitted by a first set of UEs operating with a first radio resource configuration while connected to a network, and of a second set of pilot signals transmitted by a second set of UEs operating with a second radio resource configuration while connected to the network; means for identifying, for each UE in the first set of UEs and each UE in the second set of UEs, based at least in part on the measurements, a serving cell for the respective UE; means for identifying, for each UE in the first set of UEs, a monitoring set of cells to monitor for pilot signals transmitted by the respective UE; and means for indicating, to each cell, a first set of UEs for which the respective cell is a serving cell, and a second set of UEs for which the respective cell is a member of a monitoring set of cells.

A non-transitory computer-readable medium storing computer-executable code for wireless communication is described. The code may be executable by a processor to: receive, from each cell of a plurality of cells, measurements of a first set of pilot signals transmitted by a first set of UEs operating with a first radio resource configuration while connected to a network, and of a second set of pilot signals transmitted by a second set of UEs operating with a second radio resource configuration while connected to the network; identify, for each UE in the first set of UEs and each UE in the second set of UEs, based at least in part on the measurements, a serving cell for the respective UE; identify, for each UE in the first set of UEs, a monitoring set of cells to monitor for pilot signals transmitted by the respective UE; and indicate, to each cell, a first set of UEs for which the respective cell is a serving cell, and a second set of UEs for which the respective cell is a member of a monitoring set of cells.

In some examples of the method, apparatuses, or non-transitory computer-readable medium, the first radio resource configuration may be associated with transmitting pilot signals using a dedicated set of resources, and the second radio resource configuration may be associated with transmitting pilot signals using a common set of resources.

In some examples of the method, apparatuses, or non-transitory computer-readable medium, the first radio resource configuration, or the second radio resource configuration, or both comprises a RRC configuration.

Some examples of the method, apparatuses, or non-transitory computer-readable medium may include operations, features, means, or instructions for: identifying a change in a serving cell for a UE in the first set of UEs; and initiating a serving cell change procedure for the UE upon identifying the change in the serving cell.

In some examples of the method, apparatuses, or non-transitory computer-readable medium, initiating the serving cell change procedure may include operations, features, means, or instructions for: transmitting to the UE, through a source serving cell for the UE, a reconfiguration message for the UE, the reconfiguration message identifying a dedicated set of resources to be used, by the UE, after a handover of the UE to a target serving cell.

In some examples of the method, apparatuses, or non-transitory computer-readable medium, initiating the serving cell change procedure may include operations, features, means, or instructions for: transmitting to the UE, through a target serving cell for the UE, a reconfiguration message for the UE, the reconfiguration message identifying a dedicated set of resources to be used, by the UE, after a handover of the UE to the target serving cell.

In some examples of the method, apparatuses, or non-transitory computer-readable medium, identifying a monitoring set of cells to monitor for pilot signals transmitted by a UE may be based at least in part on: measurements of at least one pilot signal transmitted by the UE, or a location of the identified serving cell for the UE, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the methods, apparatuses, and non-transitory computer readable medium associated with the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which uplink-based mobility is provided. The techniques may enable a UE to operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a distributed unit (DU), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

Figure 1:
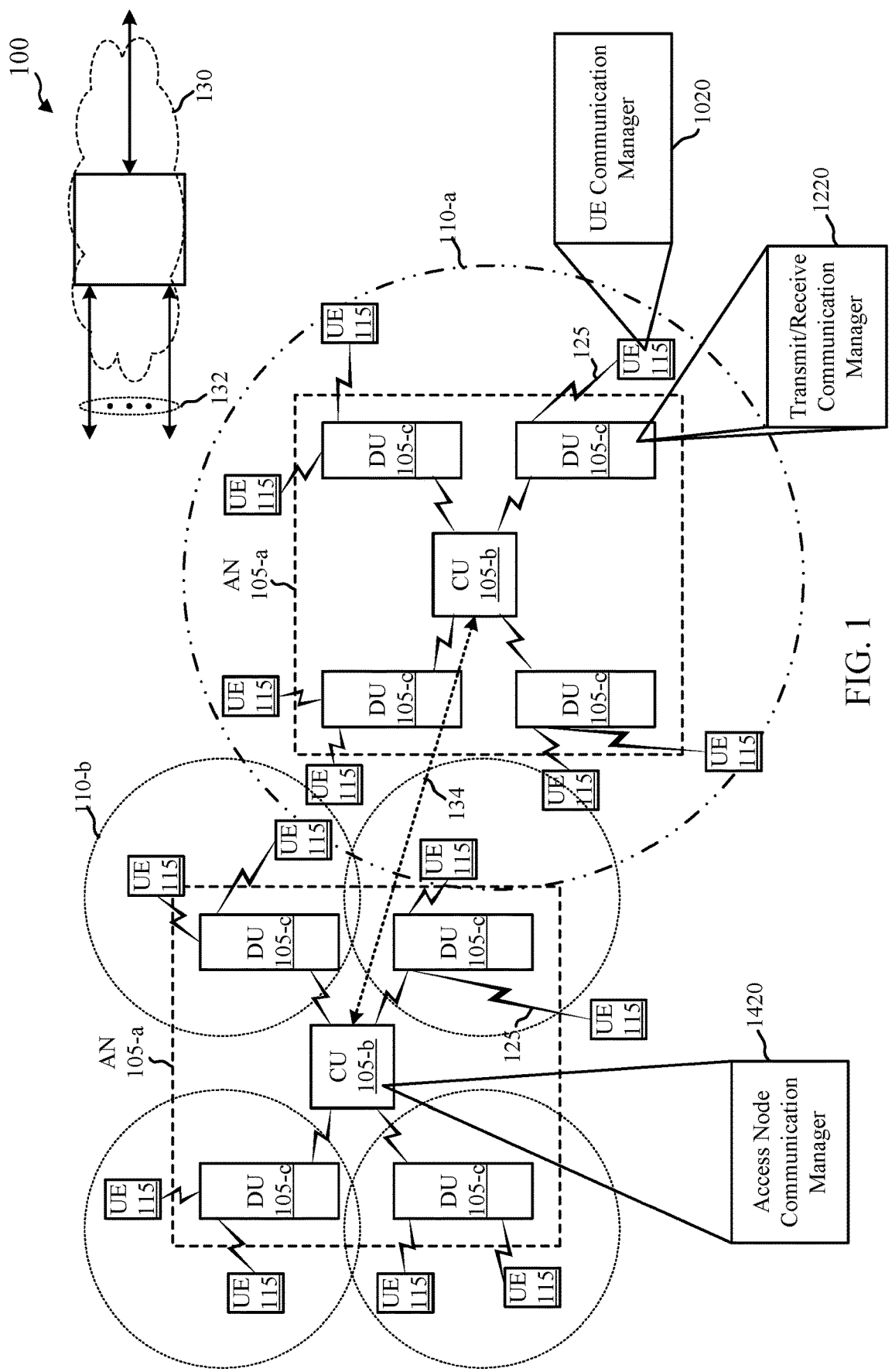
FIG. 1 illustrates an example of a wireless communication system that supports uplink-based mobility, in accordance with various aspects of the disclosure.

FIG. 1 illustrates an example of a wireless communication system 100 that supports uplink-based mobility, in accordance with various aspects of the disclosure. The wireless communication system 100 may include network access devices 105, which may include ANs 105-a, CUs 105-b, and/or DUs 105-c. Each of the ANs 105-a may be an example of a new radio base station (NR BS), a new radio Node-B (NR NB), a network node (NN), or the like. Each of the CUs 105-b may be an example of a central node (CN), an access node controller (ANC), or the like. Each of the DUs 105-c may be an example of an edge node (EN), an edge unit (EU), a radio head (RH), a smart radio head (SRH), a transmission and reception point (TRP), or the like. The wireless communication system 100 may also include UEs 115, and a core network 130. The core network 130 may provide user authentication, access authorization, tracking, Internet Protocol (IP) connectivity, and other access, routing, or mobility functions. At least some of the network access devices 105 (e.g., ANs 105-a, CUs 105-b, etc.) may interface with the core network 130 through backhaul links 132 (e.g., S1, S2, etc.) and may perform radio configuration and scheduling for communication with the UEs 115.

In various examples, CUs 105-b may communicate, either directly or indirectly (e.g., through core network 130), with each other over backhaul links 134 (e.g., X1, X2, etc.), which may be wired or wireless communication links. Each CU 105-b may also communicate with a number of UEs 115 through a number of distributed network access devices, such as DUs 105-c. A DU 105-c may include, for example, radio frequency (RF) components (e.g., at least one transceiver) and a modem. In some configurations of the wireless communication system 100, functionality of a CU 105-b may be provided by a DU 105-c or distributed across the DUs 105-c of an 105-a. In some configurations of the wireless communication system 100, DUs 105-c may be replaced with base stations, and CUs 105-b may be replaced by base station controllers (or links to the core network 130).

The CUs 105-b may wirelessly communicate with the UEs 115 via one or more DUs 105-c, with each DU 105-c having one or more antennas. Each of the DUs 105-c may provide communication coverage for a respective geographic coverage area 110-b, and may provide one or more remote transceivers associated with a CU 105-b. In some examples an 105-a may be associated with a geographic coverage area, such as geographic coverage area 110-a, which may be formed from a collection of geographic coverage areas 110-b associated with DUs 105-c of the AN 105-a where applicable. A DU 105-c may perform many of the functions of a LTE/LTE-A base station. In some examples, a CU 105-b may be implemented in distributed form, with a portion of the CU 105-b being provided in each DU 105-c. The geographic coverage areas 110-a for an 105-a or geographic coverage areas 110-b for a DU 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, NR BSs, NR NBs, etc. The wireless communication system 100 may include DUs 105-c (or base stations or other network access devices) of different types (e.g., macro cell and/or small cell network access devices). The geographic coverage areas 110-a of the ANs 105-a or the geographic coverage areas 110-b of the DUs 105-c or other network access devices may overlap. In some examples, different network access devices 105 may be associated with different radio access technologies.

In various examples, the wireless communication system 100 may include a 5G network, an LTE/LTE-A network, or combinations thereof. The wireless communication system 100 may in some cases be a heterogeneous network, in which different types of ANs provide coverage for various geographical regions. For example, each AN 105-a or DU 105-c may provide communication coverage for a macro cell, a small cell, and/or other types of cell. The term "cell" can be used to describe a network access device 105 (e.g. an 105-a, a centralized network access device such as CU 105-b, a distributed network access device such as DU 105-c, etc.), a carrier or component carrier associated with a network access device 105, or a coverage area (e.g., sector, etc.) of a carrier or network access device, depending on context.

A macro cell may cover a relatively large geographic area (e.g., several kilometers in radius) and may allow unrestricted access by UEs 115 with service subscriptions with a network provider. A small cell may include a lower-powered DU or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An for a macro cell may be referred to as a macro AN (e.g., a macro eNB, etc.). An for a small cell may be referred to as a small cell AN, a pico AN, a femto AN, or a home AN (e.g., a small cell eNB, a pico eNB, a femto eNB, a home eNB, etc.). An may support one or multiple (e.g., two, three, four, and the like) cells (e.g., component carriers).

The wireless communication system 100 may support synchronous or asynchronous operation. For synchronous operation, the ANs 105-a and/or DUs 105-c may have similar frame timing, and transmissions from different ANs 105-*a* and/or DUs 105-*c* may be approximately aligned in time. For asynchronous operation, the ANs 105-*a* and/or DUs 105-*c* may have different frame timings, and transmissions from different ANs 105-*a* and/or DUs 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a DU 105-*c*, a CU 105-*b*, an 105-*a*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, or other electronic device having a wireless communication interface. A UE may be able to communicate with various types of ANs 105-*a*, DUs 105-*c*, base stations, access points, or other network access devices, including macro ANs, small cell ANs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a DU 105-*c* or an 105-*a*, and/or downlink (DL) channels, from a DU 105-*c* or an 105-*a* to a UE 115. The downlink channels may also be called forward link channels, while the uplink channels may also be called reverse link channels.

One or more of the UEs 115 may include a UE wireless communication manager 1020. In some examples, the UE wireless communication manager 1020 may be used to identify, while the UE 115 is in a connected mode with a network defined by the wireless communication system 100, a radio resource configuration of the UE 115. In some examples identifying the radio resource configuration of the UE 115 may include identifying if the UE is operating with a radio resource configuration associated with transmitting pilots using a dedicated set of resources (e.g., an RRC dedicated state, etc.) or a common set of resources (e.g. an RRC common state, etc.). The UE wireless communication manager 1020 may also be used to select a dedicated set of resources or a common set of resources for the UE 115 based at least in part on the identified radio resource configuration, and to transmit a pilot signal to the network (e.g., to a DU 105-*c*, an 105-*a*, etc.) using the selected set of resources. In some examples, the UE wireless communication manager 1020 may be an example of the UE wireless communication manager 1020 described with reference to FIG. 10, 11, 16, or 19.

One or more of the network access devices 105 (e.g., one or more ANs 105-*a*, one or more DUs 105-*c*, etc.) may include a transmit/receive communication manager 1220. In some examples, the transmit/receive communication manager 1220 may be used to identify at least one dedicated set of resources for at least one UE in a first set of UEs. The network access device 105 including the transmit/receive communication manager 1220 may be a member of a monitoring set of network access devices 105 for each UE in the first set of UEs. The transmit/receive communication manager 1220 may also be used to measure a first set of pilot signals received from the first set of UEs using a dedicated set of resources, and a second set of pilot signals received from a second set of UEs using a common set of resources. The transmit/receive communication manager 1220 may subsequently identify, based at least in part on measurements of the first set of pilot signals and the second set of pilot signals, a third set of UEs for which the network access device 105 operates as a serving cell. In some examples, the transmit/receive communication manager 1220 may be an example of aspects of transmit/receive communication managers 1220 described with reference to FIG. 12, 13, 17, or 19.

One or more of the network access devices 105 (e.g., one or more ANs 105-*a*, one or more CUs 105-*b*, etc.) may include an access node communication manager 1420. In some examples, the access node communication manager 1420 may be used to receive, from each cell of a plurality of cells, measurements of a first set of pilot signals transmitted by a first set of user UEs operating with a first radio resource configuration while connected to a network (e.g., a network defined by the wireless communication system 100), and of a second set of pilot signals transmitted by a second set of UEs operating with a second radio resource configuration while connected to the network. The first radio resource configuration may be associated with UEs transmitting pilot signals using a dedicated set of resources (e.g., an RRC dedicated state), and the second radio resource configuration may be associated with UEs transmitting pilot signals using a common set of resources (e.g., an RRC common state). The access node communication manager 1420 may also be used to identify, for each UE in the first set of UEs and each UE in the second set of UEs, based at least in part on the measurements, a serving cell for the respective UE. The access node communication manager 1420 may also be used to identify, for each UE in the first set of UEs, a monitoring set of cells to monitor for pilot signals transmitted by the respective UE. In some examples the access node communication manager 1420 may indicate, to each cell, a first set of UEs for which the respective cell is a serving cell, and a second set of UEs for which the respective cell is a member of a monitoring set of cells. In some examples, the access node communication manager 1420 may be an example of access node communication managers 1420 described with reference to FIG. 14, 15, 18, or 19.

Each communication link 125 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the ANs 105-a, DUs 105-c and/or UEs 115 may include multiple antennas for employing antenna diversity schemes to improve communication quality and reliability between ANs 105-a, DUs 105-c, and UEs 115. Additionally or alternatively, ANs 105-a, DUs 105-c and/or UEs 115 may employ multiple-input multiple-output (MIMO) techniques that may take advantage of multi-path environments to transmit multiple spatial layers carrying the same or different coded data. In some examples two or more DUs 105-c may be configured in cooperation to support directional transmission and/or reception techniques, such as techniques associated with beamforming of transmissions by multiple DUs 105-c for directional transmission and/or precoding of signals received at multiple DUs 105-c for directional reception.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
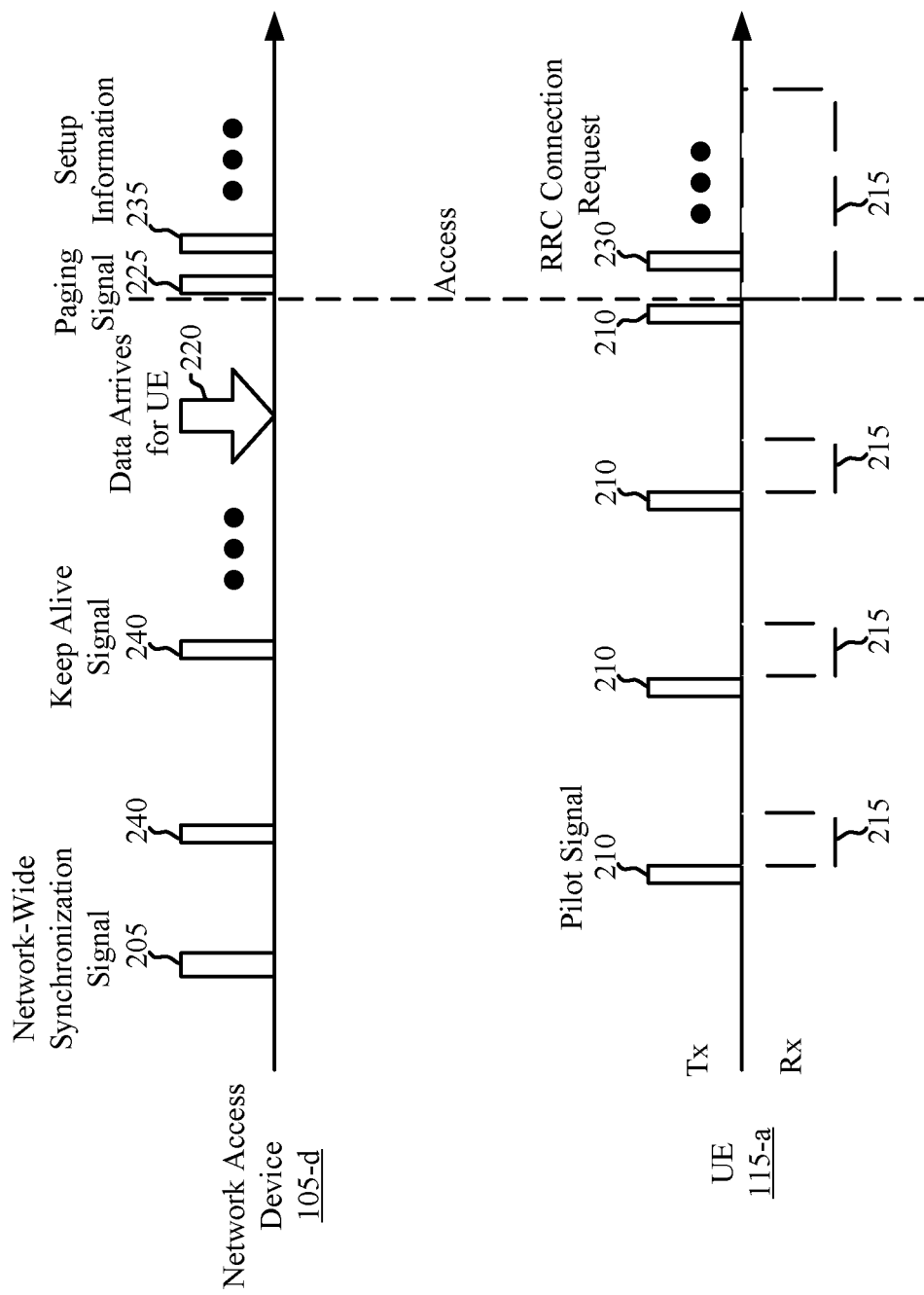
FIG. 2 shows an example of a timeline of operations that may be performed in a network that supports uplink-based mobility, in accordance with various aspects of the present disclosure.

FIG. 2 shows an example of a timeline 200 of operations that may be performed in a network that supports uplink-based mobility, in accordance with various aspects of the present disclosure. The operations may be performed by a network access device 105-d (e.g., an 105-a, a CU 105-b, a DU 105-c, etc.) and a UE 115-a that is served by the network access device 105. In some examples, the serving network access device 105-d may be a distributed network access device, and may be an example of aspects of one or more of the DUs 105-c described with reference to FIG. 1. The UE 115-a may be an example of aspects of one or more of the UEs 115 described with reference to FIG. 1.

As shown in timeline 200, the serving network access device 105-d may broadcast a synchronization signal 205. The synchronization signal 205 may be common (e.g., not cell-specific, not UE-specific, etc.) to a plurality of cells within a network, and may be broadcast from the plurality of cells (e.g., from a plurality of DUs) in an single frequency network (SFN) manner. The synchronization signal 205 need not include a cell identifier. In some examples, the synchronization signal 205 may be a periodic signal. In various examples, the synchronization signal 205 may have a relatively short duration or may be transmitted relatively infrequently. For example, the synchronization signal 205 may have a duration of one symbol and be transmitted once every ten seconds. In other examples, the synchronization signal 205 may be transmitted more frequently, such as once per radio frame. In some examples, the synchronization signal 205 may carry several bits of information, such as 4-6 bits of information. In some examples, the synchronization signal 205 may include system information request (e.g., system information block (SIB) request) configuration information. The system information request configuration information may, in some examples, include at least one of an indication of a SIB request bandwidth, an indication of a SIB request timing (e.g., slot/symbol timing), or network access barring information (e.g., an indication of times when UEs of particular types may not transmit a SIB request). In some examples, the synchronization signal 205 may be more dynamic, and may be broadcast on a synchronization channel with guard, for example.

The UE 115-a may receive the synchronization signal 205 and acquire a timing of the network based on the synchronization signal 205. In response to acquiring the timing of the network, the UE 115-a may transmit a pilot signal (or UE chirp) 210. The pilot signal 210 may be concurrently receivable by the plurality of cells (e.g., a plurality of DUs) within the network. In some examples, the cells within a "zone" of cells may be synchronized so that the UE 115-a does not need to transmit multiple pilot signals and the cells within the zone may all receive the same pilot signal. In some examples, the pilot signal 210 may include a spatial signature (e.g., a sounding reference signal (SRS)). A DU may in some cases have a large uplink spatial multiplexing capacity for receiving the SRS. In some examples, the pilot signal 210 may be transmitted in a SIB request occasion (or set of common resources) indicated by system information request configuration information received with the synchronization signal. In some examples, the pilot signal 210 may be transmitted with a pre-determined random sequence or a random sequence generated by the UE 115-a, which random sequence may be usable by the network (e.g., a DU) to temporarily identify the UE 115-a during initial acquisition.

Following transmission of an instance of the pilot signal 210, the UE 115-a may listen for a transmission from the network (e.g., a transmission, from a DU, of on-demand system information for the UE 115-a, an uplink allocation for the UE 115-a, a power control message for the UE 115-a, or a timing advance message for the UE 115-a). In some examples, the UE 115-a may listen for transmissions during a listening window 215. When the UE 115-a does not receive a transmission during the listening window 215, the UE 115-a may transition a receiver of the UE 115-a to a low power or OFF state until a next listening window 215, which may conserve power.

One or more network access devices 105 (e.g., ANs 105-a, DUs 105-c, etc.) may receive the pilot signal 210 and measure the pilot signal 210 for purposes of initial access to the network. A serving cell for the UE 115-a may be selected by one or more of the receiving network access devices 105, or by a CU 105-b in communication with the receiving network access devices 105, based at least in part on the measurements of the pilot signal 210. For example, each of a number of receiving DUs 105-c may measure the signal strength or power ($P_{PS}$) of the pilot signal (PS) 210, and a serving DU (or serving cell) for the UE 115-a may be selected based on a function such as:

$$\text{serving cell} = \text{argmax}(P_{PS_i})$$

where $P_{PS_i}$ is the measured power of a serving cell i, and where the serving cell selected for the UE 115-a is the serving cell that receives the pilot signal 210 at a greatest power. Serving cell selection is therefore handled (at least primarily) on the network side, and the number of measurements performed by the UE 115-a, or processes managed by the UE 115-a, may be reduced.

When the network has information to transmit to the UE 115-a, indicated by data arrival 220, the serving network access device 105-d for the UE may transmit a unicast paging signal 225 to the UE 115-a. In some examples, the unicast paging signal 225 may be transmitted with on-demand system information for the UE 115-a (e.g., an on-demand SIB or MIB), an uplink allocation for the UE 115-a, a power control message for the UE 115-a, or a timing advance message for the UE 115-a. In some examples, the network access device 105-d may initiate communication with a plurality of UEs using a multicast paging signal. Following receipt of a paging signal (e.g., the unicast paging signal 225), the UE 115-a may in some examples increase the duration of its current listening window 215, and in some examples may transmit a radio resource control (RRC) connection request 230 to its serving network access device 105-d. In some cases, the serving network access device 105-d may transmit additional connection setup information 235 to the UE 115-a, or perform additional contention resolution procedures, following receipt of the connection request 230.

When the UE 115-a has information to transmit to the network, the UE 115-a may transmit a scheduling request (SR) with one or more instances of the pilot signal 210. In response to receiving the pilot signal 210 or the scheduling request, the serving network access device 105-d may transmit on-demand system information (e.g., an on-demand system information block (SIB) or master information block (MIB)) to the UE. The serving network access device 105-d may also transmit an uplink allocation (e.g., an uplink grant) for the UE 115-a, or may transmit a power control message or a timing advance message for the UE 115-a. In some examples, the system information, uplink allocation, power control message, or timing advance message may be transmitted to the UE 115-a in a same downlink transmission. In some examples, the uplink allocation may be spatially multiplexed.

When system information is transmitted from a network access device 105 to a number of UEs 115 on-demand (e.g., when needed for an uplink or downlink transmission between the DU and one or more of the UEs), the network access device 105-d may reduce or eliminate periodic broadcasts of system information, which may conserve power. On the UE side, a UE 115 may conserve power by not listening for system information broadcasts, and instead only listening for on-demand system information transmissions.

In some examples of the timeline 200 shown in FIG. 2, different synchronization signals may be transmitted for different constellations (e.g., different groups of cells, nodes, or base stations of the network, or different groups of cells, nodes, or DUs belonging to different networks).

In the timeline 200 of operations performed in FIG. 2, the UE 115-a does not need to measure signals received from its serving cell or neighboring cells and report the measurements to the network. Instead, the network measures a pilot signal transmitted by the UE 115-a and makes mobility decisions for the UE 115-a. This framework offloads at least some of the processing burden pertaining to UE mobility decisions from the UE 115-a to the network, and may help to conserve both resources and power at the UE 115-a. This framework may also help the network to save power by omitting the continuous transmission of reference signals for the UE 115-a to measure.

During initial access, a UE 115 may transmit a pilot signal using a common set of resources. After initial access, a UE 115 may in some cases be allocated a dedicated set of resources. After entering a RRC connected state with the network, a UE 115 may operate with a radio resource configuration associated with transmitting pilot signals using a common set of resources or a dedicated set of resources. In some examples, the UE 115 may select an RRC dedicated state when the UE 115 has been allocated a dedicated set of resources, and select a RRC common state when the UE 115 has not been allocated a dedicated set of resources.

When operating in the RRC common state, the UE 115 may transmit a pilot signal on the common set of resources. When operating in the RRC dedicated state, the UE 115 may transmit a pilot signal on the dedicated set of resources. A pilot signal transmitted on the common set of resources may be measured by all of the cells (e.g., ANs 105-a, DUs 105-c, etc.) that receive the pilot signal, and measurement reports including the measurements may be transmitted to a CU 105-b or shared with other cells for the purpose of making a mobility decision for the UE 115. A pilot signal transmitted on the dedicated set of resources may be measured by a set of cells included in a monitoring set of cells for the UE 115. For example, a CU 105-b may initially determine a monitoring set of DUs 105-c to include neighbors of a serving DU 105-c for the UE 115 (e.g., based on measurements or operations and maintenance (O&M) information). In some examples, the network (e.g., a AN 105-a, a CU 105-b, etc.) may identify the cells of a monitoring set of cells for a UE based at least in part on measurements of at least one pilot signal transmitted by the UE, or a location of the serving cell for the UE 115, or a combination thereof. The network may configure the set of monitoring cells to monitor a specific uplink reference signal from the UE 115, and may report the measured results of the received uplink reference signal (e.g. to a CU 105-b). The network may also update the monitoring set of cells upon UE mobility (e.g., upon a change in DUs 105-c included in a neighbor set of DUs 105-c).

When a UE 115 operates in an RRC common state, a UE identity (e.g., a System Architecture Evolution (SAE) temporary mobile subscriber identity (S-TMSI)) alone may be maintained by the network for the UE 115, and the common set of resources may be used for data transfer and pilot/keep alive signal transmission. In some examples, small data transmissions may be made to/from a UE 115 operating in an RRC common state, and the UE 115 may transition to the RRC dedicated state for larger data transmissions. A discontinuous reception (DRX) cycle or discontinuous transmission (DTX) cycle associated with an RRC common state may, in some examples, be several minutes or hours long. When a UE 115 operates in the RRC dedicated state, a set of dedicated resources and a radio network temporary identifier (RNTI) may be allocated to the UE 115. The dedicated resources may be allocated by just one DU 105-c (e.g., a serving DU 105-c), and similar resources may be allocated to other UEs 115 by other DUs 105-c. A DRX cycle or DTX cycle associated with an RRC dedicated state may, in some examples, may be relatively short (or up to the maximum duration dictated by service requirements). Regardless of whether a UE 115 operates with a radio resource configuration associated with transmission of pilot signals using a common or dedicated set of resources, the network may maintain a UE context for the UE 115 and consider the UE 115 to be in a RRC connected mode.

The network access devices 105 of a monitoring set for a UE 115 may in some examples, transmit a measurement report for a pilot signal of the UE 115 based on a periodic measurement reporting criteria and/or an event-driven measurement reporting criteria. A periodic measurement reporting criteria may indicate, for example, that a measurement report should be transmitted to a CU 105-*b* for every pilot signal, for every nth pilot signal, or at periodic time intervals. An event-driven measurement reporting criteria may indicate, for example, that a measurement report should be transmitted upon the occurrence of one or more events, such as a determination that a signal strength or signal quality of a pilot signal no longer satisfies a threshold signal strength or threshold signal quality.

In some examples, the serving network access device 105 for a UE 115 may transmit a keep alive signal 240 to the UE 115. The keep alive signal 240 may be transmitted in response to receiving a pilot signal 210 from the UE 115. When a pilot signal 210 is received by the serving network access device 105 using a common set of resources, the keep alive signal 240 may be transmitted to the UE 115 using the common set of resources. When a pilot signal 210 is received by the serving network access device 105 using a dedicated set of resources, the keep alive signal 240 may be transmitted to the UE 115 using the dedicated set of resources. In some examples, a keep alive signal 240 may carry power control information or timing advance information.

Figure 3:
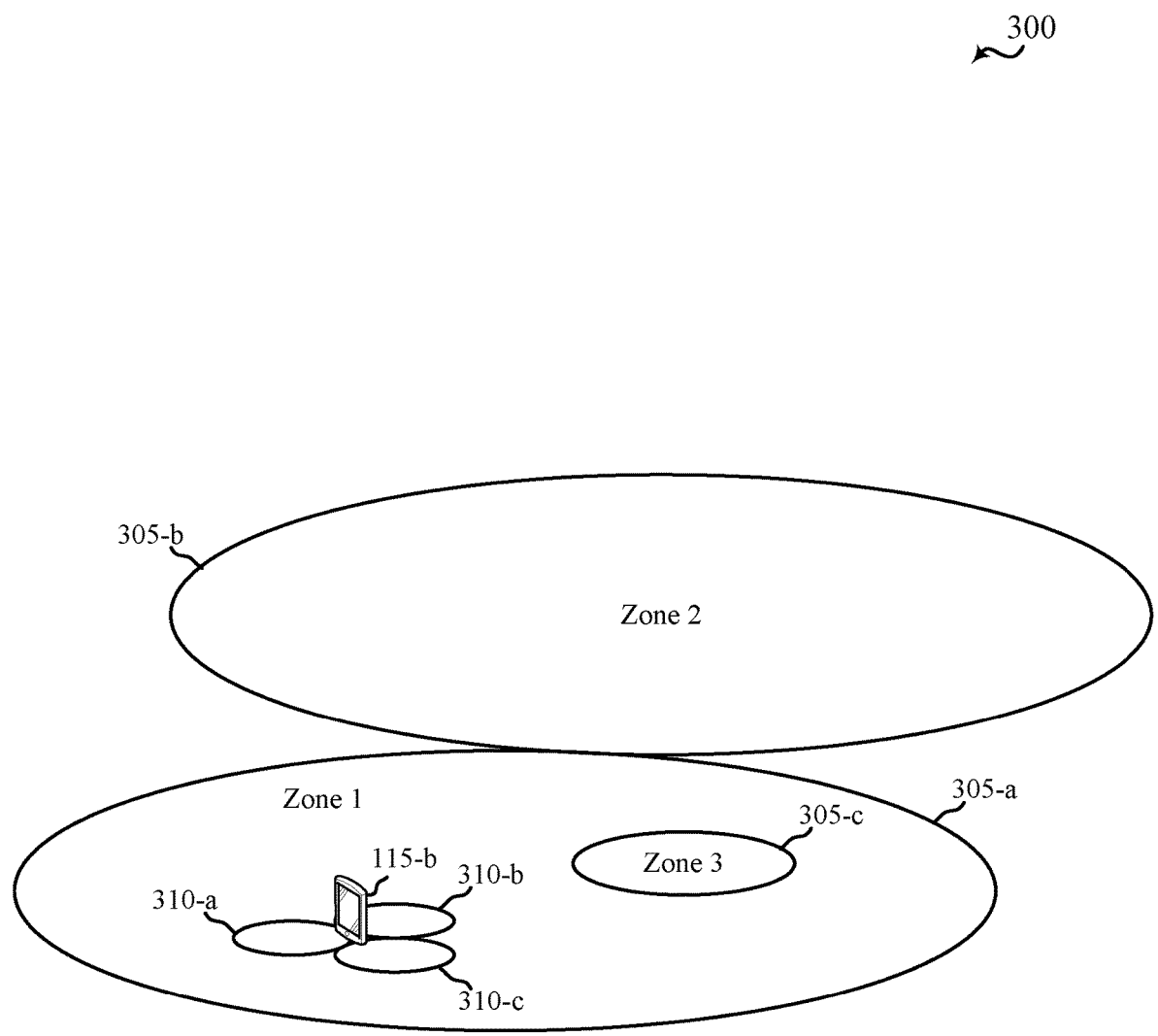
FIG. 3 illustrates an example of a wireless communication system that supports uplink-based mobility, in accordance with various aspects of the present disclosure.

FIG. 3 illustrates an example of a wireless communication system 300 that supports uplink-based mobility, in accordance with various aspects of the present disclosure. The wireless communication system 300 may include a number of zones (including, e.g., a first zone 305-*a* (Zone 1), a second zone 305-*b* (Zone 2), and a third zone 305-*c* (Zone 3)). A number of UEs, including UE 115-*b*, may move within or between the zones.

As described with reference to FIG. 2, a zone may include multiple cells, and the cells within a zone may be synchronized (e.g., the cells may share the same timing). Wireless communication system 300 may include examples of both non-overlapping zones (e.g., the first zone 305-*a* and the second zone 305-*b*) and overlapping zones (e.g., the first zone 305-*a* and the third zone 305-*c*). In some examples, the first zone 305-*a* and the second zone 305-*b* may each include one or more macro cells, micro cells, or pico cells, and the third zone 305-*c* may include one or more femto cells.

By way of example, the UE 115-*b* is shown to be located in the first zone 305-*a*. If the UE 115-*b* is operating with a radio resource configuration associated with transmitting pilot signals using a common set of resources, such as an RRC common state, the UE 115-*b* may transmit a pilot signal using a common set of resources, as described with reference to FIG. 2. Cells (e.g., ANs 105-*a*, DUs 105-*c*, etc.) within the first zone 305-*a* may monitor the common set of resources for a pilot signal from the UE 115-*b*. If the UE 115-*b* is operating with a radio resource configuration associated with transmitting pilot signals using a dedicated set of resource, such as an RRC dedicated state, the UE 115-*b* may transmit a pilot signal using a dedicated set of resources, as described with reference to FIG. 2. Cells of a monitoring set of cells established for the UE 115-*b* within the first zone 305-*a* (e.g., a first cell 310-*a*, a second cell 310-*b*, and a third cell 310-*c*) may monitor the dedicated set of resources for the pilot signal of the UE 115-*b*.

Figure 4:
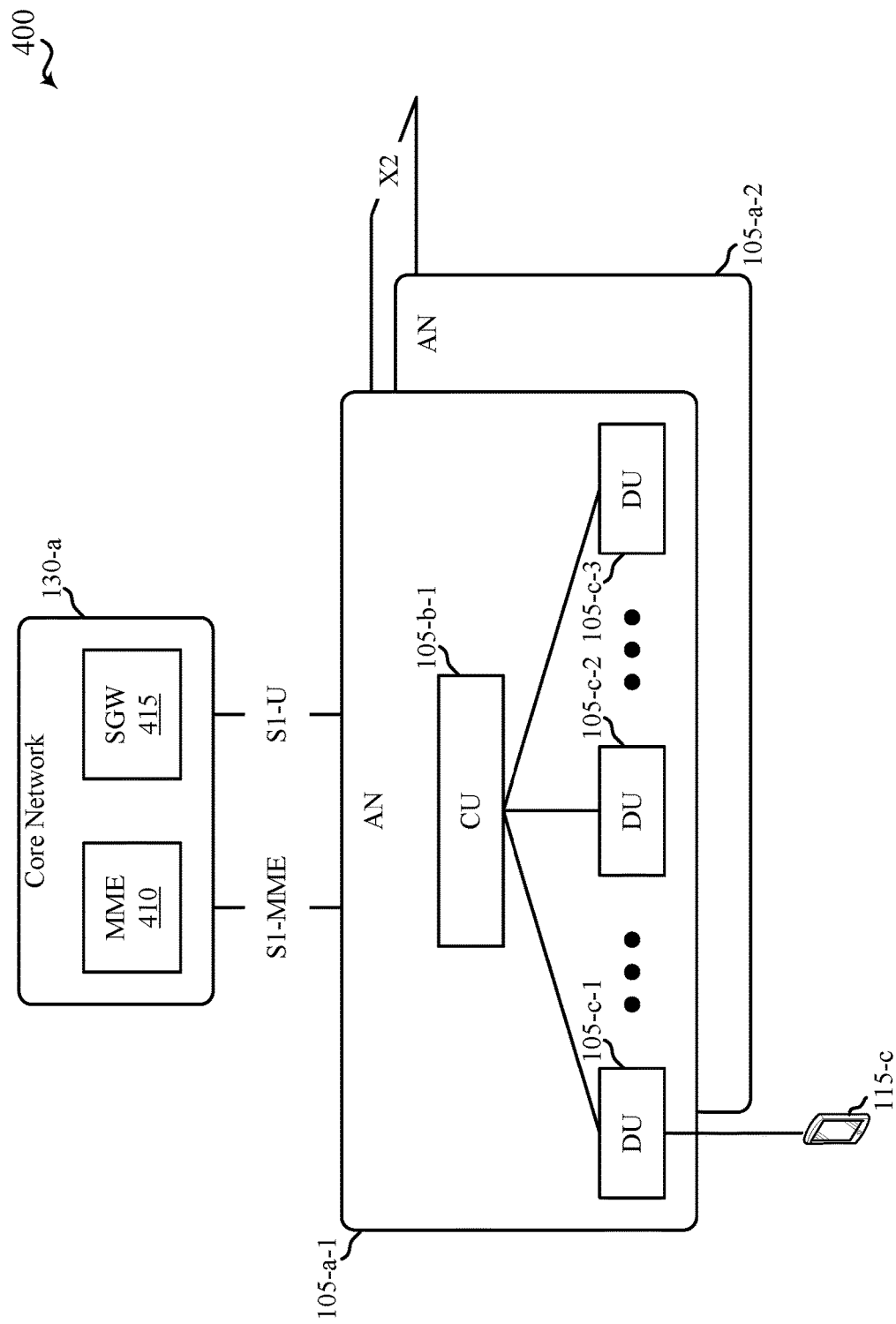
FIG. 4 illustrates an example of a wireless communication system that supports uplink-based mobility, in accordance with various aspects of the present disclosure.

FIG. 4 illustrates an example of a wireless communication system 400 that supports uplink-based mobility, in accordance with various aspects of the present disclosure. The wireless communication system 400 may include a number of access networks, including, for example, a first access node 105-*a*-1 and a second access node 105-*a*-2. In some examples, one or more of the access nodes 405 may define a zone, such as one of the zones 305 described with reference to FIG. 3. Each of the access nodes 405 may interface with a core network 130-*a*, which may be an example of aspects of the core network 130 described with reference to FIG. 1. In some examples, the core network 130-*a* may include a mobility management entity (MME) 410 or a serving gateway (SGW) (e.g., a MME or SGW for a next generation or 5G network).

Each of the access nodes 405 may include a CU 105-*b* and a number of DUs 105-*c*. For example, the first access node 105-*a*-1 may include a CU 105-*b*-1, a first DU 105-*c*-1, a second DU 105-*c*-2, and a third DU 105-*c*-3. By way of example, a UE 115-*c* is shown to communicate with the first DU 105-*c*-1. Other UEs (not shown) may communicate with the first DU 105-*c*-1 or with other DUs. The UE 115-*c* may be handed over from one serving DU (e.g., the first DU 105-*c*-1) to another serving DU as it moves within the wireless communication system 400. The CU 105-*b*-1, first DU 105-*c*-1, second DU 105-*c*-2, third DU 105-*c*-3, and UE 115-*c* may be examples of aspects of the CUs 105-*b*, DUs 105-*c*, or UEs 115 described with reference to FIGS. 1 through 3. Communications between access nodes 405 (e.g., between CUs 105-*b*) may in some examples be conducted over a X2 interface.

Each CU 105-*b* within the wireless communication system 400 (including the CU 105-*b*-1) may terminate a connection to the core network 130-*a* for all of the DUs within an access network (e.g., via a S1-MME interface and a S1-U (user) interface). For example, the CU 105-*b*-1 may terminate a connection to the core network 130-*a* for the first DU 105-*c*-1, the second DU 105-*c*-2, and the third DU 105-*c*-3. The CU 105-*b*-1 may also coordinate actions between or including multiple DUs. For example, the CU 105-*b*-1 may coordinate intra-access network handovers of a UE 115 from one DU 105-*c* to another DU 105-*c*. The CU 105-*b*-1 may also coordinate RRC layer and user (U)-plane PDCP layer communications for the first access node 105-*a*-1.

Each DU 105-*c* within the wireless communication system 400 may serve traffic between a set of UEs 115 for which the DU 105-*c* operates as a serving node and a CU 105-*b* with which the DU 105-*c* is associated. For example, the first DU 105-*c*-1 may serve traffic between a set of UEs 115, including the UE 115-*c*, and the CU 105-*b*-1. The first DU 105-*c*-1 may also monitor for pilot signals received over a common set of resources (e.g., from UEs operating in a RRC common state) and dedicated sets of resources (e.g., from UEs operating in a RRC dedicated state). The pilot signals may be measured and used by the first DU 105-*c*-1, another DU, or the CU 105-*b*-1 to make UE mobility decisions (e.g., mobility decisions for the UE 115-*c*). The first DU 105-*c*-1 may also perform PHY layer processing (e.g., the reception and measurement of pilot signals, and the transmission of measurement reports to the CU 105-*b*-1) and control/user (C/U) plane processing below the PDCP layer.

In some examples, the functions of an access node 405 may be split between a CU 105-*b* and DUs 105-*c* as shown in FIG. 4. In other examples, the functions performed by a CU 105-*b* may be moved to one or more DUs 105-*c*, and the DUs 105-*c* may communicate with each other and with the core network 130-*a*.

Figure 5:
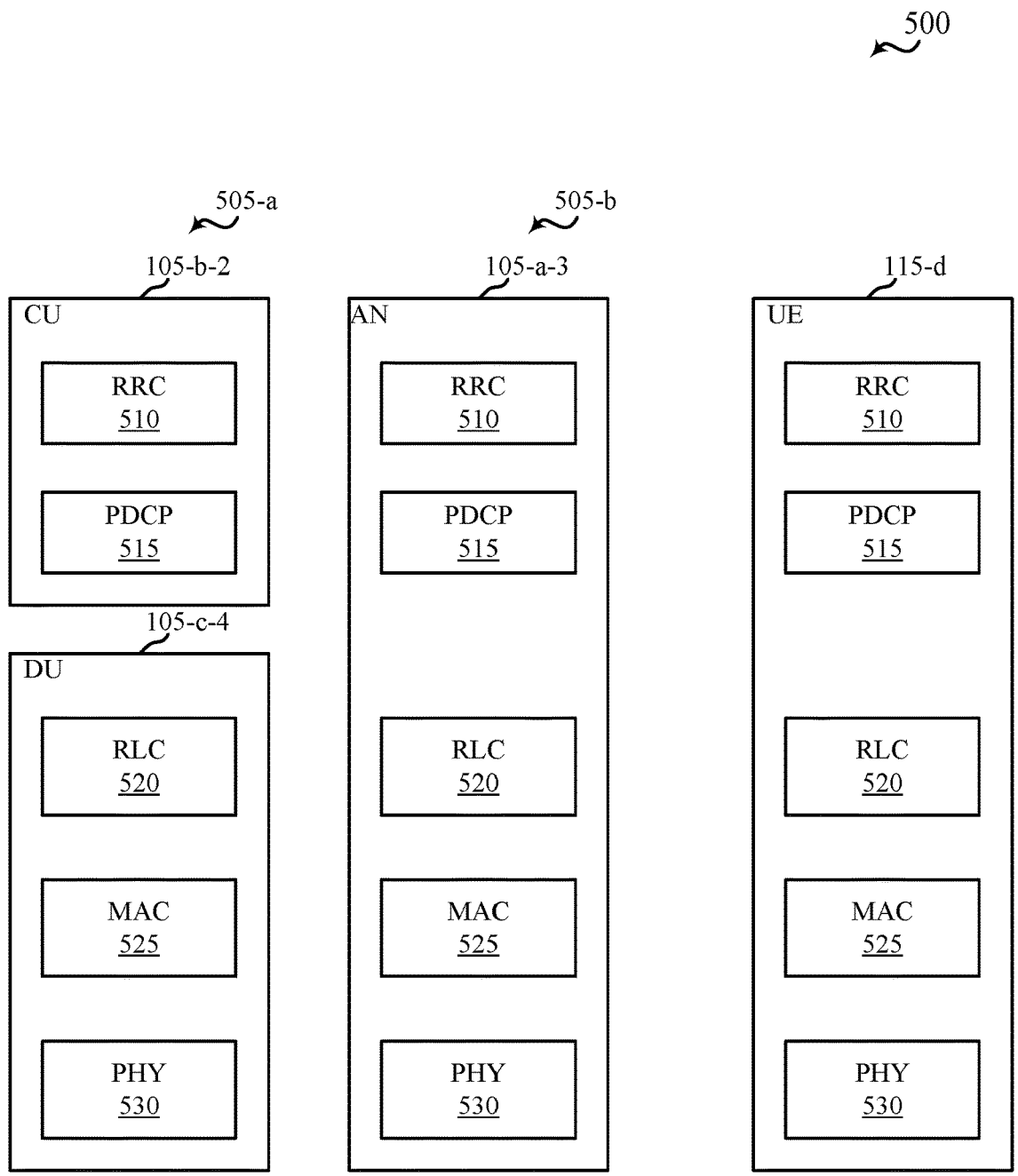
FIG. 5 illustrates a diagram showing examples for implementing a communications protocol stack that supports uplink-based mobility, in accordance with various aspects of the present disclosure.

FIG. 5 illustrates a diagram 500 showing examples for implementing a communications protocol stack that supports uplink-based mobility, in accordance with various aspects of the present disclosure. For example, diagram 500 illustrates a communications protocol stack including an RRC layer 510, a PDCP layer 515, an RLC layer 520, a MAC layer 525, and a PHY layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device 105 or a UE 115.

A first option 505-a shows a split implementation of a protocol stack, in which implementation of the protocol stack is split between a centralized network access device 105 (e.g., CU 105-b-2) and a distributed network access device 105 (e.g., DU 105-c-4). In the first option 505-a, an RRC layer 510 and a PDCP layer 515 may be implemented by the CU 105-b-2, and an RLC layer 520, a MAC layer 525, and a PHY layer 530 may be implemented by the DU 105-c-4. In various examples the CU 105-b-2 and the DU 105-c-4 may be collocated or non-collocated. The first option 505-a may be useful in a macro cell, micro cell, or pico cell deployment.

A second option 505-b shows a unified implementation of a protocol stack, in which the protocol stack is implemented in a single network access device 105 (e.g., AN 105-a-3). In the second option 505-b, the RRC layer 510, the PDCP layer 515, the RLC layer 520, the MAC layer 525, and the PHY layer 530 may each be implemented by the AN 105-a-3. The second option 505-b may be useful in a femto cell deployment.

Regardless of whether a network access device implements part or all of a protocol stack, a UE 115-d may implement an entire protocol stack (e.g., the RRC layer 510, the PDCP layer 515, the RLC layer 520, the MAC layer 525, and the PHY layer 530).

Figure 6:
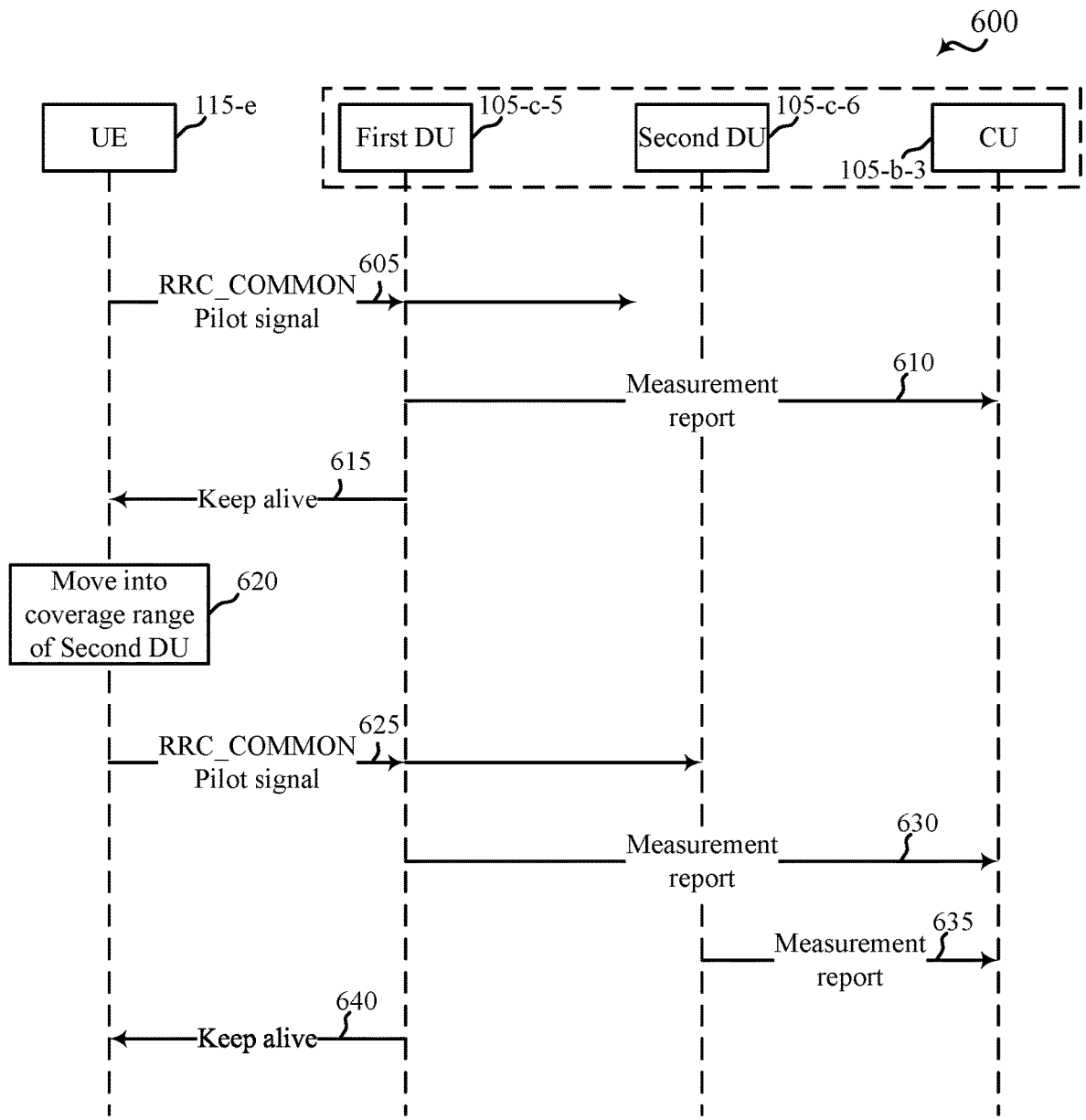
FIGS. 6-9 show examples of communication flows that support uplink-based mobility, in accordance with various aspects of the present disclosure.
Figure 7:
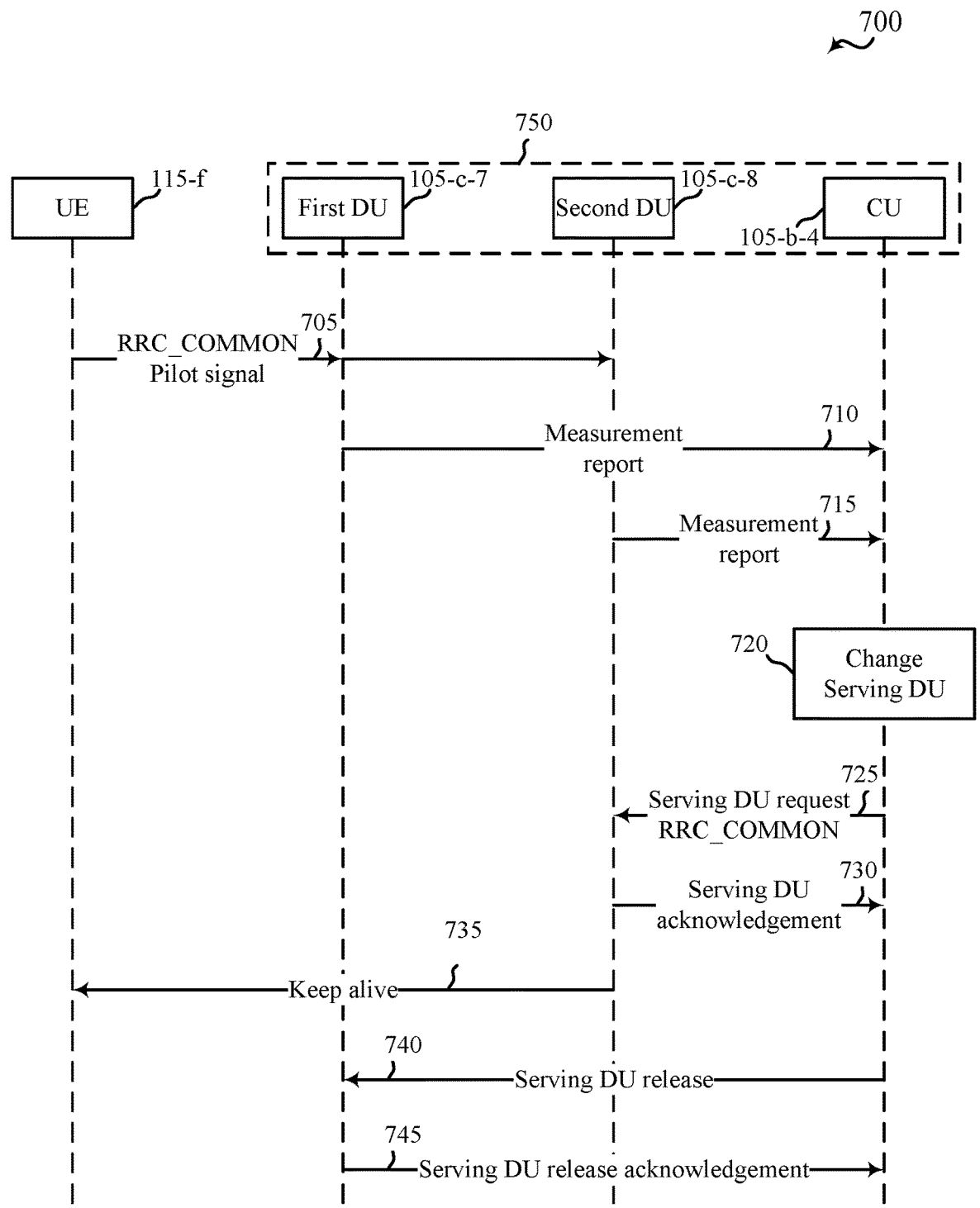

FIGS. 6 and 7 provide examples of UE, DU, and CU behaviors when a UE 115 operates in a RRC common state.

FIG. 6 shows an example of a communication flow 600 that supports uplink-based mobility, in accordance with various aspects of the present disclosure. As shown, communication flow 600 includes communication between a UE 115-e, a first DU 105-c-5, a second DU 105-c-6, and a CU 105-b-3. The UE 115-e may be an example of aspects of the UEs 115 described with reference to FIGS. 1 through 5; the first DU 105-c-5 and the second DU 105-c-6 may be examples of aspects of the DUs 105-c described with reference to FIGS. 1 through 5; and the CU 105-b-3 may be an example of aspects of the CUs 105-b (e.g., centralized network access devices 105) described with reference to FIGS. 1 through 5. Each of the first DU 105-c-5 and the second DU 105-c-6 may operate in a common zone or overlapping zones, and may be associated with the CU 105-b-3. The communication flow 600 may commence with the UE 115-e operating with a radio resource configuration associated with transmitting pilot signals using a common set of resources (e.g., an RRC common state), and with the first DU 105-c-5 operating as a serving DU for the UE 115-e.

Because the UE 115-e is operating with a radio resource configuration associated with transmitting pilot signals using a common set of resources, each of the first DU 105-c-5 and the second DU 105-c-6 (and all other DUs, or all other DUs within the zone or overlapping of zones in which the UE 115-e operates) may monitor for pilot signals transmitted by the UE 115-e. At 605, the UE 115-e may transmit a pilot signal using a common set of resources while within the coverage area of the first DU 105-c-5 but not within the coverage area of the second DU 105-c-6. In some examples, the pilot signal may be configured according to an RRC COMMON pilot signal configuration. In some examples, the UE 115-e may receive an allocation of the common set of resources (including, for example, the RRC COMMON pilot signal configuration) in a synchronization signal, in system information (e.g., a SIB, etc.), in a unicast message (e.g., on-demand system information by way of a MAC control element, an RRC message, a PHY message, a physical downlink control channel (PDCCH) command, etc.), or a combination thereof. In some examples, the UE 115-e may identify the allocation of the common set of resources based at least in part on a type of the UE 115-e (e.g., different common sets of resources may be allocated for different types of UEs). In some examples, the pilot signal may identify the UE 115-e (e.g., the pilot signal may include an identifier of the UE 115-e).

The pilot signal transmitted by the UE 115-e at 605 may be received and measured by the first DU 105-c-5. In some examples, the first DU 105-c-5 may measure a signal strength or signal quality (e.g., signal-to-noise ratio (SNR), signal-to-interference-plus-noise ratio (SINR), etc.) of the pilot signal. The first DU 105-c-5 may forward a measurement report including one or more measurements of the pilot signal (e.g., a measurement report including the signal strength or signal quality of the pilot signal) to the CU 105-b-3 at 610.

The CU 105-b-3 may determine, based on the measurement report received from the first DU 105-c-5 at 610, that the first DU 105-c-5 should remain the serving DU for the UE 115-e.

At 615, the first DU 105-c-5 may transmit a keep alive signal to the UE 115-e on a common set of resources (e.g., on a same frequency band, a same component carrier, a same set of subcarrier(s), a same set of resource block(s), and/or a same channel as the common set of resources on which the pilot signal is transmitted at 605). In some examples, transmitting the keep alive signal may be based at least in part on the pilot signal transmitted at 605 (e.g., the keep alive signal may be transmitted to the UE 115-e in response to the first DU 105-c-5 receiving the pilot signal). In some examples, the keep alive signal transmitted at 615 may be transmitted before the measurement report is transmitted at 610.

At 620, the UE 115-e may move into the coverage area of the second DU 105-c-6, while remaining in the coverage area of the first DU 105-c-5.

At 625, the UE 115-e may transmit another pilot signal on the common set of resources (e.g., on a same frequency band, a same component carrier, a same set of subcarrier(s), a same set of resource block(s), and/or a same channel as the common set of resources on which the pilot signal is transmitted at 605). The pilot signal transmitted by the UE 115-e at 625 may be received and measured by both the first DU 105-c-5 and the second DU 105-c-6. The first DU 105-c-5 may forward a measurement report to the CU 105-b-3 at 630, and the second DU 105-c-6 may forward a measurement report to the CU 105-b-3 at 635.

The CU 105-b-3 may determine, based on the measurement reports received from the first DU 105-c-5 and the second DU 105-c-6 at 625 and 630, that the first DU 105-c-5 should remain the serving DU for the UE 115-e. In other examples, the CU 105-b-3 may determine to initiate a handover of the UE 115-e from the first DU 105-c-5 to the second DU 105-c-6 (or to another DU).

At 640, the first DU 105-c-5 may transmit another keep alive signal to the UE 115-e using a common set of resources (e.g., on a same frequency band, a same component carrier, a same set of subcarrier(s), a same set of resource block(s), and/or a same channel as the common set of resources on which the pilot signal is transmitted at 605)). In some examples, transmitting the keep alive signal may be based at least in part on the pilot signal transmitted at 625. In some examples, the keep alive signal transmitted at 640 may be transmitted before the measurement report is transmitted at 630 or 635. The second DU 105-c-6 may not transmit a keep alive signal to the UE 115-e because the second DU 105-c-6 is not the serving DU for the UE 115-e.

FIG. 7 shows an example of a communication flow 700 that supports uplink-based mobility, in accordance with various aspects of the present disclosure. As shown, communication flow 700 includes communication between a UE 115-f, a first DU 105-c-7, a second DU 105-c-8, and a CU 105-b-4. The UE 115-f may be an example of aspects of the UEs 115 described with reference to FIGS. 1 through 6; the first DU 105-c-7 and the second DU 105-c-8 may be examples of aspects of the DUs 105-c described with reference to FIGS. 1 through 6; and the CU 105-b-4 may be an example of aspects of the CUs 105-b described with reference to FIGS. 1 through 6. Each of the first DU 105-c-7 and the second DU 105-c-8 may operate in a common zone or overlapping zones, and may be associated with the CU 105-b-4. The communication flow 700 may commence with the UE 115-f operating with a radio resource configuration associated with transmitting pilot signals using a common set of resources (e.g., an RRC common state), and with the first DU 105-c-7 operating as a serving DU for the UE 115-f.

Because the UE 115-f is operating with a configuration associated with transmitting pilot signals using a common set of resources, each of the first DU 105-c-7 and the second DU 105-c-8 (and all other DUs, or all other DUs within the zone in which the UE 115-f operates) may monitor for pilot signals transmitted by the UE 115-f. At 705, the UE 115-f may transmit a pilot signal using a common set of resources while within the coverage area of the first DU 105-c-7 and the second DU 105-c-8. In some examples, the pilot signal may be configured according to a RRC COMMON pilot signal configuration. In some examples, the UE 115-f may receive an allocation of the common set of resources (including, for example, the RRC COMMON pilot signal configuration) in a synchronization signal, in system information (e.g., a SIB), in a unicast message (e.g., on-demand system information by way of a MAC control element, an RRC message, a PHY message, a PDCCH command, etc.), or a combination thereof. In some examples, the UE 115-f may identify the allocation of the common set of resources based at least in part on a type of the UE 115-f (e.g., different common sets of resources may be allocated for different types of UEs). In some examples, the pilot signal may identify the UE 115-f (e.g., the pilot signal may include an identifier of the UE 115-f).

The pilot signal transmitted by the UE 115-f at 705 may be received and measured by both the first DU 105-c-7 and the second DU 105-c-8. In some examples, each of the first DU 105-c-7 and the second DU 105-c-8 may measure a signal strength or signal quality of the pilot signal. The first DU 105-c-7 may forward a measurement report including one or more measurements of the pilot signal (e.g., a measurement report including the signal strength or signal quality of the pilot signal) to the CU 105-b-4 at 710. The second DU 105-c-8 may forward a measurement report including one or more measurements of the pilot signal (e.g., a measurement report including the signal strength or signal quality of the pilot signal) to the CU 105-b-4 at 715.

The CU 105-b-4 may determine at 720, based on the measurement reports received from the first DU 105-c-7 and the second DU 105-c-8, that the second DU 105-c-8 would be a preferred serving DU for the UE 115-f, and may initiate a serving cell change procedure (e.g., a handover of the UE 115-f from the first DU 105-c-7 to the second DU 105-c-8).

At 725, the CU 105-b-4 may transmit, to the second DU 105-c-8, a request for the second DU 105-c-8 to operate as a serving DU (or cell) for the UE 115-f, which UE 115-f is operating in a RRC common state. At 730, the second DU 105-c-8 may acknowledge receipt of the request transmitted at 725.

At 735, the second DU 105-c-8 may transmit a keep alive signal to the UE 115-f on common resources (e.g., on a same frequency band, a same component carrier, a same set of subcarrier(s), a same set of resource block(s), and/or a same channel as the common set of resources on which the pilot signal is transmitted at 705). In some examples, transmitting the keep alive signal may be based at least in part on the pilot signal transmitted at 705 (e.g., the keep alive signal may be transmitted to the UE 115-f in response to the first DU 105-c-7 receiving and measuring the pilot signal and transmitting a measurement report to the CU 105-b-4, and in response to the CU 105-b-4 identifying the second DU 105-c-8 as a serving DU for the UE 115-f). In some examples, the first DU 105-c-7 may refrain from transmitting a keep alive signal to the UE 115-f after receipt of the pilot signal at 705, because measurement of the pilot signal by the first DU 105-c-7 indicates a strength of the pilot signal is below a threshold (e.g., too weak).

At 740, the CU 105-b-4 may transmit, to the first DU 105-c-7, a request for the first DU 105-c-7 to release any serving DU resources allocated for the UE 115-f. At 745, the first DU 105-c-7 may acknowledge receipt of the request transmitted at 740.

In the communication flow 700, the handover of the UE 115-f from the first DU 105-c-7 to the second DU 105-c-8 may be transparent to the UE 115-f. That is, the network side 750 (e.g., the CU 105-b-4, the first DU 105-c-7, and second DU 105-c-8) may initiate and complete the handover without involving the UE 115-f, and may signal completion of the handover by transmitting a keep alive signal to the UE 115-f from the second DU 105-c-8 instead of the first DU 105-c-7. The keep alive signal transmitted by the second DU 105-c-8 (or the first DU 105-c-7) may or may not identify the second DU 105-c-8 (or the first DU 105-c-7) to the UE 115-f.

In an alternative examples of the communication flow 700, the second DU 105-c-8 may transmit a keep alive signal to the UE 115-f prior to receiving the request at 725 (i.e., prior to receiving the request to operate as a serving DU (or cell) for the UE 115-f). More generally, a DU 105-c (including, for example, the first DU 105-c-7 and/or the second DU 105-c-4) may transmit a keep alive signal to the UE 115-f, regardless of whether the DU 105-c is the current serving DU for the UE 115-f. In these examples, the CU 105-b-4 may configure DUs 105-c to transmit keep alive signals to UEs 115 in an event driven manner. For example, a DU 105-c may be configured to transmit a keep alive signal to a UE 115 upon: 1) receiving a pilot signal from the UE 115 using a common set of resources, and 2) determining that the pilot signal satisfies one or more thresholds. The threshold(s) may include a received signal received power (RSRP) threshold, a received signal received quality (RSRQ) threshold, etc. Upon a DU 105-c determining that an RSRP or RSRQ of the pilot signal satisfies (e.g., exceeds) a respective RSRP threshold or RSRQ threshold, the DU 105-c may transmit a keep alive signal to the UE 115 using the common set of resources.

Configuring only serving DUs 105-c to transmit keep alive signals guarantees that a UE 115 receives a keep alive signal from only one DU 105-c. However, such a configuration incurs signaling overhead and can delay keep alive signal transmission (which may cause a UE 115 to stay awake for a longer period of time, and thus increase UE power consumption) or necessitate tighter backhaul requirements (e.g., a lower latency backhaul). Configuring all DUs 105-*c* to transmit keep alive signals to UEs 115, upon certain criteria being met, can mitigate the issues associated with transmitting keep alive signals only from serving DUs 105-*c*.

Figure 8:
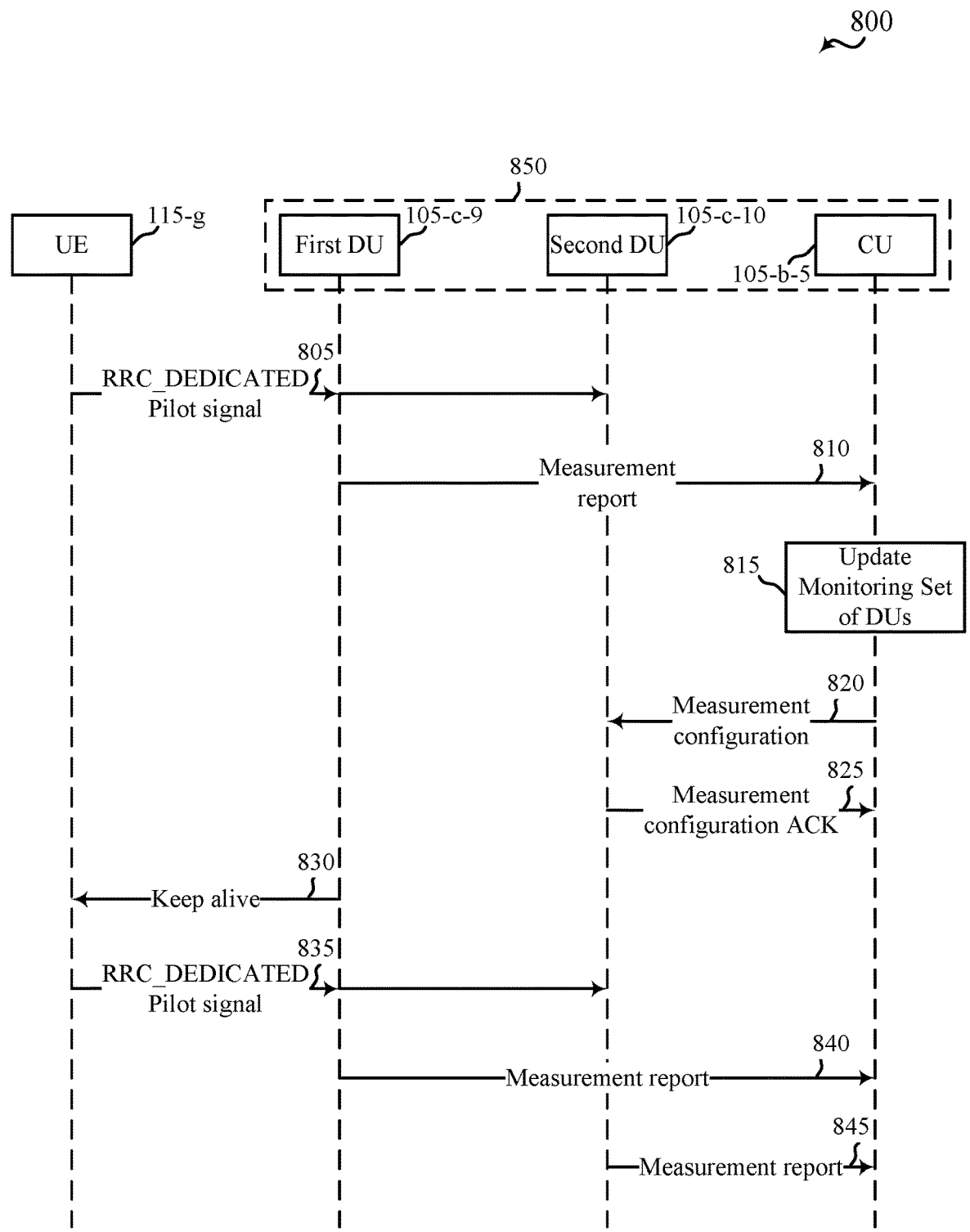
Figure 9:
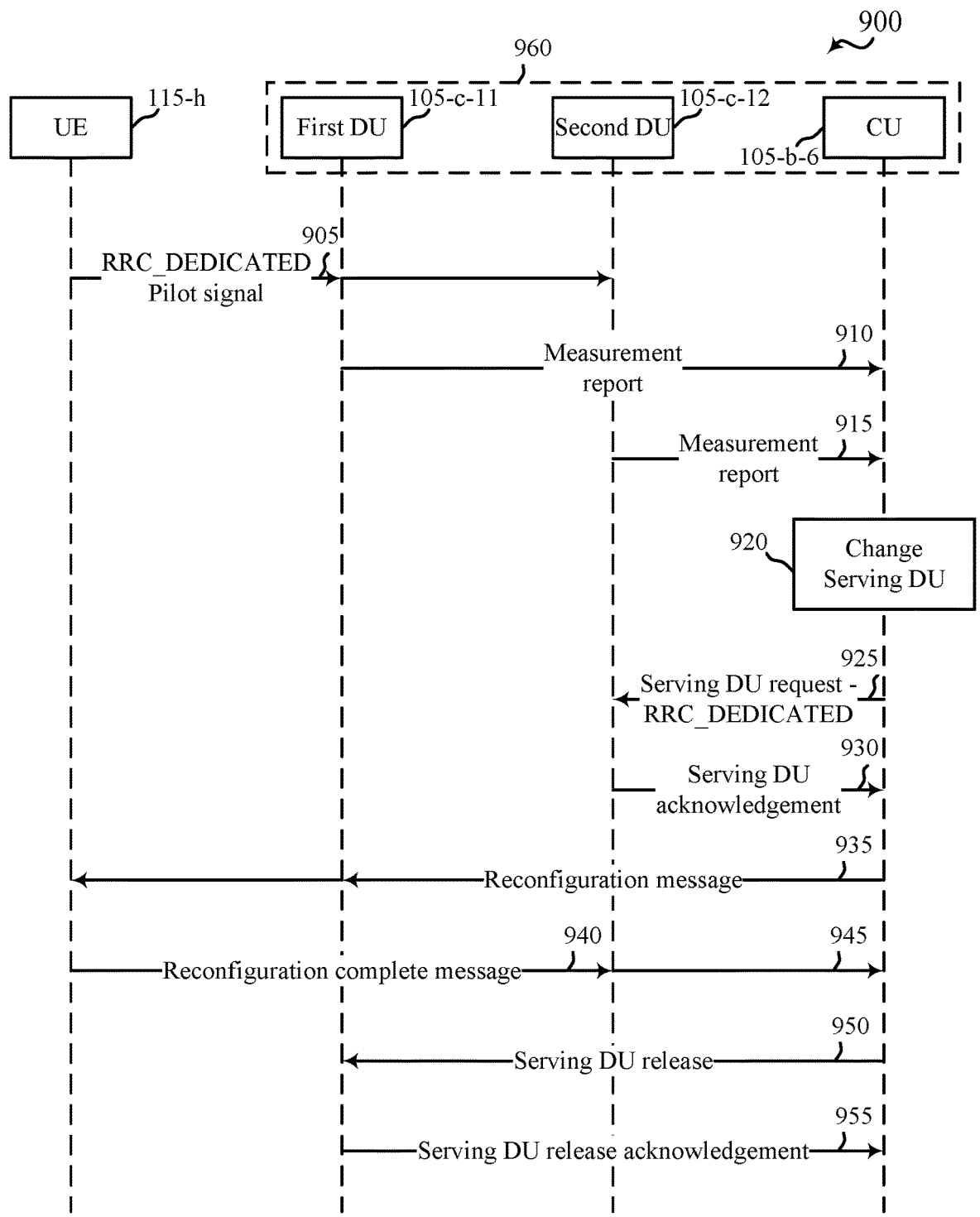

FIGS. 8 and 9 provide examples of UE, DU, and CU behaviors when a UE 115 operates in a radio resource configuration associated with transmitting pilot signals using a dedicated set of resources.

FIG. 8 shows an example of a communication flow 800 that supports uplink-based mobility, in accordance with various aspects of the present disclosure. As shown, communication flow 800 includes communication between a UE 115-*g*, a first DU 105-*c*-9, a second DU 105-*c*-10, and a CU 105-*b*-5. The UE 115-*g* may be an example of aspects of the UEs 115 described with reference to FIGS. 1 through 7; the first DU 105-*c*-9 and the second DU 105-*c*-10 may be examples of aspects of the DUs 105-*c* described with reference to FIGS. 1 through 7; and the CU 105-*b*-5 may be an example of aspects of the CUs 105-*b* described with reference to FIGS. 1 through 7. Each of the first DU 105-*c*-9 and the second DU 105-*c*-10 may operate in a common zone or overlapping zones, and may be associated with the CU 105-*b*-5. The communication flow 800 may commence with the UE 115-*g* operating with a radio resource configuration associated with transmitting pilot symbols using a dedicated set of resources (e.g., an RRC dedicated state), and with the first DU 105-*c*-9 operating as a serving DU (or serving cell) for the UE 115-*g*.

Because the UE 115-*g* is operating with a radio resource configuration associated with transmitting pilot signals using a dedicated set of resources, only DUs that the network-side 850 (e.g., the CU 105-*b*-5) has identified as members of a monitoring set (e.g., a monitoring set of cells, network access devices 105, DUs 105-*c*, etc.) may monitor for pilot signals transmitted by the UE 115-*g*, and DUs 105-*c* that are members of the monitoring set may monitor a dedicated set of resources for pilot signals transmitted by the UE 115-*g*. The communication flow 800 may commence with the first DU 105-*c*-9 being a member of the monitoring set of DUs for the UE 115-*g*, and second DU 105-*c*-10 not being a member of the monitoring set. In some examples, the DUs of the monitoring set of DUs for the UE 115-*g* may be identified based at least in part on measurements of at least one pilot signal transmitted by the UE 115-*g*, or a location of the identified serving DU (or cell) for the UE 115-*g*, or a combination thereof.

At 805, the UE 115-*g* may transmit a pilot signal using a dedicated set of resources while within the coverage area of the first DU 105-*c*-9 and the second DU 105-*c*-10. In some examples, the pilot signal may be configured according to a RRC DEDICATED pilot signal configuration. In some examples, the UE 115-*g* may receive an allocation of the dedicated set of resources (including, for example, the RRC DEDICATED pilot signal configuration) in a unicast message (e.g., on-demand system information by way of a MAC control element, an RRC message, a PHY message, a PDCCH command, etc.), or in a timing of the unicast message, or a combination thereof. In some examples, the pilot signal may identify the UE 115-*g* (e.g., explicitly, because the pilot signal includes an identifier of the UE 115-*g*, or implicitly, because the pilot signal is transmitted on a set of resources dedicated to the UE 115-*g*).

The pilot signal transmitted by the UE 115-*g* at 805 may be received and measured by the first DU 105-*c*-9. In some examples, the first DU 105-*c*-9 may measure a signal strength or signal quality of the pilot signal. In some examples, the first DU 105-*c*-9 may additionally determine whether the signal strength or signal quality of the pilot signal satisfies a threshold signal strength or signal quality. The first DU 105-*c*-9 may forward a measurement report including one or more measurements of the pilot signal (e.g., a measurement report including the signal strength, the signal quality, an indication of whether the signal strength satisfies the threshold signal strength, or an indication of whether the signal quality satisfies the threshold signal quality) to the CU 105-*b*-3 at 810. The pilot signal transmitted by the UE 115-*g* at 805 may also be received by the second DU 105-*c*-10, but because the second DU 105-*c*-10 is not a member of the monitoring set for the UE 115-*g*, the second DU 105-*c*-10 may ignore the pilot signal.

The CU 105-*b*-5 may determine, based on the measurement report received from the first DU 105-*c*-9 at 810, that the UE 115-*g* has moved and/or may be better served by a different serving DU. At 815, and based on its determination regarding the pilot signal transmitted by the UE 115-*g* (or the assessment of the pilot signal made by the first DU 105-*c*-9), the CU 105-*b*-5 may update the monitoring set of DUs for the UE 115-*g*. For example, the CU 105-*b*-5 may add the second DU 105-*c*-10 to the monitoring set of DUs for the UE 115-*g*. The second DU 105-*c*-10 may be a neighbor of the first DU 105-*c*-9.

At 820, the CU 105-*b*-5 may transmit, to the second DU 105-*c*-10, an indication that the second DU 105-*c*-10 is a member of the monitoring set of DUs for the UE 115-*g*. The indication may include, for example, a measurement configuration (e.g., an indication of a dedicated set of resources on which the UE 115-*g* may transmit pilot signals). At 825, the second DU 105-*c*-10 may acknowledge receipt of the indication transmitted at 820.

At 830, the first DU 105-*c*-9 may transmit a keep alive signal to the UE 115-*g* on dedicated resources (e.g., on a same frequency band, a same component carrier, a same set of subcarrier(s), a same set of resource block(s), and/or a same channel as the dedicated set of resources on which the pilot signal is transmitted at 805). In some examples, transmitting the keep alive signal may be based at least in part on the pilot signal transmitted at 805 (e.g., the keep alive signal may be transmitted to the UE 115-*g* in response to the first DU 105-*c*-9 receiving the pilot signal). In some examples, the keep alive signal transmitted at 830 may be transmitted before the measurement report is transmitted at 810.

At 835, the UE 115-*g* may transmit another pilot signal on the dedicated set of resources (e.g., on a same frequency band, a same component carrier, a same set of subcarrier(s), a same set of resource block(s), and/or a same channel as the dedicated set of resources on which the pilot signal is transmitted at 805). The pilot signal transmitted by the UE 115-*g* at 835 may be received and measured by both the first DU 105-*c*-9 and the second DU 105-*c*-10. The first DU 105-*c*-9 may forward a measurement report to the CU 105-*b*-5 at 840, and the second DU 105-*c*-10 may forward a measurement report to the CU 105-*b*-5 at 845.

The CU 105-*b*-5 may determine, based on the measurement reports received from the first DU 105-*c*-9 and the second DU 105-*c*-10 at 840 and 845, that the first DU 105-*c*-9 should remain the serving DU for the UE 115-*g*. In other examples, the CU 105-*b*-5 may determine to initiate a handover of the UE 115-*g* from the first DU 105-*c*-9 to the second DU 105-*c*-10 (or to another DU 105-*c*).

In some examples of the communication flow 800, a DU that is a member of the monitoring set of DUs for the UE 115-*g* may only transmit a measurement report to the CU 105-*b*-5 under certain conditions. For example, a DU may transmit a measurement report based at least in part on a periodic measurement reporting criteria and/or an event-driven measurement reporting criteria. A periodic measurement reporting criteria may indicate, for example, that a measurement report should be transmitted to the CU 105-*b*-5 for every pilot signal, for every nth pilot signal, or at periodic time intervals. An event-driven measurement reporting criteria may indicate, for example, that a measurement report should be transmitted upon the occurrence of one or more events, such as a determination that a signal strength or signal quality of a pilot signal no longer satisfies a threshold signal strength or threshold signal quality. In some examples, a periodic measurement reporting criteria or event-driven measurement reporting criteria may be included in an indication such as the indication transmitted at 820.

The communication flow 800 illustrates an addition of a radio to the monitoring set of DUs for the UE 115-*g*. A DU may also be removed from the monitoring set of DUs for the UE 115-*g*. Removal of a DU from the monitoring set of DUs may also be based on the measurement of one or more pilot signals transmitted by the UE 115-*g*, the locations of DUs, etc. In some examples, an update to the monitoring set of DUs for the UE 115-*g* may be initiated in combination with a change in the serving DU for the UE 115-*g*.

FIG. 9 shows an example of a communication flow 900 that supports uplink-based mobility, in accordance with various aspects of the present disclosure. As shown, communication flow 900 includes communication between a UE 115-*h*, a first DU 105-*c*-11, a second DU 105-*c*-12, and a CU 105-*b*-6. The UE 115-*h* may be an example of aspects of the UEs 115 described with reference to FIGS. 1 through 8; the first DU 105-*c*-11 and the second DU 105-*c*-12 may be examples of aspects of the DUs 105-*c* described with reference to FIGS. 1 through 8; and the CU 105-*b*-6 may be an example of aspects of the CUs 105-*b* described with reference to FIGS. 1 through 8. Each of the first DU 105-*c*-11 and the second DU 105-*c*-12 may operate in a common zone or overlapping zones, and may be associated with the CU 105-*b*-6. The communication flow 900 may commence with the UE 115-*h* operating with a radio resource configuration associated with transmitting pilot signals using a dedicated set of resources (e.g., an RRC dedicated state), and with the first DU 105-*c*-11 operating as a serving DU (or serving cell) for the UE 115-*h*.

Because the UE 115-*h* is operating with a radio resource configuration associated with transmitting pilot signals using a dedicated set of resources, only DUs that the network 960 (e.g., the CU 105-*b*-6) has identified as members of a monitoring set (e.g., a monitoring of cells or network access devices or DUs) may monitor for pilot signals transmitted by the UE 115-*h*, and the DUs that are members of the monitoring set may monitor a dedicated set of resources for pilot signals transmitted by the UE 115-*h*. The communication flow 900 may commence with the first DU 105-*c*-11 and the second DU 105-*c*-12 being members of the monitoring set of DUs for the UE 115-*h*. In some examples, the DUs of the monitoring set of DUs for the UE 115-*h* may be identified based at least in part on measurements of at least one pilot signal transmitted by the UE 115-*h*, or a location of the identified serving DU (or cell) for the UE 115-*h*, or a combination thereof.

At 905, the UE 115-*h* may transmit a pilot signal using a dedicated set of resources while within the coverage area of the first DU 105-*c*-11 and the second DU 105-*c*-12. In some examples, the pilot signal may be configured according to a RRC DEDICATED pilot signal configuration. In some examples, the UE 115-*h* may receive an allocation of the dedicated set of resources (including, for example, the RRC DEDICATED pilot signal configuration) in a unicast message (e.g., on-demand system information by way of a MAC control element, an RRC message, a PHY message, a PDCCH command, etc.), or a timing of the unicast message, or a combination thereof. In some examples, the pilot signal may identify the UE 115-*h* (e.g., explicitly, because the pilot signal includes an identifier of the UE 115-*h*, or implicitly, because the pilot signal is transmitted on a set of resources dedicated to the UE 115-*h*).

The pilot signal transmitted by the UE 115-*h* at 905 may be received and measured by both the first DU 105-*c*-11 and the second DU 105-*c*-12. In some examples, each of the first DU 105-*c*-11 and the second DU 105-*c*-12 may measure a signal strength or signal quality of the pilot signal. In some examples, the first DU 105-*c*-11 or the second DU 105-*c*-12 may additionally determine whether the signal strength or signal quality of the pilot signal satisfies a threshold signal strength or signal quality. The first DU 105-*c*-11 may forward a measurement report including one or more measurements of the pilot signal (e.g., a measurement report including the signal strength, the signal quality, an indication of whether the signal strength satisfies the threshold signal strength, or an indication of whether the signal quality satisfies the threshold signal quality) to the CU 105-*b*-6 at 910, and the second DU 105-*c*-12 may forward a measurement report to the CU 105-*b*-6 at 915.

The CU 105-*b*-6 may determine at 920, based on the measurement reports received from the first DU 105-*c*-11 and the second DU 105-*c*-12, that the second DU 105-*c*-12 would be a preferred serving DU (or serving cell) for the UE 115-*h*, and may initiate a serving cell change procedure (e.g., a handover of the UE 115-*h* from the first DU 105-*c*-11 to the second DU 105-*c*-12).

At 925, the CU 105-*b*-6 may transmit, to the second DU 105-*c*-12 (e.g., the target serving cell), a request for the second DU 105-*c*-12 to operate as a serving DU for the UE 115-*h*, which UE 115-*h* is operating in a RRC dedicated state. At 930, the second DU 105-*c*-12 may acknowledge the request transmitted at 925.

At 935, the CU 105-*b*-6 may transmit, to the first DU 105-*c*-11 (e.g., the source serving cell), a reconfiguration message for the UE 115-*h*. The RRC reconfiguration message may identify a dedicated set of resources to be used by the UE 115-*h* after a handover of the UE 115-*h* to the second DU 105-*c*-12. In various examples the reconfiguration message may include an RRC message, a MAC CE, a PHY message a PDCCH command, or a combination thereof. The first DU 105-*c*-11 may forward the RRC reconfiguration message to the UE 115-*h* (e.g., in a handover command), and thereby trigger a handover procedure at the UE 115-*h*. The UE 115-*h* may then perform a handover procedure according to the handover command and/or RRC reconfiguration message.

Upon completing the handover procedure, the UE 115-*h* may transmit a reconfiguration complete message to the second DU 105-*c*-12 at 940, and the second DU 105-*c*-12 may forward the reconfiguration complete message to the CU 105-*b*-6 at 945.

At 950, the CU 105-*b*-6 may transmit, to the first DU 105-*c*-11, a request for the first DU 105-*c*-11 to release any serving DU resources allocated for the UE 115-*h*. At 955, the first DU 105-*c*-11 may acknowledge receipt of the request transmitted at 950.

In the communication flow 900, the handover of the UE 115-*h* from the first DU 105-*c*-11 to the second DU 105-*c*-12 is not transparent to the UE 115-*h*. That is, the network side (e.g., the CU 105-*b*-6, the first DU 105-*c*-11, and/or the second DU 105-*c*-12) may initiate and complete the handover with involvement of the UE 115-*h*. However, compared to a handover of a UE in a LTE/LTE-A network, for example, the handover of the UE 115-*h* from the first DU 105-*c*-11 to the second DU 105-*c*-12 does not require the UE 115-*h* to transmit a measurement report based on signals received from its serving cell or neighboring cells, and does not require the UE 115-*h* to transmit an LTE/LTE-A Handover Message 1, 2, or 3.

Although not shown in FIG. 9, the serving DU for the UE 115-*h* may respond to pilot signals transmitted by the UE 115-*h* with keep alive signals, as described, for example, with reference to FIG. 8.

In a variation of the communication flow 900, the CU 105-*b*-6 may transmit the reconfiguration message to the second DU 105-*c*-12 (e.g., the target serving cell), and the second DU 105-*c*-12 may forward the reconfiguration message to the UE 115-*h* (e.g., in a handover command).

Figure 10:
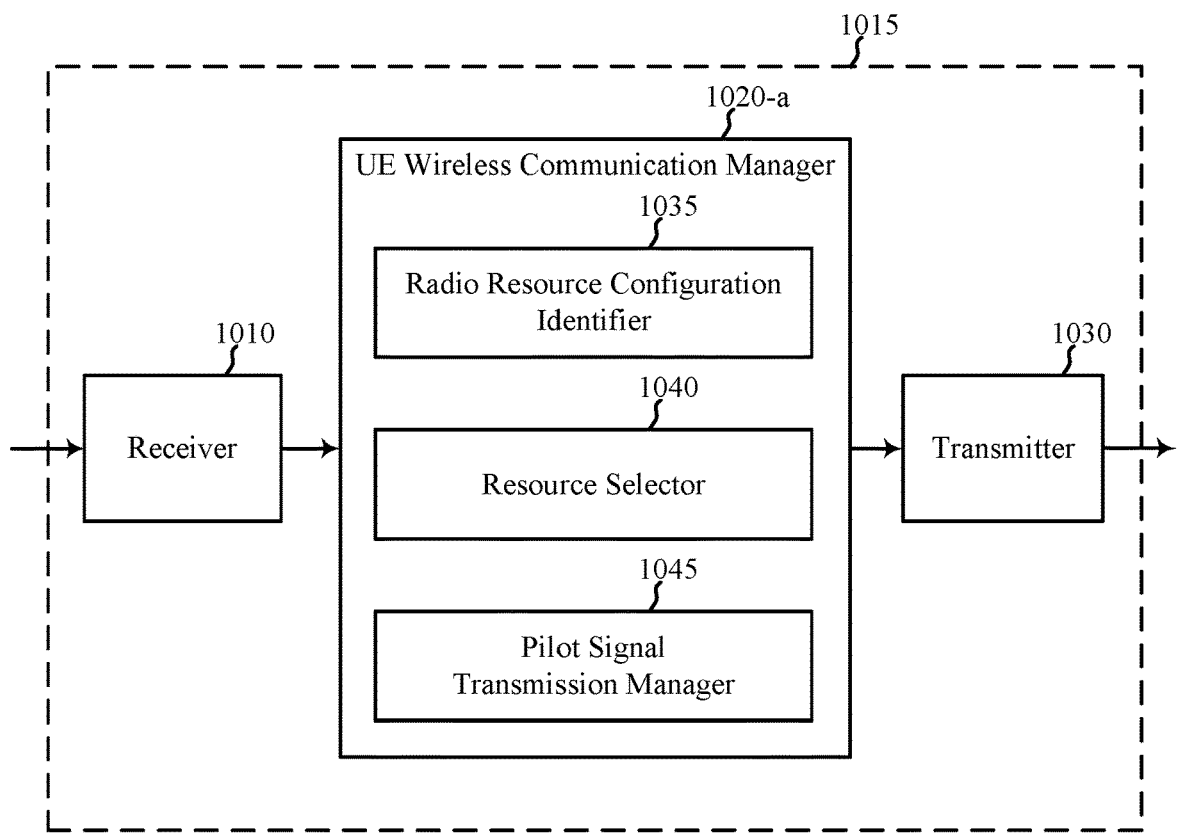
FIG. 10 shows a block diagram of an apparatus that supports uplink-based mobility, in accordance with various aspects of the present disclosure.

FIG. 10 shows a block diagram 1000 of an apparatus 1015 that supports uplink-based mobility, in accordance with various aspects of the present disclosure. The apparatus 1015 may be an example of aspects of one or more of the UEs 115 described with reference to FIGS. 1 through 9. The apparatus 1015 may also be or include a processor. The apparatus 1015 may include a receiver 1010, a UE wireless communication manager 1020-*a*, and a transmitter 1030. Each of these components may be in communication with each other.

The components of the apparatus 1015 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one radio frequency (RF) receiver, such as at least one RF receiver operable to receive transmissions over one or more radio frequency spectrum bands. In some examples, the receiver 1010 may include an array of antennas. In some examples, the one or more radio frequency spectrum bands may be used for LTE/LTE-A or 5G communications, as described, for example, with reference to FIGS. 1 through 9. The receiver 1010 may be used to receive various types of data or control signals (e.g., transmissions) over one or more communication links (or channels) of a wireless communication system, such as one or more communication links (or channels) of the wireless communication system 100, 300, or 400 described with reference to FIG. 1, 3, or 4. In some examples, the receiver 1010 may also or alternatively include one or more wired receivers.

In some examples, the transmitter 1030 may include at least one RF transmitter, such as at least one RF transmitter operable to transmit over one or more radio frequency spectrum bands. In some examples, the transmitter 1030 may include an array of antennas. In some examples, the one or more radio frequency spectrum bands may be used for LTE/LTE-A or 5G communications, as described, for example, with reference to FIGS. 1 through 9. The transmitter 1030 may be used to transmit various types of data or control signals (e.g., transmissions) over one or more communication links (or channels) of a wireless communication system, such as one or more communication links (or channels) of the wireless communication system 100, 300, or 400 described with reference to FIG. 1, 3, or 4. In some examples, the transmitter 1030 may also or alternatively include one or more wired transmitters.

In some examples, the UE wireless communication manager 1020-*a* may be used to manage one or more aspects of wireless communication for the apparatus 1015. In some examples, part of the UE wireless communication manager 1020-*a* may be incorporated into or shared with the receiver 1010 or the transmitter 1030. In some examples, the UE wireless communication manager 1020-*a* may be an example of aspects of the UE wireless communication manager 1020 described with reference to FIG. 1. The UE wireless communication manager 1020-*a* may include a radio resource configuration identifier 1035, a resource selector 1040, or a pilot signal transmission manager 1045.

In some examples, the radio resource configuration identifier 1035 may be used to identify, while a UE including the apparatus 1015 is in a connected mode with a network, a radio resource configuration of the UE. In some examples the radio resource configuration identifier 1035 may identify if a UE is operating in an RRC dedicated state or an RRC common state.

In some examples, the resource selector 1040 may be used to select a dedicated set of resources or a common set of resources for the UE based at least in part on the identified radio resource configuration. In some examples, the dedicated set of resources may be associated with a more granular periodicity than the common set of resources.

In some examples, the pilot signal transmission manager 1045 may be used to transmit (e.g., in cooperation with the transmitter 1030) a pilot signal to the network using the selected set of resources. In some examples, the pilot signal may be transmitted periodically based at least in part on a DTX configuration or a DRX configuration of the UE.

Figure 11:
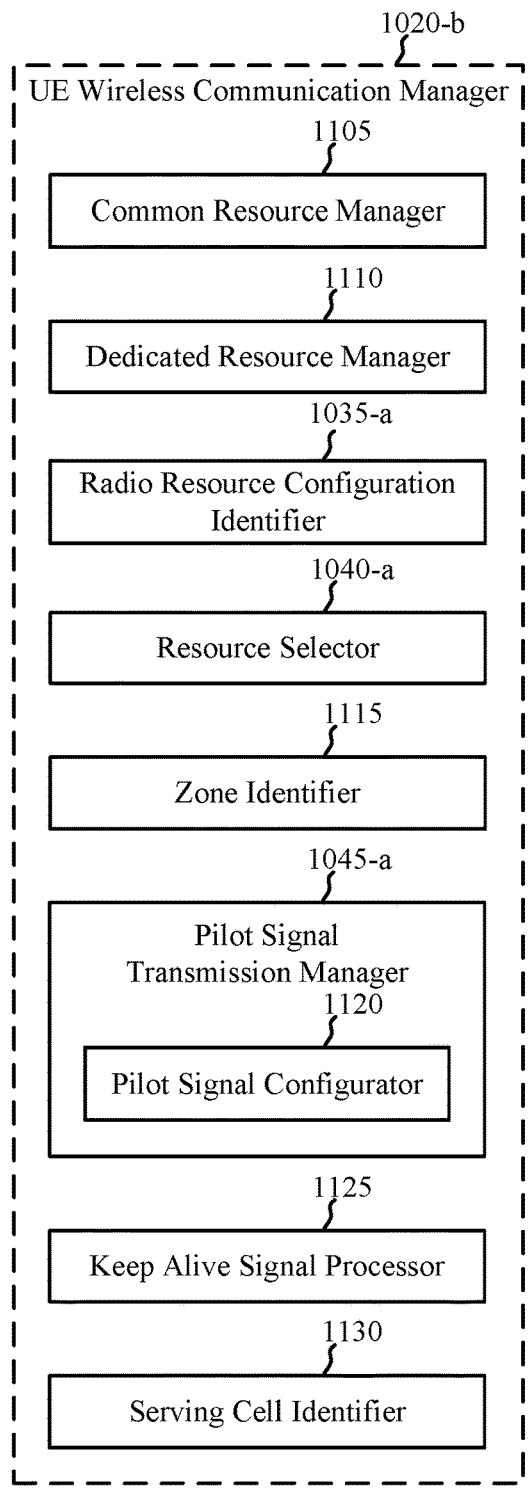
FIG. 11 shows a block diagram of a UE wireless communication manager that supports uplink-based mobility, in accordance with various aspects of the present disclosure.

FIG. 11 shows a block diagram 1100 of a UE wireless communication manager 1020-*b* that supports uplink-based mobility, in accordance with various aspects of the present disclosure. The UE wireless communication manager 1020-*b* may be an example of aspects of UE wireless communication managers 1020 described with reference to FIG. 1 or 10.

The components of the UE wireless communication manager 1020-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the UE wireless communication manager 1020-b may be used to manage one or more aspects of wireless communication for a UE or apparatus, such as one of the UEs 115 described with reference to FIGS. 1 through 9, or apparatus 1015 described with reference to FIG. 10. In some examples, part of the UE wireless communication manager 1020-b may be incorporated into or shared with a receiver or a transmitter (e.g., a receiver 1010 or a transmitter 1030 described with reference to FIG. 10). In some examples, the UE wireless communication manager 1020-b may include a common resource manager 1105, a dedicated resource manager 1110, a radio resource configuration identifier 1035-a, a resource selector 1040-a, a zone identifier 1115, a pilot signal transmission manager 1045-a, a pilot signal configurator 1120, a keep alive signal processor 1125, or a serving cell identifier 1130.

In some examples, the common resource manager 1105 may be used to receive (e.g., in cooperation with a receiver) an allocation of a common set of resources. In some examples, the allocation of the common set of resources may be received in at least one of a synchronization signal, system information (e.g., a SIB), a unicast message (e.g., on-demand system information by way of a MAC control element, an RRC message, a PHY message, a PDCCH command, etc.), or a combination thereof. In some examples, the allocation of the common set of resources may be identified based at least in part on a type of a UE in which the UE wireless communication manager 1020-b is included.

In some examples, the dedicated resource manager 1110 may be used to receive (e.g., in cooperation with a receiver) an allocation of a dedicated set of resources in at least one of a unicast message (e.g., on-demand system information by way of a MAC control element, an RRC message, a PHY message, a PDCCH command, etc.), a timing of a unicast message, or a combination thereof.

In some examples, the radio resource configuration identifier 1035-a may be used to identify, while the UE is in a connected mode with a network, a radio resource configuration of the UE. In some examples the radio resource configuration identifier 1035-a may identify if the UE is operating in a RRC dedicated state or a RRC common state.

In some examples, the resource selector 1040-a may be used to select a dedicated set of resources for the UE or a common set of resources for a plurality of UEs based at least in part on the identified state. In some examples, the dedicated set of resources may be associated with a more granular periodicity than the common set of resources.

In some examples, the zone identifier 1115 may be used to identify a zone in which the UE is located.

In some examples, the pilot signal transmission manager 1045-a may be used to transmit (e.g., in cooperation with a transmitter) a pilot signal to the network using the selected set of resources. In some examples, the pilot signal may be transmitted periodically based at least in part on a DTX configuration or a DRX configuration of the UE. In some examples, the pilot signal transmission manager 1045-a may include a pilot signal configurator 1120. The pilot signal configurator 1120 may be used to configure a pilot signal based at least in part on the identified zone.

The keep alive signal processor 1125 may be used to receive (e.g., in cooperation with a receiver) a keep alive signal using the selected set of resources. The keep alive signal may be received from a serving cell for the UE and may be based at least in part on the pilot signal (e.g., a network access device may identify itself or another network access device as the serving cell for the UE based at least in part on one or more measurements of the pilot signal).

The serving cell identifier 1130 may be used to identify the serving cell for the UE based at least in part on the keep alive signal.

Figure 12:
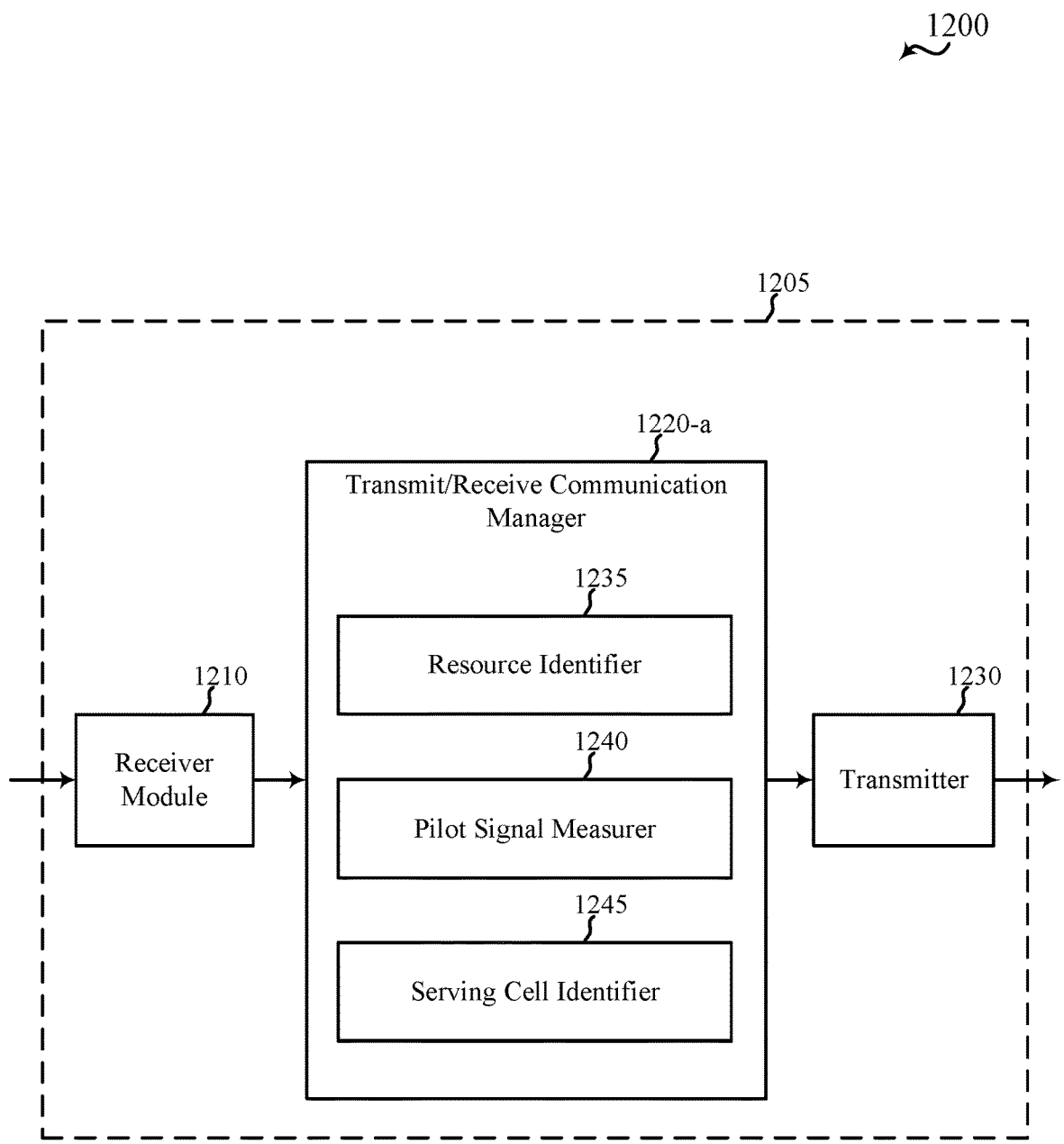
FIG. 12 shows a block diagram of an apparatus that supports uplink-based mobility, in accordance with various aspects of the present disclosure.

FIG. 12 shows a block diagram 1200 of an apparatus 1205 that supports uplink-based mobility, in accordance with various aspects of the present disclosure. The apparatus 1205 may be an example of aspects of one or more of the network access devices 105 (e.g., ANs 105-a, DUs 105-c, etc.) described with reference to FIGS. 1 through 9. The apparatus 1205 may also be or include a processor. The apparatus 1205 may include a receiver 1210, a transmit/receive communication manager 1220-a, or a transmitter 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over one or more radio frequency spectrum bands. In some examples, the receiver 1210 may include an array of antennas. In some examples, the one or more radio frequency spectrum bands may be used for LTE/LTE-A or 5G communications, as described, for example, with reference to FIGS. 1 through 9. The receiver 1210 may be used to receive various types of data or control signals (e.g., transmissions) over one or more communication links (or channels) of a wireless communication system, such as one or more communication links (or channels) of the wireless communication system 100, 300, or 400 described with reference to FIG. 1, 3, or 4. In some examples, the receiver 1210 may also or alternatively include one or more wired receivers.

In some examples, the transmitter 1230 may include at least one RF transmitter, such as at least one RF transmitter operable to transmit over one or more radio frequency spectrum bands. In some examples, the transmitter 1230 may include an array of antennas. In some examples, the one or more radio frequency spectrum bands may be used for LTE/LTE-A or 5G communications, as described, for example, with reference to FIGS. 1 through 9. The transmitter 1230 may be used to transmit various types of data or control signals (e.g., transmissions) over one or more communication links (or channels) of a wireless communication system, such as one or more communication links (or channels) of the wireless communication system 100, 300, or 400 described with reference to FIG. 1, 3, or 4. In some examples, the transmitter 1230 may also or alternatively include one or more wired transmitters.

In some examples, the transmit/receive communication manager 1220-a may be used to manage one or more aspects of wireless communication for the apparatus 1205. In some examples, part of the transmit/receive communication manager 1220-*a* may be incorporated into or shared with the receiver 1210 or the transmitter 1230. In some examples, the transmit/receive communication manager 1220-*a* may be an example of aspects of the transmit/receive communication manager 1220 described with reference to FIG. 1.

The apparatus 1205 may be included in a network access device 105 that is a member of a monitoring set of network access devices for each UE in a set of UEs. As UEs move within a network, the transmit/receive communication manager 1220-*a* may receive updates to the set of UEs. In some examples, the updates may be received from an access node controller. In some examples, the transmit/receive communication manager 1220-*a* may include a resource identifier 1235, a pilot signal measurer 1240, or a serving cell identifier 1245.

The resource identifier 1235 may be used to identify a common set of resources or a dedicated set of resources for UEs in communication with the apparatus 1205.

The pilot signal measurer 1240 may be used to measure pilot signals received from UEs on at least one dedicated set of resources, and pilot signals received from UEs using a common set of resources.

The serving cell identifier 1245 may be used to identify, based at least in part on pilot signal measurements, a set of UEs for which the network access device operates as a serving cell. In various examples, the set of UEs may include a UE configured to transmit pilot signals using a dedicated set of resources, a UE configured to transmit pilot signals using a common set of resources, or a combination thereof.

Figure 13:
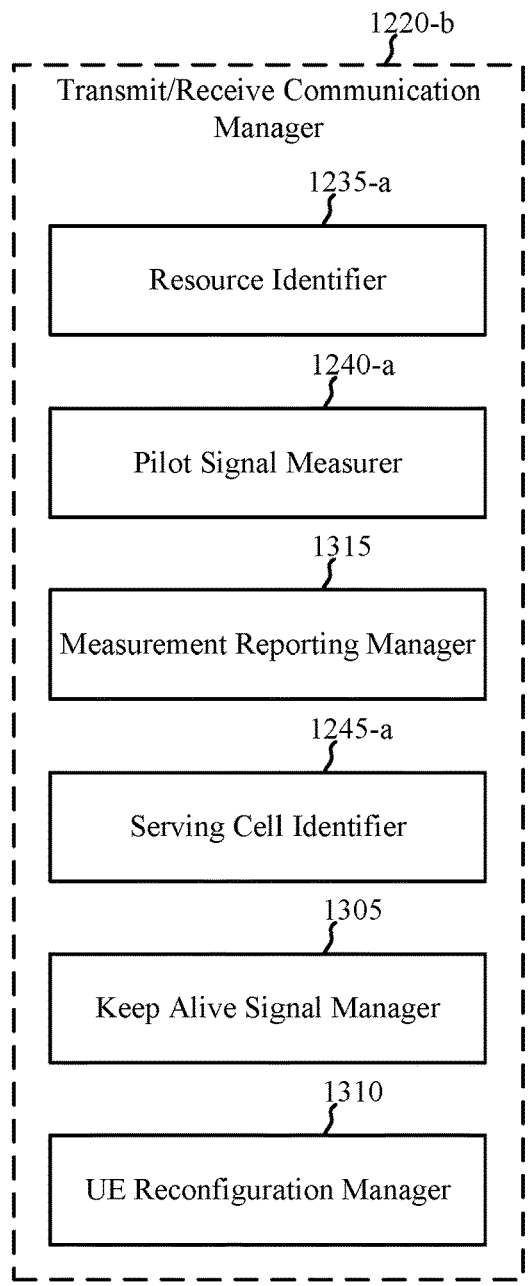
FIG. 13 shows a block diagram of a transmit/receive communication manager that supports uplink-based mobility, in accordance with various aspects of the present disclosure.

FIG. 13 shows a block diagram 1300 of a transmit/receive communication manager 1220-*b* that supports uplink-based mobility, in accordance with various aspects of the present disclosure. The transmit/receive communication manager 1220-*b* may be an example of aspects of transmit/receive communication managers 1220 described with reference to FIG. 1 or 12.

The components of the transmit/receive communication manager 1220-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the transmit/receive communication manager 1220-*b* may be used to manage one or more aspects of wireless communication for a network access device or apparatus, such as one of the network access devices 105 described with reference to FIGS. 1 through 9, or the apparatus 1205 described with reference to FIG. 12. In some examples, part of the transmit/receive communication manager 1220-*b* may be incorporated into or shared with a receiver or a transmitter (e.g., the receiver 1210 or the transmitter 1230 described with reference to FIG. 12).

The transmit/receive communication manager 1220-*b* may be included in a network access device 105 (e.g., an 105-*a*, a DU 105-*c*, etc.) that is a member of a monitoring set of network access devices for each UE in a set of UEs. As UEs move within a network, the transmit/receive communication manager 1220-*b* may receive updates to the set of UEs. In some examples, the updates may be received from a CU 105-*b*. In some examples, the transmit/receive communication manager 1220-*b* may include a resource identifier 1235-*a*, a pilot signal measurer 1240-*a*, an measurement reporting manager 1315, a serving cell identifier 1245-*a*, a keep alive signal manager 1305, or a UE reconfiguration manager 1310.

The resource identifier 1235-*a* may be used to identify a common set of resources or a dedicated set of resources for UEs in communication with the transmit/receive communication manager 1220-*b*.

The pilot signal measurer 1240-*a* may be used to measure pilot signals received from UEs on the at least one dedicated set of resources, and pilot signals received from UEs using a common set of resources.

The measurement reporting manager 1315 may be used to transmit (e.g., in cooperation with a transmitter) measurements of pilot signals to a CU. In some examples, measurements may be selected based at least in part on periodic measurement reporting criteria or event-driven measurement reporting criteria.

The serving cell identifier 1245-*a* may be used to identify, based at least in part on pilot signal measurements, a set of UEs for which the network access device operates as a serving cell. In various examples, the set of UEs may include a UE configured to transmit pilot signals using a dedicated set of resources, a UE configured to transmit pilot signals using a common set of resources, or a combination thereof. In some examples, the serving cell identifier 1245-*a* may receive additional measurements of pilot signals from at least one other network access device (e.g., when the transmit/receive communication manager 1220-*b* is included in a DU, the serving cell identifier 1245-*a* may receive measurements from other DUs). When additional measurements are received by the serving cell identifier 1245-*a*, the serving cell identifier 1245-*a* may identify the set of UEs based at least in part on the measurements made by the pilot signal measurer 1240-*a* and the additional measurements. In some examples, the serving cell identifier 1245-*a* may receive updates to the set of UEs from the CU. Thus, the serving cell identifier 1245-*a* may be configured to identify the UEs included in the set of UEs locally, at the transmit/receive communication manager 1220-*b*, and/or the serving cell identifier 1245-*a* may be configured to receive remote identifications of UEs to be included in the third set of UEs.

The keep alive signal manager 1305 may be used to transmit (e.g., in cooperation with a transmitter) a dedicated keep alive signal to each UE that is a member of both the first set of UEs and the third set of UEs. The keep alive signal manager 1305 may also or alternatively be used to transmit a common keep alive signal to each UE that is a member of both the second set of UEs and the third set of UEs.

In some examples, the UE reconfiguration manager 1310 may be used to receive (e.g., in cooperation with a receiver), from another network access device (e.g., a CU 105-*b*), a reconfiguration message for a UE. In these examples, the reconfiguration message may identify a reconfigured dedicated set of resources to be used, by the UE, after a handover of the UE from the network access device to a different network access device. The UE reconfiguration manager 1310 may also be used to receive, from an access node controller, a reconfiguration message for a UE that is being handed over to the network access device. In these examples, the reconfiguration message may identify a reconfigured dedicated set of resources to be used, by the UE, after a handover of the UE to the network access device, and the UE reconfiguration manager 1310 may add the UE to a set of UEs configured to transmit pilot signals using a dedicated set of resources, or a set of UEs for which a network access device including the transmit/receive communication manager 1220-b is a serving network access device. The UE reconfiguration manager 1310 may also be used to forward the reconfiguration message to the UE.

In some examples, the UE reconfiguration manager 1310 may be used to receive (e.g., in cooperation with a receiver) a reconfiguration complete message from a UE which has been handed over to the network access device that includes the transmit/receive communication manager 1220-b. The UE reconfiguration manager 1310 may also be used to add a UE to a set of UEs for which a network access device including the transmit/receive communication manager 1220-b is a serving network access device, and/or to forward the reconfiguration complete message to an access node controller.

Figure 14:
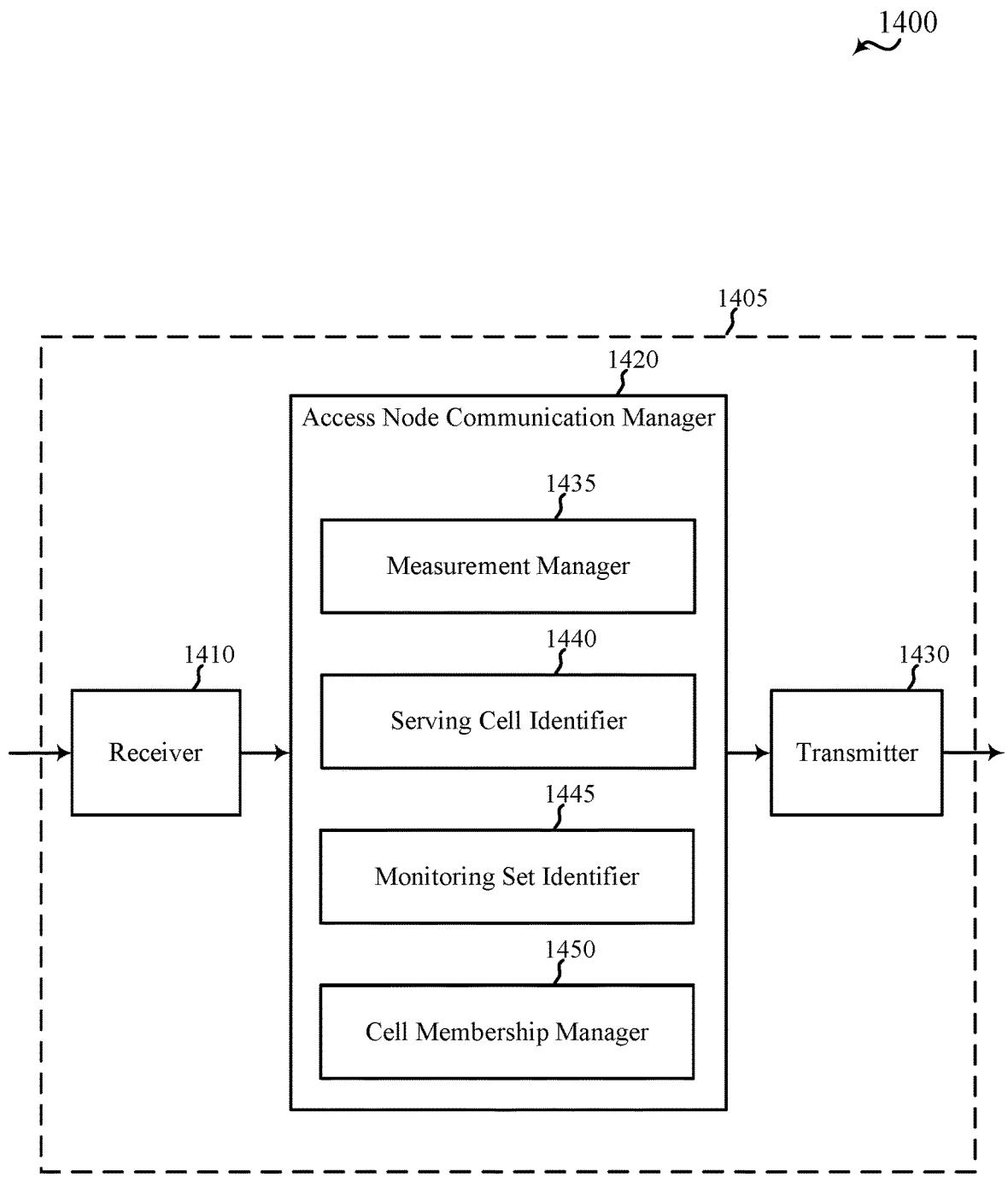
FIG. 14 shows a block diagram of an apparatus that supports uplink-based mobility, in accordance with various aspects of the present disclosure.

FIG. 14 shows a block diagram 1400 of an apparatus 1405 that supports uplink-based mobility, in accordance with various aspects of the present disclosure. The apparatus 1405 may be an example of aspects of one or more of the network access devices 105 (e.g., ANs 105-*a*, CUs 105-*b*, etc.) described with reference to FIGS. 1 through 9. The apparatus 1405 may also be or include a processor. The apparatus 1405 may include a receiver 1410, a access node communication manager 1420-*a*, or a transmitter 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1410 may include at least one RF receiver, such as at least one RF receiver operable to receive transmissions over one or more radio frequency spectrum bands. In some examples, the receiver 1410 may include an array of antennas. In some examples, the one or more radio frequency spectrum bands may be used for LTE/LTE-A or 5G communications, as described, for example, with reference to FIGS. 1 through 9. The receiver 1410 may be used to receive various types of data or control signals (i.e., transmissions) over one or more communication links (or channels) of a wireless communication system, such as one or more communication links (or channels) of the wireless communication system 100, 300, or 400 described with reference to FIG. 1, 3, or 4. In some examples, the receiver 1410 may also or alternatively include one or more wired receivers.

In some examples, the transmitter 1430 may include at least one RF transmitter, such as at least one RF transmitter operable to transmit over one or more radio frequency spectrum bands. In some examples, the transmitter 1430 may include an array of antennas. In some examples, the one or more radio frequency spectrum bands may be used for LTE/LTE-A or 5G communications, as described, for example, with reference to FIGS. 1 through 9. The transmitter 1430 may be used to transmit various types of data or control signals (i.e., transmissions) over one or more communication links (or channels) of a wireless communication system, such as one or more communication links (or channels) of the wireless communication system 100, 300, or 400 described with reference to FIG. 1, 3, or 4. In some examples, the transmitter 1430 may also or alternatively include one or more wired transmitters.

In some examples, the access node communication manager 1420-*a* may be used to manage one or more aspects of wireless communication for the apparatus 1405. In some examples, part of the access node communication manager 1420-*a* may be incorporated into or shared with the receiver 1410 or the transmitter 1430. In some examples, the access node communication manager 1420-*a* may be an example of aspects of the access node communication manager 1420 described with reference to FIG. 1. In some examples, the access node communication manager 1420-*a* may include a measurement manager 1435, a serving cell identifier 1440, a monitoring set identifier 1445, or a cell membership manager 1450.

The measurement manager 1435 may be used to receive measurements from each cell of a plurality of cells. The measurements may include measurements of a first set of pilot signals transmitted by a first set of UEs operating with a radio resource configuration associated with transmitting pilot signals using a dedicated set of resources while connected to a network, and measurements of a second set of pilot signals transmitted by a second set of UEs operating with a radio resource configuration associated with transmitting pilot signals using a common set of resources while connected to the network.

The serving cell identifier 1440 may be used to identify, for each UE in the first set of UEs and each UE in the second set of UEs, based at least in part on the measurements, a serving cell for the UE.

The monitoring set identifier 1445 may be used to identify monitoring sets of cells to monitor for pilot signals transmitted by UEs. In some examples, a monitoring set of cells to monitor for pilot signals transmitted by a UE may be identified based at least in part on measurements of at least one pilot signal transmitted by the UE, or a location of the identified serving cell for the UE, or a combination thereof.

The cell membership manager 1450 may be used to indicate, to each cell, a set of UEs for which the cell is a serving cell, and a set of UEs for which the cell is a member of a monitoring set of cells for the UE.

Figure 15:
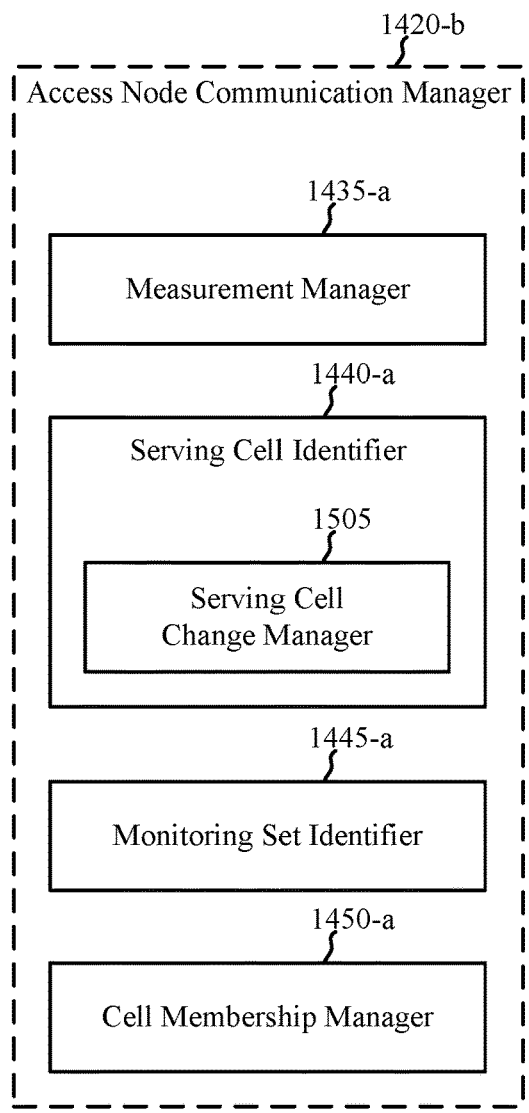
FIG. 15 shows a block diagram of an access node communication manager that supports uplink-based mobility, in accordance with various aspects of the present disclosure.

FIG. 15 shows a block diagram 1500 of a access node communication manager 1420-*b* for use in wireless communication, in accordance with various aspects of the present disclosure. The access node communication manager 1420-*b* may be an example of aspects of the access node communication manager 1420 described with reference to FIG. 1 or 14.

The components of the access node communication manager 1420-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the access node communication manager 1420-*b* may be used to manage one or more aspects of wireless communication for a network access device or apparatus, such as one of the network access devices 105 described with reference to FIGS. 1 through 9, or apparatus 1405 described with reference to FIG. 14. In some examples, part of the access node communication manager 1420-*b* may be incorporated into or shared with a receiver or a transmitter (e.g., the receiver 1410 or the transmitter 1430 described with reference to FIG. 14). In some examples, the access node communication manager 1420-*b* may include a measurement manager 1435-*a*, a serving cell identifier 1440-*a*, a monitoring set identifier 1445-*a*, or a cell membership manager 1450-*a*.

The measurement manager 1435-*a* may be used to receive measurements from each cell of a plurality of cells. The measurements may include measurements of a first set of pilot signals transmitted by a first set of UEs operating with a radio resource configuration associated with transmitting pilot signals using a dedicated set of resources while connected to a network, and measurements of a second set of pilot signals transmitted by a second set of UEs operating with a radio resource configuration associated with transmitting pilot signals using a common set of resources while connected to the network.

The serving cell identifier 1440-*a* may be used to identify, for each UE in the first set of UEs and each UE in the second set of UEs, based at least in part on the measurements, a serving cell for the UE. In some examples, the serving cell identifier 1440-*a* may include a serving cell change manager 1505. The serving cell change manager 1505 may be used to identify a change in a serving cell for a UE in the first set of UEs, and initiate a serving cell change procedure for the UE upon identifying the change in the serving cell. In some examples, initiating the serving cell change procedure may include transmitting to the UE, through a source serving cell for the UE, a reconfiguration message for the UE. In some examples, initiating the serving cell change procedure may include transmitting to the UE, through a target serving cell for the UE, a reconfiguration message for the UE. The RRC reconfiguration message may identify a dedicated set of resources to be used, by the UE, after a handover of the UE to a target serving cell.

The monitoring set identifier 1445-*a* may be used to identify monitoring sets of cells to monitor for pilot signals transmitted by UEs. In some examples, a monitoring set of cells to monitor for pilot signals transmitted by a UE may be identified based at least in part on measurements of at least one pilot signal transmitted by the UE, or a location of the identified serving cell for the UE, or a combination thereof.

The cell membership manager 1450-*a* may be used to indicate, to each cell, a set of UEs for which the cell is a serving cell, and a set of UEs for which the cell is a member of a monitoring set of cells for the UE.

Figure 16:
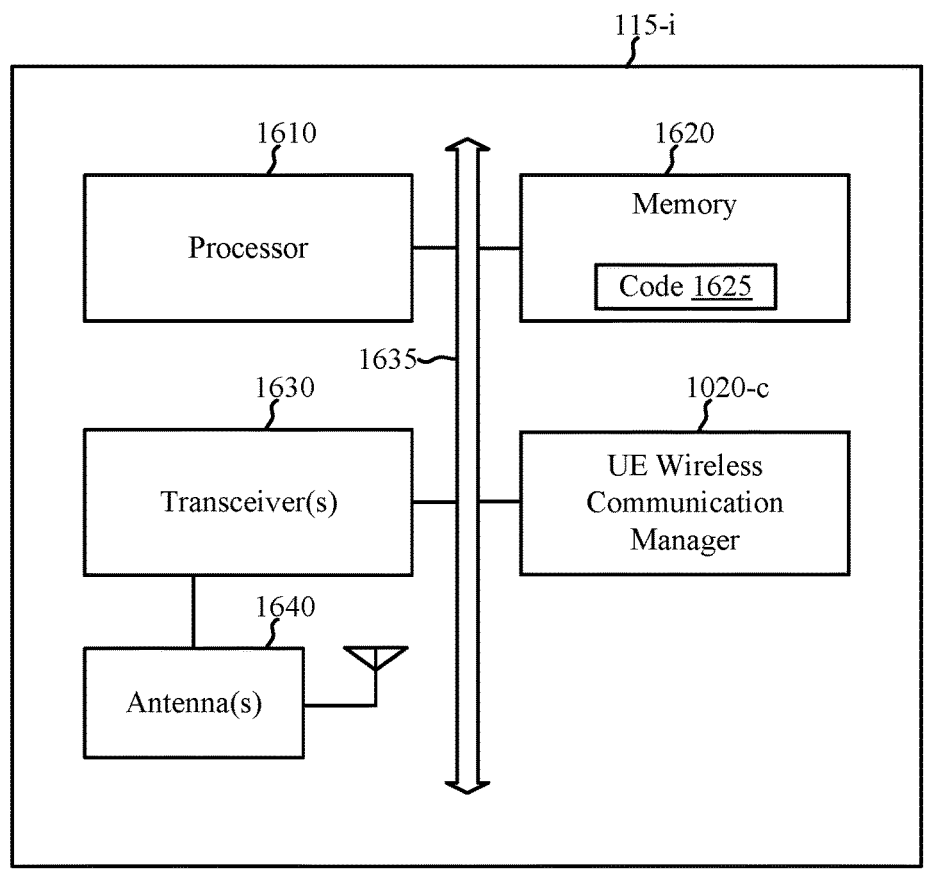
FIG. 16 shows a block diagram of a UE that supports uplink-based mobility, in accordance with various aspects of the present disclosure.

FIG. 16 shows a block diagram 1600 of a UE 115-*i* that supports uplink-based mobility, in accordance with various aspects of the present disclosure. The UE 115-*i* may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-*i* may, in some examples, have an internal power supply (not shown), such as a small battery, to facilitate mobile operation. In some examples, the UE 115-*i* may be an example of aspects of one or more of the UEs 115 described with reference to FIGS. 1 through 9, or the apparatus 1015 described with reference to FIG. 10. The UE 115-*i* may be configured to implement at least some of the UE or apparatus techniques and functions described with reference to FIGS. 1 through 11.

The UE 115-*i* may include a processor 1610, a memory 1620, at least one transceiver (represented by transceiver(s) 1630), at least one antenna (represented by antenna(s) 1640), or a UE wireless communication manager 1020-*c*. Each of these components may be in communication with each other, directly or indirectly, over one or more buses 1635.

The memory 1620 may include random access memory (RAM) or read-only memory (ROM). The memory 1620 may store computer-readable, computer-executable code 1625 containing instructions that are configured to, when executed, cause the processor 1610 to perform various functions described herein related to wireless communication, including, for example, at least some of the UE techniques and functions described with reference to FIGS. 1 through 11. Alternatively, the computer-executable code 1625 may not be directly executable by the processor 1610 but be configured to cause the UE 115-*i* (e.g., when compiled and executed) to perform various of the functions described herein.

The processor 1610 may include an intelligent hardware device (e.g., a central processing unit (CPU), a microcontroller, an ASIC, etc.). The processor 1610 may process information received through the transceiver(s) 1630 or information to be sent to the transceiver(s) 1630 for transmission through the antenna(s) 1640. The processor 1610 may handle, alone or in connection with the UE wireless communication manager 1020-*c*, various aspects of communicating over (or managing communications over) one or more radio frequency spectrum bands.

The transceiver(s) 1630 may include a modem configured to modulate packets and provide the modulated packets to the antenna(s) 1640 for transmission, and to demodulate packets received from the antenna(s) 1640. The transceiver(s) 1630 may, in some examples, be implemented as one or more transmitters and one or more separate receivers. The transceiver(s) 1630 may support communications in one or more radio frequency spectrum bands. The transceiver(s) 1630 may be configured to communicate bi-directionally, via the antenna(s) 1640, with one or more of the network access devices 105 (e.g., one or more ANs 105-*a*, one or more DUs 105-*c*, etc.) described with reference to FIGS. 1 through 9, or one or more of the apparatuses 1205 or 1405 described with reference to FIG. 12 or 14. While the UE 115-*i* may include a single antenna, there may be examples in which the UE 115-*i* may include multiple antennas 1640.

The UE wireless communication manager 1020-*c* may be configured to perform or control some or all of the UE or apparatus techniques or functions described with reference to FIGS. 1 through 11 related to wireless communication over one or more radio frequency spectrum bands. The UE wireless communication manager 1020-*c*, or portions of it, may include a processor, or some or all of the functions of the UE wireless communication manager 1020-*c* may be performed by the processor 1610 or in connection with the processor 1610. In some examples, the UE wireless communication manager 1020-*c* may be an example of the UE wireless communication manager 1020 described with reference to FIG. 1, 10, or 11.

Figure 17:
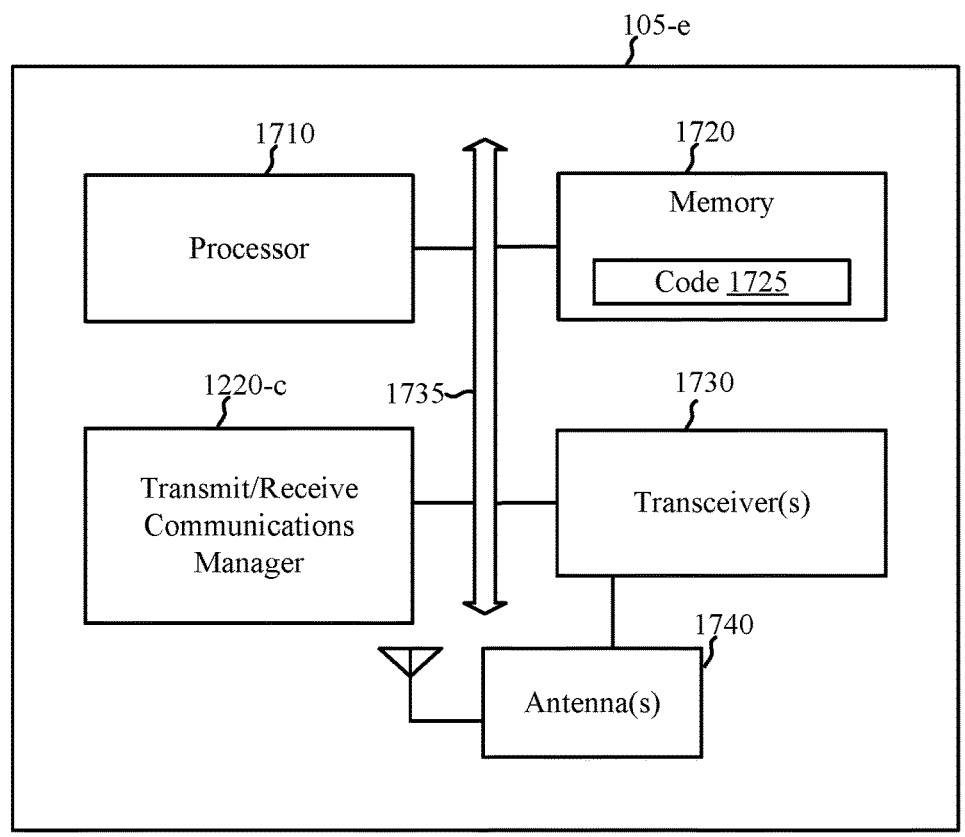
FIGS. 17 and 18 show block diagrams of network access devices that support uplink-based mobility, in accordance with various aspects of the present disclosure.

FIG. 17 shows a block diagram 1700 of a network access device 105-*e* that supports uplink-based mobility, in accordance with various aspects of the present disclosure. In some examples, the network access device 105-*w* may be an example of aspects of one or more of the ANs 105-*a* or DUs 105-*c* described with reference to FIGS. 1 through 9, or the apparatus 1205 described with reference to FIG. 12. The network access device 105-*e* may be configured to implement at least some of the network access device, DU or apparatus techniques and functions described with reference to FIG. 1-9, 12, or 13.

The network access device 105-*e* may include a processor 1710, a memory 1720, at least one transceiver (represented by transceiver(s) 1730), at least one antenna (represented by antenna(s) 1740), or a transmit/receive communication manager 1220-*c*. Each of these components may be in communication with each other, directly or indirectly, over one or more buses 1735.

The memory 1720 may include RAM or ROM. The memory 1720 may store computer-readable, computer-executable code 1725 containing instructions that are configured to, when executed, cause the processor 1710 to perform various functions described herein related to wireless communication, including, for example, at least some of the network access device, DU, or apparatus techniques and functions described with reference to FIGS. 1 through 13. Alternatively, the computer-executable code 1725 may not be directly executable by the processor 1710 but be configured to cause the network access device 105-*e* (e.g., when compiled and executed) to perform various of the functions described herein.

The processor 1710 may include an intelligent hardware device (e.g., a CPU, a microcontroller, an ASIC, etc.) The processor 1710 may process information received through the transceiver(s) 1730 or information to be sent to the transceiver(s) 1730 for transmission through the antenna(s) 1740. The processor 1710 may handle, alone or in connection with the transmit/receive communication manager 1220-*c*, various aspects of communicating over (or managing communications over) one or more radio frequency spectrum bands.

The transceiver(s) 1730 may include a modem configured to modulate packets and provide the modulated packets to the antenna(s) 1740 for transmission, and to demodulate packets received from the antenna(s) 1740. The transceiver(s) 1730 may, in some examples, be implemented as one or more transmitters and one or more separate receivers. The transceiver(s) 1730 may support communications in one or more radio frequency spectrum bands. The transceiver(s) 1730 may be configured to communicate bi-directionally, via the antenna(s) 1740, with one or more of the UEs 115 described with reference to FIGS. 1 through 9, or apparatus 1015 described with reference to FIG. 10. While the network access device 105-*e* may include a single antenna, there may be examples in which the network access device 105-*e* may include multiple antennas 1740.

The transmit/receive communication manager 1220-*c* may be configured to perform or control some or all of the network access device, DU, or apparatus techniques or functions described with reference to FIG. 1-9, 12, or 13 related to wireless communication over one or more radio frequency spectrum bands. The transmit/receive communication manager 1220-*c* may also be used to manage communications with a CU associated with the network access device 105-*w*. The communications with the CU may be over wired or wireless communication links, for example, depending on implementation. The transmit/receive communication manager 1220-*c*, or portions of it, may include a processor, or some or all of the functions of the transmit/receive communication manager 1220-*c* may be performed by the processor 1710 or in connection with the processor 1710. In some examples, the transmit/receive communication manager 1220-*c* may be an example of the transmit/receive communication manager 1220 described with reference to FIG. 1, 12, or 13.

Figure 18:
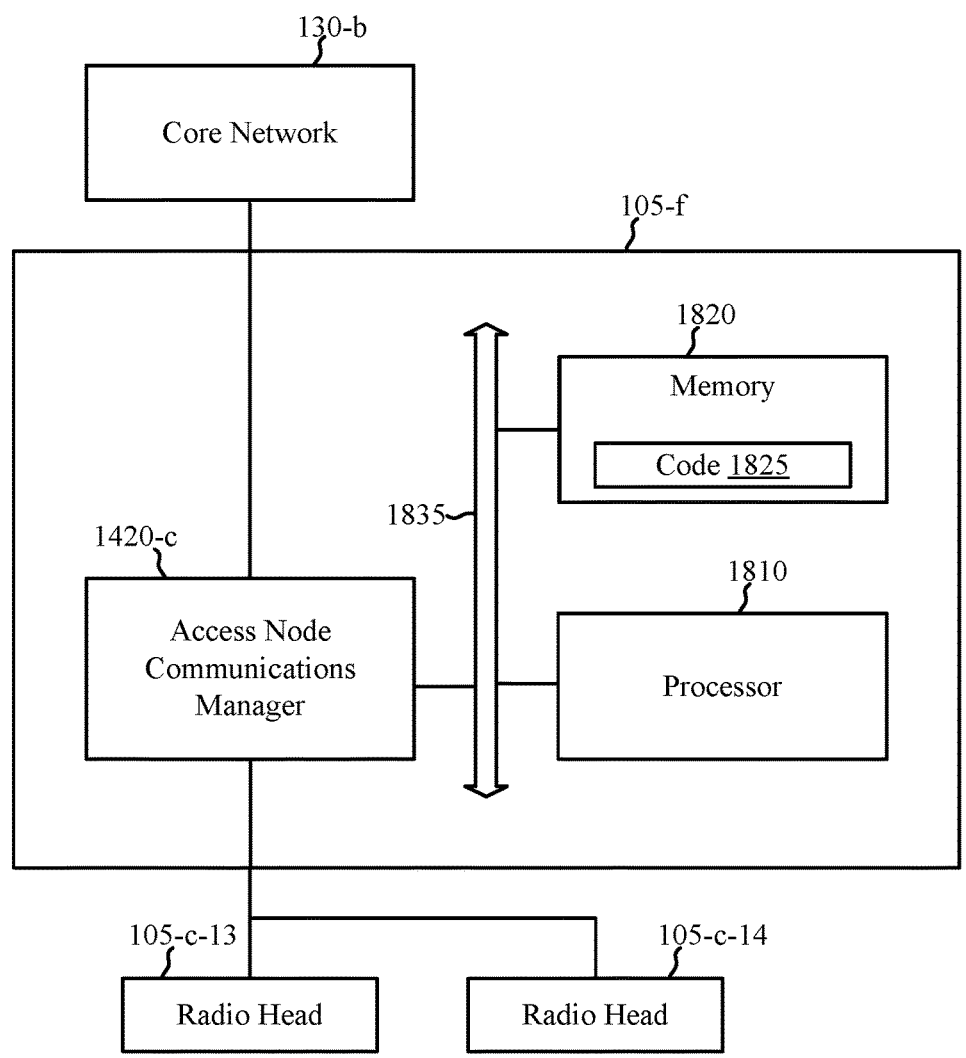

FIG. 18 shows a block diagram 1800 of a network access device 105-*f* that supports uplink-based mobility, in accordance with various aspects of the present disclosure. In some examples, the network access device 105-*f* may be an example of aspects of one or more of the ANs 105-*a* or CUs 105-*b* described with reference to FIGS. 1 through 9, or the apparatus 1405 described with reference to FIG. 14. The network access device 105-*f* may be configured to implement or facilitate at least some of the network access device, CU, or apparatus techniques and functions described with reference to FIG. 1-9, 14, or 15.

The CU 105-*f* may include a processor 1810, a memory 1820, or a access node communication manager 1420-*c*. Each of these components may be in communication with each other, directly or indirectly, over one or more buses 1835.

The memory 1820 may include RAM or ROM. The memory 1820 may store computer-readable, computer-executable code 1825 containing instructions that are configured to, when executed, cause the processor 1810 to perform various functions described herein related to wireless communication, including, for example, at least some of the network access device, CU, or apparatus techniques and functions described with reference to FIG. 1-9, 14, or 15. Alternatively, the computer-executable code 1825 may not be directly executable by the processor 1810 but be configured to cause the network access device 105-*f* (e.g., when compiled and executed) to perform various of the functions described herein.

The processor 1810 may include an intelligent hardware device (e.g., a CPU, a microcontroller, an ASIC, etc.). The processor 1810 may process information received through the access node communication manager 1420-*c* from a core network 130-*b*, or from one or more other network access devices 105 (e.g., from one or more DUs, such as DU 105-*c*-13 or DU 105-*c*-14, or from one or more other CUs 105-*b*). The processor 1810 may also process information to be sent to the access node communication manager 1420-*c*, for transmission to the core network 130-*b* or to one or more other network access devices 105 (e.g., to one or more DUs, such as DU 105-*c*-13 or DU 105-*c*-14, or to one or more other CUs 105-*b*). The processor 1810 may handle, alone or in connection with the access node communication manager 1420-*c*, various aspects of communicating over (or managing communications over) one or more radio frequency spectrum bands.

The access node communication manager 1420-*c* may be configured to perform or control some or all of the techniques or functions described with reference to FIG. 1-9, 14, or 15 related to wireless communication over one or more radio frequency spectrum bands. The access node communication manager 1420-*c* may also be used to manage communications with a network (e.g., the core network 130-*b*), one or more DUs (e.g., DU 105-*c*-13 or DU 105-*c*-14), or one or more other CUs 105-*b*. The communications with the network, DUs, or other CUs may be over wired or wireless communication links, for example, depending on implementation. The access node communication manager 1420-*c*, or portions of it, may include a processor, or some or all of the functions of the access node communication manager 1420-*c* may be performed by the processor 1810 or in connection with the processor 1810. In some examples, the access node communication manager 1420-*c* may be an example of the access node communication manager 1420 described with reference to FIG. 1, 14, or 15.

Figure 19:
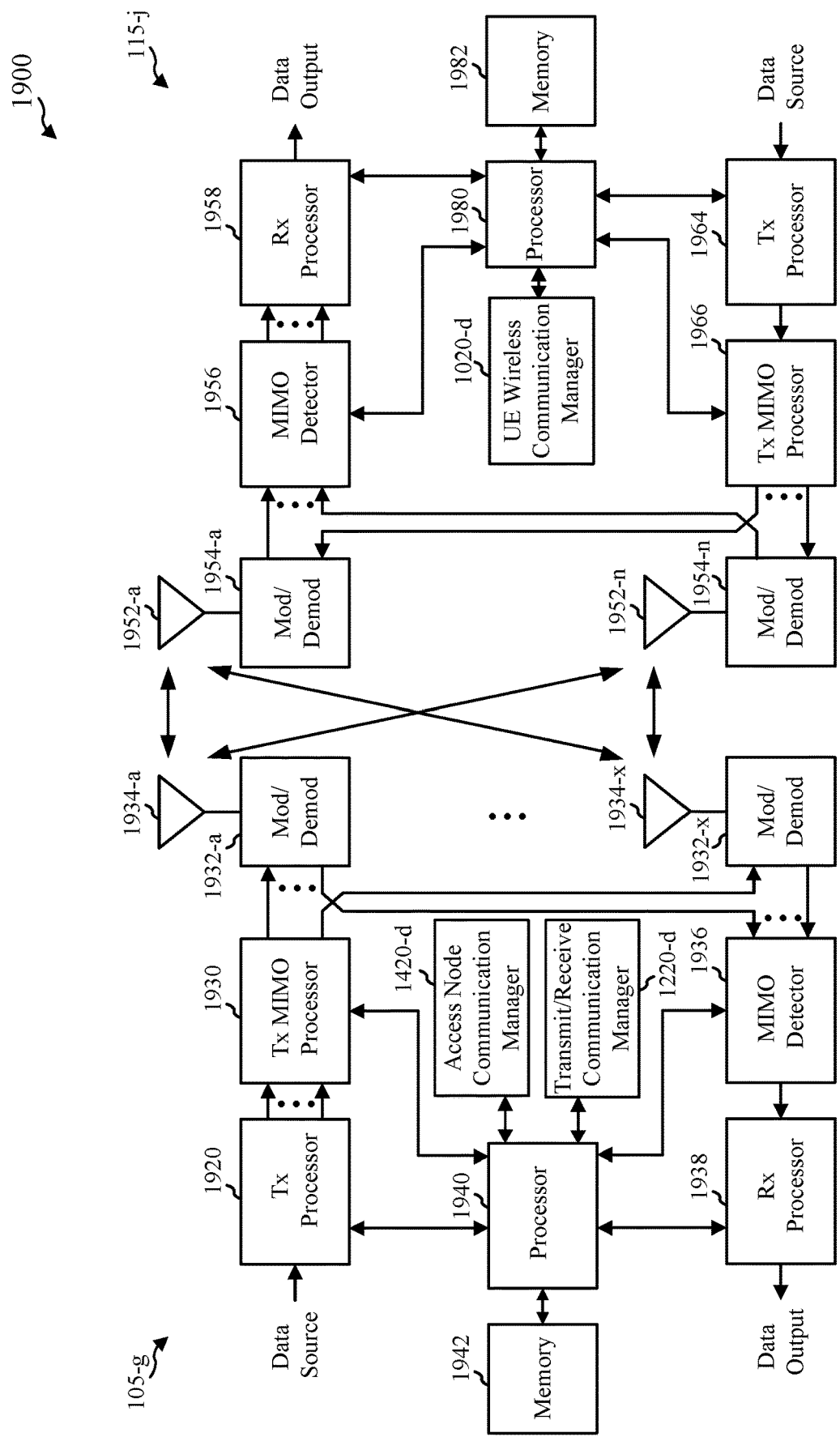
FIG. 19 is a block diagram of a multiple-input multiple-output (MIMO) communication system that supports uplink-based mobility, in accordance with various aspects of the present disclosure.

FIG. 19 is a block diagram of a MIMO communication system 1900 that supports uplink-based mobility, in accordance with various aspects of the present disclosure. The MIMO communication system 1900 may include a network access device 105-*g* and a UE 115-*j*. The MIMO communication system 1900 may illustrate aspects of the wireless communication system 100, 300, or 400 shown in FIG. 1, 3, or 4. In some examples, the network access device 105-*g* may be an example of one or more aspects of a network access device (e.g., an 105-*a*, a CU 105-*b*, a DU 105-*c*, or a base station), such as one of the network access devices 105 described with reference to FIGS. 1 through 9, or the apparatuses 1205 or 1405 described with reference to FIG. 12 or 14. The network access device 105-*g* may be equipped with antennas 1934-*a* through 1934-*x*, and the UE 115-*j* may be equipped with antennas 1952-*a* through 1952-*n*. In the MIMO communication system 1900, the network access device 105-*g* may be able to send data over multiple communication links at the same time. Each communication link may be called a "layer" and the "rank" of the communication link may indicate the number of layers used for communication. For example, in a 2×2 MIMO communications system where network access device 105-*g* transmits two "layers," the rank of the communication link between the network access device 105-*g* and the UE 115-*j* is two.

At the network access device 105-*g*, a transmit processor 1920 may receive data from a data source. The transmit processor 1920 may process the data. The transmit processor 1920 may also generate control symbols and/or reference symbols. A transmit (Tx) MIMO processor 1930 may perform spatial processing (e.g., precoding) on data symbols, control symbols, and/or reference symbols, if applicable, and may provide output symbol streams to the transmit modulator/demodulators (Mod/Demod) 1932-*a* through 1932-*x*. Each modulator/demodulator 1932 may process a respective output symbol stream (e.g., for OFDM, etc.) to obtain an output sample stream. Each modulator/demodulator 1932 may further process (e.g., convert to analog, amplify, filter, and upconvert) the output sample stream to obtain a DL signal. In one example, DL signals from modulator/demodulators 1932-*a* through 1932-*x* may be transmitted via the antennas 1934-*a* through 1934-*x*, respectively.

At the UE 115-*j*, the antennas 1952-*a* through 1952-*n* may receive the DL signals from the network access device 105-*g* and may provide the received signals to the modulator/demodulators 1954-*a* through 1954-*n*, respectively. Each modulator/demodulator 1954 may condition (e.g., filter, amplify, downconvert, and digitize) a respective received signal to obtain input samples. Each modulator/demodulator 1954 may further process the input samples (e.g., for OFDM, etc.) to obtain received symbols. A MIMO detector 1956 may obtain received symbols from all the modulator/demodulators 1954-*a* through 1954-*n*, perform MIMO detection on the received symbols, if applicable, and provide detected symbols. A receive processor 1958 may process (e.g., demodulate, deinterleave, and decode) the detected symbols, providing decoded data for the UE 115-*j* to a data output, and provide decoded control information to a processor 1980, or memory 1982.

The processor 1980 may in some cases execute stored instructions to instantiate a UE wireless communication manager 1020-*d*. In some examples, the UE wireless communication manager 1020-*d* may include components of, or may be used to perform functions of the UE wireless communication managers 1020 described with reference to FIG. 1, 10, 11, or 16.

On the uplink (UL), at the UE 115-*j*, a transmit processor 1964 may receive and process data from a data source. The transmit processor 1964 may also generate reference symbols for a reference signal. The symbols from the transmit processor 1964 may be precoded by a transmit MIMO processor 1966 if applicable, further processed by the modulator/demodulators 1954-*a* through 1954-*n* (e.g., for SC-FDMA, etc.), and be transmitted to the network access device 105-*g* in accordance with the transmission parameters received from the network access device 105-*g*. At the network access device 105-*g*, the UL signals from the UE 115-*j* may be received by the antennas 1934, processed by the modulator/demodulators 1932, detected by a MIMO detector 1936 if applicable, and further processed by a receive processor 1938. The receive processor 1938 may provide decoded data to a data output and to the processor 1940 and/or memory 1942. In some examples the processor 1940 may execute stored instructions to instantiate a transmit/receive communication manager 1220-*d*. The transmit/receive communication manager 1220-*d* may include components of, or may be used to perform functions of the transmit/receive communication managers 1220 described with reference to FIG. 1, 12, 13, or 17. In some examples the processor 1940 may execute stored instructions to instantiate an access node communication manager 1420-*d*. The access node communication manager 1420-*d* may include components of, or may be used to perform functions of the access node communication managers 1420 described with reference to FIG. 1, 14, 15, or 18.

The components of the UE 115-*j* may, individually or collectively, be implemented with one or more ASICs adapted to perform some or all of the applicable functions in hardware. Each of the noted modules may be a means for performing one or more functions related to operation of the MIMO communication system 1900. Similarly, the components of the network access device 105-*g* may, individually or collectively, be implemented with one or more ASICs adapted to perform some or all of the applicable functions in hardware. Each of the noted components may be a means for performing one or more functions related to operation of the MIMO communication system 1900.

Figure 20:
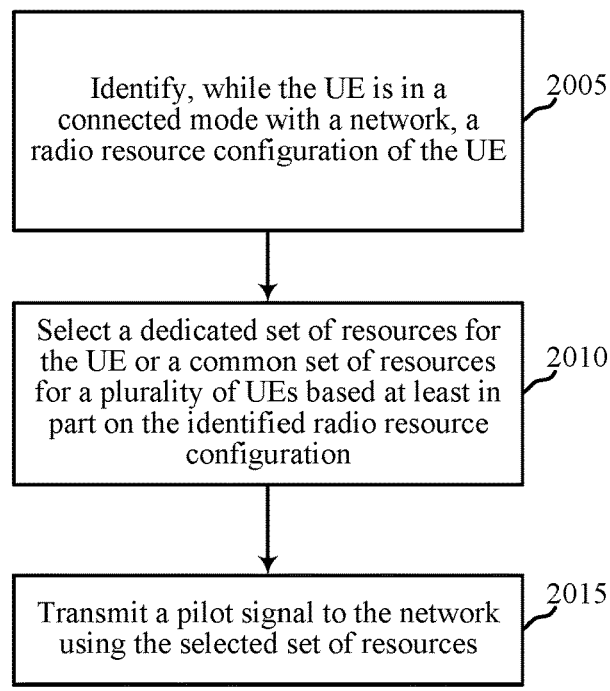
FIGS. 20 and 21 show flow charts illustrating examples of methods that support uplink-based mobility at a UE, in accordance with various aspects of the present disclosure.

FIG. 20 shows a flow chart illustrating an example of a method 2000 that supports uplink-based mobility at a UE 115, in accordance with various aspects of the present disclosure. For clarity, the method 2000 is described below with reference to aspects of one or more of the UEs 115 described with reference to FIG. 1 through 9, 16, or 19, or the apparatus 1015 described with reference to FIGS. 10, or the UE wireless communication managers 1020 described with reference to FIG. 1, 10, 11, 16, or 19. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include identifying, while the UE is in a connected mode with a network, a radio resource configuration of the UE. Operations at block 2005 may be performed using a UE wireless communication manager 1020 described with reference to FIG. 1, 10, 11, 16, or 19, or a radio resource configuration identifier 1035 described with reference to FIG. 10 or 11.

At block 2010, the method 2000 may include selecting a dedicated set of resources for the UE or a common set of resources for a plurality of UEs based at least in part on the identified radio resource configuration. In some examples, the dedicated set of resources may be associated with a more granular periodicity than the common set of resources. Operations at block 2010 may be performed using a UE wireless communication manager 1020 described with reference to FIG. 1, 10, 11, 16, or 19, or a resource selector 1040 described with reference to FIG. 10 or 11.

At block 2015, the method 2000 may include transmitting a pilot signal to the network using the selected set of resources. In some examples, the pilot signal may be transmitted periodically based at least in part on a DTX or DRX configuration of the UE. Operations at block 2015 may be performed using a UE wireless communication manager 1020 described with reference to FIG. 1, 10, 11, 16, or 19, or a pilot signal transmission manager 1045 described with reference to FIG. 10 or 11.

Thus, the method 2000 may provide for wireless communication. It should be noted that the method 2000 is just one implementation and that the operations of the method 2000 may be rearranged or otherwise modified such that other implementations are possible.

Figure 21:
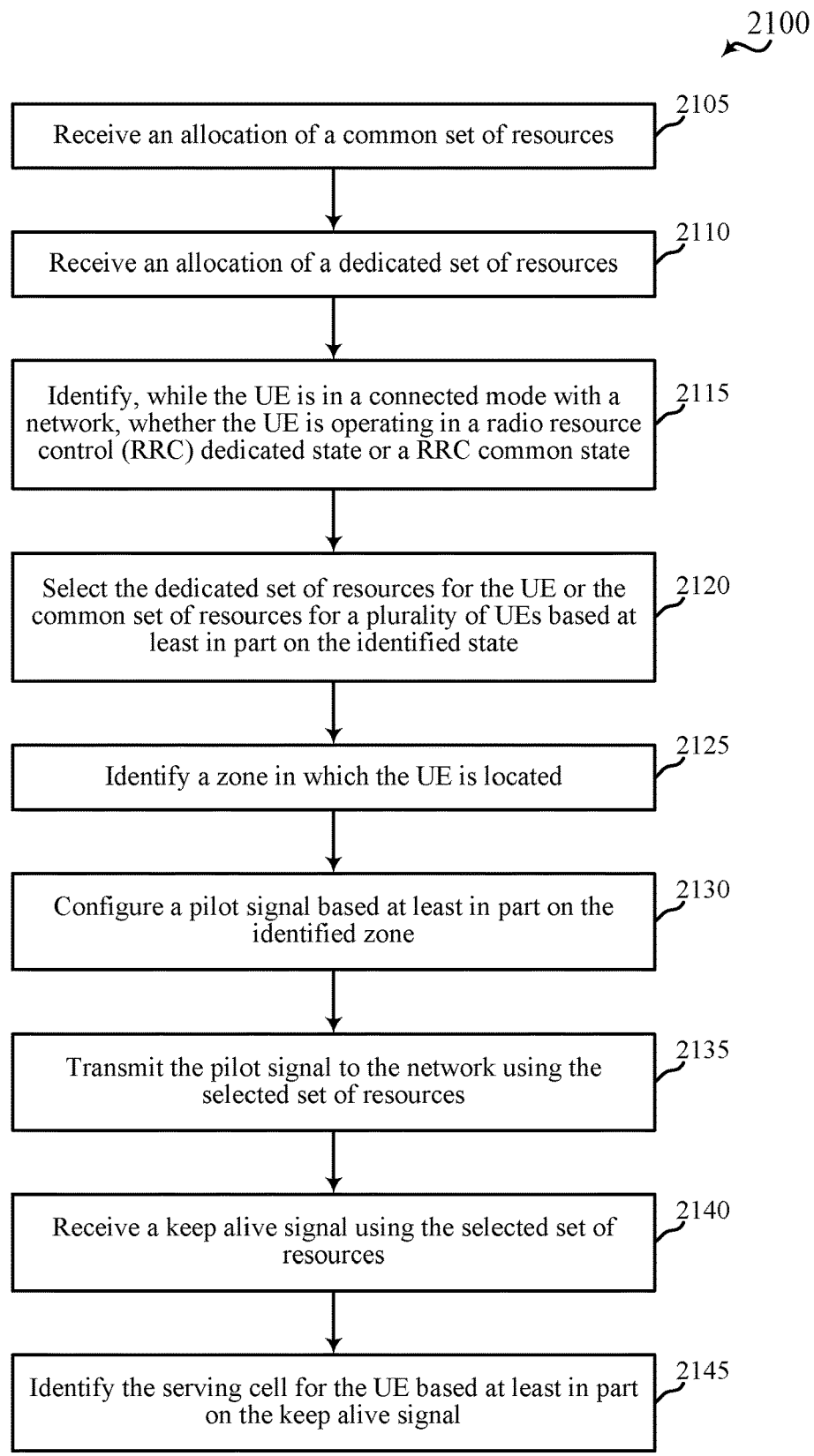

FIG. 21 shows a flow chart illustrating an example of a method 2100 that supports uplink-based mobility at a UE 115, in accordance with various aspects of the present disclosure. For clarity, the method 2100 is described below with reference to aspects of one or more of the UEs 115 described with reference to FIG. 1 through 9, 16, or 19, or the apparatus 1015 described with reference to FIG. 10, or a UE wireless communication manager 1020 described with reference to FIG. 1, 10, 11, 16, or 19. In some examples, a UE may execute one or more sets of codes to control the functional elements of the UE to perform the functions described below. Additionally or alternatively, the UE may perform one or more of the functions described below using special-purpose hardware.

At block 2105, the method 2100 may optionally include receiving an allocation of a common set of resources. In some examples, the allocation of the common set of resources may be received in at least one of a synchronization signal, system information (e.g., a SIB), a unicast message (e.g., on-demand system information by way of a MAC control element, an RRC message, a PHY message, a PDCCH command, etc.), or a combination thereof. In some examples, the allocation of the common set of resources may be identified based at least in part on a type of the UE. Operations at block 2105 may be performed using a UE wireless communication manager 1020 described with reference to FIG. 1, 10, 11, 16, or 19, or a common resource manager 1105 described with reference to FIG. 11.

At block 2110, the method 2100 may optionally include receiving an allocation of a dedicated set of resources in at least one of a unicast message, a timing of a unicast message, or a combination thereof. Operations at block 2110 may be performed using a UE wireless communication manager 1020 described with reference to FIG. 1, 10, 11, 16, or 19, or a dedicated resource manager 1110 described with reference to FIG. 11.

At block 2115, the method 2100 may include identifying, while the UE is in a connected mode with a network, a radio resource configuration of the UE. Operations at block 2115 may be performed using a UE wireless communication manager 1020 described with reference to FIG. 1, 10, 11, 16, or 19, or a radio resource configuration identifier 1035 described with reference to FIG. 10 or 11.

At block 2120, the method 2100 may include selecting the dedicated set of resources for the UE or the common set of resources for a plurality of UEs based at least in part on the identified radio resource configuration. In some examples, the dedicated set of resources may be associated with a more granular periodicity than the common set of resources. Operations at block 2120 may be performed using a UE wireless communication manager 1020 described with reference to FIG. 1, 10, 11, 16, or 19, or a resource selector 1040 described with reference to FIG. 10 or 11.

At block 2125, the method 2100 may optionally include identifying a zone in which the UE is located. Operations at block 2125 may be performed using a UE wireless communication manager 1020 described with reference to FIG. 1, 10, 11, 16, or 19, or a zone identifier 1115 described with reference to FIG. 11.

At block 2130, the method 2100 may optionally include configuring a pilot signal based at least in part on the identified zone. Operations at block 2130 may be performed using a UE wireless communication manager 1020 described with reference to FIG. 1, 10, 11, 16, or 19, a pilot signal transmission manager 1045 described with reference to FIG. 10 or 11, or a pilot signal configurator 1120 described with reference to FIG. 11.

At block 2135, the method 2100 may include transmitting the pilot signal to the network using the selected set of resources. In some examples, the pilot signal may be transmitted periodically based at least in part on a DTX or DRX configuration of the UE. Operations at block 2135 may be performed using a UE wireless communication manager 1020 described with reference to FIG. 1, 10, 11, 16, or 19, or a pilot signal transmission manager 1045 described with reference to FIG. 10 or 11.

At block 2140, the method 2100 may optionally include receiving a keep alive signal using the selected set of resources. The keep alive signal may be received from a serving cell for the UE and may be based at least in part on the pilot signal (e.g., a network access device may identify itself or another network access device as the serving cell for the UE based at least in part on one or more measurements of the pilot signal). Operations at block 2140 may be performed using a UE wireless communication manager 1020 described with reference to FIG. 1, 10, 11, 16, or 19, or a keep alive signal processor 1125 described with reference to FIG. 11.

At block 2145, the method 2100 may optionally include identifying the serving cell for the UE based at least in part on the keep alive signal. Operations at block 2145 may be performed using a UE wireless communication manager 1020 described with reference to FIG. 1, 10, 11, 16, or 19, or a serving cell identifier 1130 described with reference to FIG. 11.

Thus, the method 2100 may provide for wireless communication. It should be noted that the method 2100 is just one implementation and that the operations of the method 2100 may be rearranged or otherwise modified such that other implementations are possible. In some examples, aspects of the methods 2000 and 2100 described with reference to FIGS. 20 and 21 may be combined.

Figure 22:
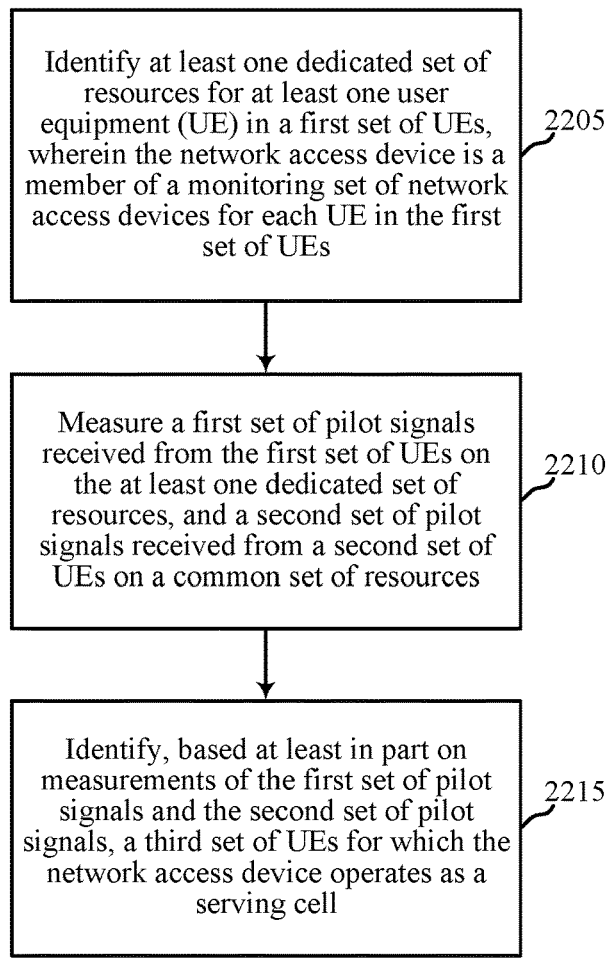
FIGS. 22-26 show flow charts illustrating examples of methods that support uplink-based mobility at a network access device, in accordance with various aspects of the present disclosure.

FIG. 22 shows a flow chart illustrating an example of a method 2200 that supports uplink-based mobility at a network access device 105, in accordance with various aspects of the present disclosure. For clarity, the method 2200 is described below with reference to aspects of one or more of the network access devices 105 (e.g., an 105-*a*, a DU 105-*c*, etc.) described with reference to FIG. 1-9, 17, 18, or 19, or the apparatus 1205 described with reference to FIG. 12, or the transmit/receive communication managers 1220 described with reference to FIG. 1, 12, 13, 17, 18, or 19. In some examples, the method 2200 may be performed by a DU. In some examples, a network access device 105 may execute one or more sets of codes to control the functional elements of the network access device 105 to perform the functions described below. Additionally or alternatively, the network access device 105 may perform one or more of the functions described below using special-purpose hardware.

At block 2205, the method 2200 may include identifying at least one dedicated set of resources for at least one UE in a first set of UEs. The network access device may be a member of a monitoring set of network access devices for each UE in the first set of UEs. As UEs move within a network, the network access device may receive updates to the first set of UEs. In some examples, the updates may be received from a CU 105-*b*. Operations at block 2205 may be performed using a transmit/receive communication manager 1220 described with reference to FIG. 1, 12, 13, 17, or 19, or a resource identifier 1235 described with reference to FIG. 12 or 13.

At block 2210, the method 2200 may include measuring a first set of pilot signals received from the first set of UEs on the at least one dedicated set of resources, and a second set of pilot signals received from a second set of UEs using a common set of resources. Operations at block 2210 may be performed using a transmit/receive communication manager 1220 described with reference to FIG. 1, 12, 13, 17, or 19, or a pilot signal measurer 1240 described with reference to FIG. 12 or 13.

At block 2215, the method 2200 may include identifying, based at least in part on measurements of the first set of pilot signals and the second set of pilot signals, a third set of UEs for which the network access device operates as a serving cell. In some examples, the third set of UEs may include at least one UE in the first set of UEs, or at least one UE in the second set of UEs, or a combination thereof. Operations at block 2215 may be performed using a transmit/receive communication manager 1220 described with reference to FIG. 1, 12, 13, 17, or 19, or a serving cell identifier 1245 described with reference to FIG. 12 or 13.

Thus, the method 2200 may provide for wireless communication. It should be noted that the method 2200 is just one implementation and that the operations of the method 2200 may be rearranged or otherwise modified such that other implementations are possible.

Figure 23:
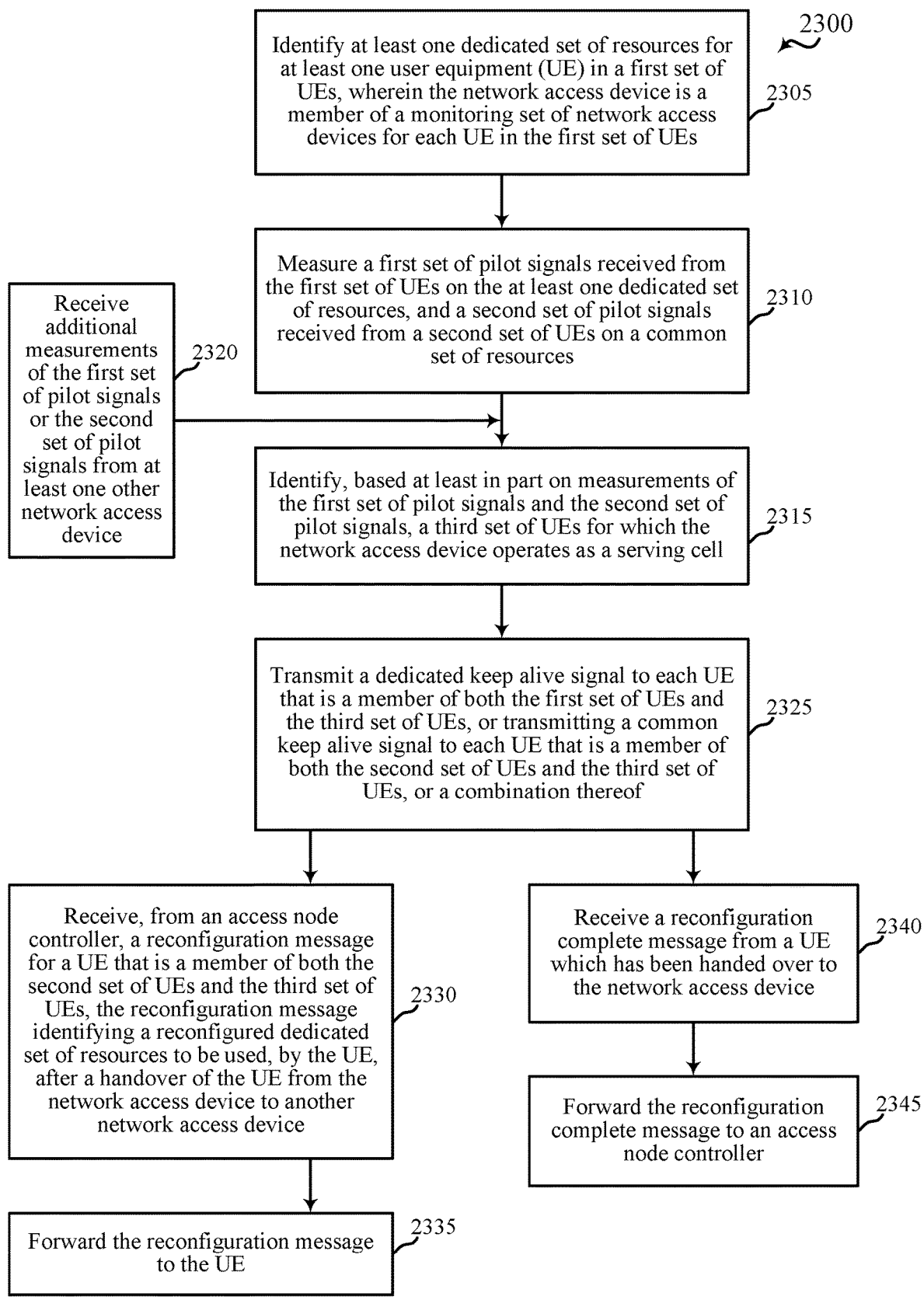

FIG. 23 shows a flow chart illustrating an example of a method 2300 that supports uplink-based mobility at a network access device 105, in accordance with various aspects of the present disclosure. For clarity, the method 2300 is described below with reference to aspects of one or more of the network access devices 105 (e.g., ANs 105-*a*, DUs 105-*c*, etc.) described with reference to FIG. 1-9, 17, 18, or 19, or the apparatus 1205 described with reference to FIG. 12, or the transmit/receive communication manager 1220 described with reference to FIG. 1, 12, 13, 17, or 19. In some examples, the method 2300 may be performed by a DU 105-*c*. In some examples, a network access device 105 may execute one or more sets of codes to control the functional elements of the network access device 105 to perform the functions described below. Additionally or alternatively, the network access device 105 may perform one or more of the functions described below using special-purpose hardware.

At block 2305, the method 2300 may include identifying at least one dedicated set of resources for at least one UE in a first set of UEs. The network access device may be a member of a monitoring set of network access devices for each UE in the first set of UEs. As UEs move within a network, the network access device may receive updates to the first set of UEs. In some examples, the updates may be received from another network access device (e.g., a CU 105-*b*). Operations at block 2305 may be performed using a transmit/receive communication manager 1220 described with reference to FIG. 1, 12, 13, 17, or 19, or a resource identifier 1235 described with reference to FIG. 12 or 13.

At block 2310, the method 2300 may include measuring a first set of pilot signals received from the first set of UEs on the at least one dedicated set of resources, and a second set of pilot signals received from a second set of UEs using a common set of resources. Operations at block 2310 may be performed using a transmit/receive communication manager 1220 described with reference to FIG. 1, 12, 13, 17, or 19, or a pilot signal measurer 1240 described with reference to FIG. 12 or 13.

At block 2315, the method 2300 may include identifying, based at least in part on measurements of the first set of pilot signals and the second set of pilot signals, a third set of UEs for which the network access device operates as a serving cell. In some examples, the third set of UEs may include at least one UE in the first set of UEs, or at least one UE in the second set of UEs, or a combination thereof. Operations at block 2315 may be performed using a transmit/receive communication manager 1220 described with reference to FIG. 1, 12, 13, 17, or 19, or a serving cell identifier 1245 described with reference to FIG. 12 or 13.

At block 2320, the method 2300 may optionally include receiving additional measurements of the first set of pilot signals or the second set of pilot signals from at least one other network access device. When additional measurements are received at block 2320, the third set of UEs may be further identified, at block 2315, based at least in part on the additional measurements received at block 2320. Operations at block 2320 may be performed using a transmit/receive communication manager 1220 described with reference to FIG. 1, 12, 13, 17, or 19, or a serving cell identifier 1245 described with reference to FIG. 12 or 13.

At block 2325, the method 2300 may optionally include transmitting a dedicated keep alive signal to each UE that is a member of both the first set of UEs and the third set of UEs, or transmitting a common keep alive signal to each UE that is a member of both the second set of UEs and the third set of UEs, or a combination thereof. Operations at block 2325 may be performed using a transmit/receive communication manager 1220 described with reference to FIG. 1, 12, 13, 17, or 19, or a keep alive signal manager 1305 described with reference to FIG. 13.

At block 2330, the method 2300 may optionally include receiving, from another network access device (e.g., a CU 105-*b*), a reconfiguration message for a UE that is a member of both the first set of UEs and the third set of UEs. The reconfiguration message may identify a reconfigured dedicated set of resources to be used, by the UE, after a handover of the UE from the network access device to another network access device. Alternatively, at block 2330, the method 2300 may optionally include receiving, from another network access device (e.g., a CU 105-*b*), a reconfiguration message for a UE that is being handed over to the network access device. In this alternative example, the reconfiguration message may identify a reconfigured dedicated set of resources to be used, by the UE, after a handover of the UE to the network access device, and the UE may be added to the first set of UEs and the third set of UEs. At block 2335, the method 2300 may optionally include forwarding the reconfiguration message to the UE. Operations at block 2330 or 2335 may be performed using a transmit/receive communication manager 1220 described with reference to FIG. 1, 12, 13, 17, or 19, or a UE reconfiguration manager 1310 described with reference to FIG. 13.

At block 2340, the method 2300 may optionally include receiving a reconfiguration complete message from a UE which has been handed over to the network access device. At block 2345, the method 2300 may optionally include forwarding the reconfiguration complete message to another network access device (e.g., a CU 105-*b*). Operations at block 2340 or 2345 may be performed using a transmit/receive communication manager 1220 described with reference to FIG. 1, 12, 13, 17, or 19, or a UE reconfiguration manager 1310 described with reference to FIG. 13.

Thus, the method 2300 may provide for wireless communication. It should be noted that the method 2300 is just one implementation and that the operations of the method 2300 may be rearranged or otherwise modified such that other implementations are possible.

Figure 24:
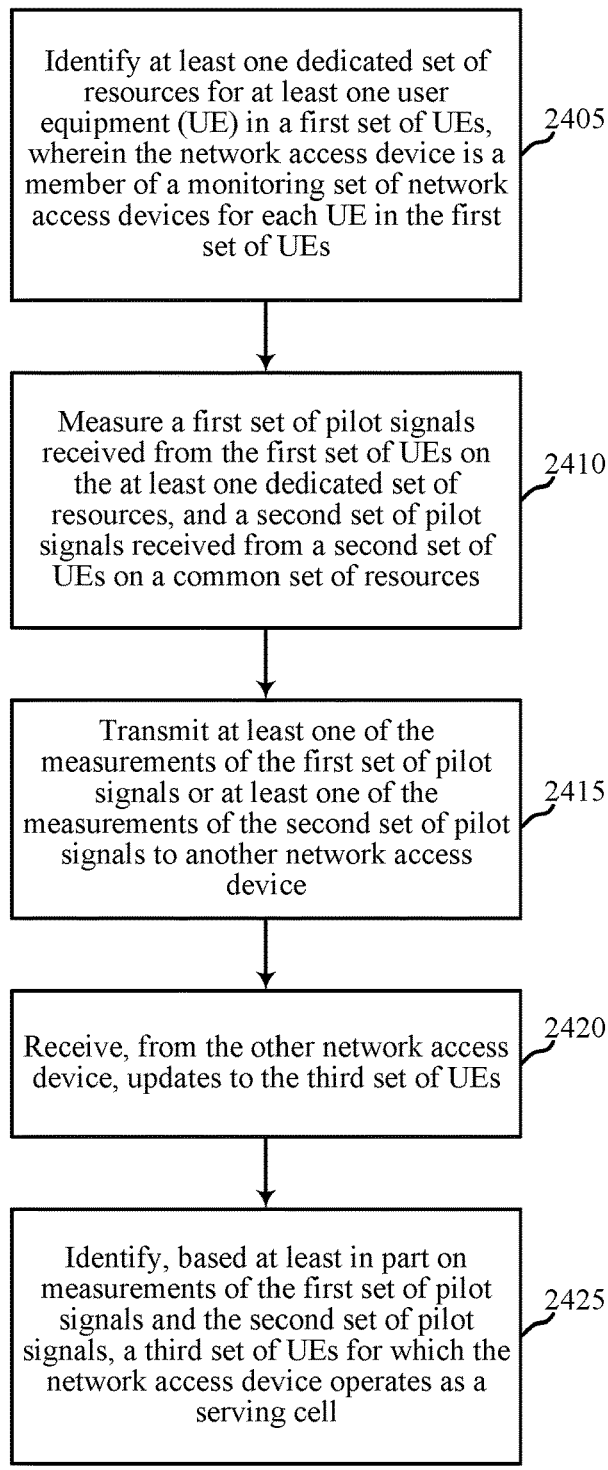

FIG. 24 shows a flow chart illustrating an example of a method 2400 that supports uplink-based mobility at a network access device 105, in accordance with various aspects of the present disclosure. For clarity, the method 2400 is described below with reference to aspects of one or more of the network access devices 105 (e.g., ANs 105-*a*, DUs 105-*c*, etc.) described with reference to FIG. 1-9, 17, 18, or 19, or the apparatus 1205 described with reference to FIG. 12, or the transmit/receive communication manager 1220 described with reference to FIG. 1, 12, 13, 17, or 19. In some examples, the method 2400 may be performed by a DU 105-*c*. In some examples, a network access device 105 may execute one or more sets of codes to control the functional elements of the network access device 105 to perform the functions described below. Additionally or alternatively, the network access device 105 may perform one or more of the functions described below using special-purpose hardware.

At block 2405, the method 2400 may include identifying at least one dedicated set of resources for at least one UE in a first set of UEs. The network access device may be a member of a monitoring set of network access devices for each UE in the first set of UEs. As UEs move within a network, the network access device may receive updates to the first set of UEs. In some examples, the updates may be received from another network access device (e.g., a CU 105-*b*). Operations at block 2405 may be performed using a transmit/receive communication manager 1220 described with reference to FIG. 1, 12, 13, 17, or 19, or resource identifier 1235 described with reference to FIG. 12 or 13.

At block 2410, the method 2400 may include measuring a first set of pilot signals received from the first set of UEs on the at least one dedicated set of resources, and a second set of pilot signals received from a second set of UEs using a common set of resources. Operations at block 2410 may be performed using a transmit/receive communication manager 1220 described with reference to FIG. 1, 12, 13, 17, or 19, or a pilot signal measurer 1240 described with reference to FIG. 12 or 13.

At block 2415, the method 2400 may include transmitting at least one of the measurements of the first set of pilot signals or at least one of the measurements of the second set of pilot signals to another network access device (e.g., a CU 105-*b*). In some examples, the at least one of the measurements of the first set of pilot signals or the at least one of the measurements of the second set of pilot signals may be selected based at least in part on a periodic measurement reporting criteria or an event-driven measurement reporting criteria. Operations at block 2415 may be performed using a transmit/receive communication manager 1220 described with reference to FIG. 1, 12, 13, 17, or 19, or a measurement reporting manager 1315 described with reference to FIG. 13.

At block 2420, the method 2400 may include receiving, from the other network access device (e.g., the CU 105-*b*), updates to the third set of UEs. At block 2425, the method 2400 may include identifying, based at least in part on measurements of the first set of pilot signals and the second set of pilot signals, a third set of UEs for which the network access device operates as a serving cell. In some examples, the third set of UEs may include at least one of: at least one UE in the first set of UEs, at least one UE in the second set of UEs, or a combination thereof. In some examples, the operation(s) at block 2425 may include receiving, from the access node controller, updates to the third set of UEs. Thus, in some examples, part or all of the third set of UEs may be identified remotely, and the operation(s) at block 2425 may include receiving these remote identifications. Operations at block 2425 may be performed using a transmit/receive communication manager 1220 described with reference to FIG. 1, 12, 13, 17, or 19, or a serving cell identifier 1245 described with reference to FIG. 12 or 13.

Thus, the method 2400 may provide for wireless communication. It should be noted that the method 2400 is just one implementation and that the operations of the method 2400 may be rearranged or otherwise modified such that other implementations are possible. In some examples, aspects of the methods 2300 and 2400 described with reference to FIGS. 23 and 24 may be combined.

Figure 25:
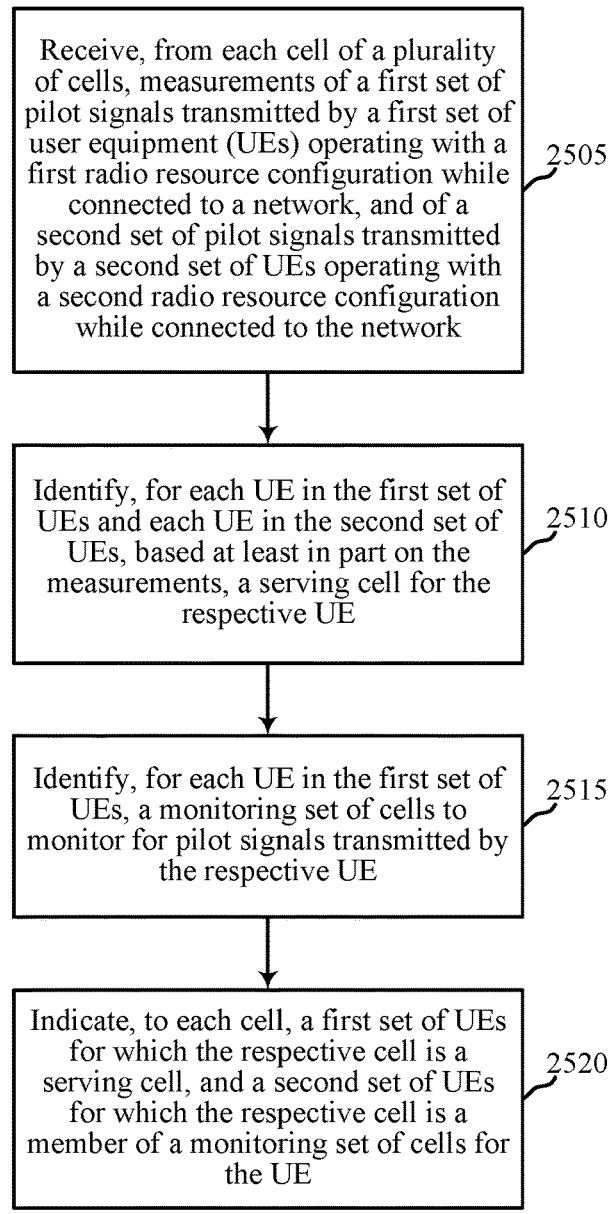

FIG. 25 shows a flow chart illustrating an example of a method 2500 that supports uplink-based mobility at a network access device 105, in accordance with various aspects of the present disclosure. For clarity, the method 2500 is described below with reference to aspects of one or more of the network access devices 105 (e.g., ANs 105-*a*, CUs 105-*b*, etc.) described with reference to FIG. 1-9, 17, 18, or 19, or the apparatus 1405 described with reference to FIG. 14, or the access node communication manager 1420 described with reference to FIG. 1, 14, 15, 18, or 19. In some examples, the method 2500 may be performed by a CU 105-*b*. In some examples, a network access device 105 may execute one or more sets of codes to control the functional elements of the network access device 105 to perform the functions described below. Additionally or alternatively, the network access device 105 may perform one or more of the functions described below using special-purpose hardware.

At block 2505, the method 2500 may include receiving measurements from each cell of a plurality of cells. The measurements may include measurements of a first set of pilot signals transmitted by a first set of UEs operating with a first radio resource configuration while connected to a network, and measurements of a second set of pilot signals transmitted by a second set of UEs operating with a second radio resource configuration while connected to the network. Operations at block 2505 may be performed using an access node communication manager 1420 described with reference to FIG. 1, 14, 15, 18, or 19, or a measurement manager 1435 described with reference to FIG. 14 or 15.

At block 2510, the method 2500 may include identifying, for each UE in the first set of UEs and each UE in the second set of UEs, based at least in part on the measurements, a serving cell for the respective UE. Operations at block 2510 may be performed using an access node communication manager 1420 described with reference to FIG. 1, 14, 15, 18, or 19, or a serving cell identifier 1440 described with reference to FIG. 14 or 15.

At block 2515, the method 2500 may include identifying, for each UE in the first set of UEs, a monitoring set of cells to monitor for pilot signals transmitted by the respective UE. In some examples, a monitoring set of cells to monitor for pilot signals transmitted by a UE may be identified based at least in part on measurements of at least one pilot signal transmitted by the UE, or a location of the identified serving cell for the UE, or a combination thereof. Operations at block 2515 may be performed using an access node communication manager 1420 described with reference to FIG. 1, 14, 15, 18, or 19, or a monitoring set identifier 1445 described with reference to FIG. 14 or 15.

At block 2520, the method 2500 may include indicating, to each cell, a first set of UEs for which the respective cell is a serving cell, and a second set of UEs for which the respective cell is a member of a monitoring set of cells for the UE. Operations at block 2520 may be performed using an access node communication manager 1420 described with reference to FIG. 1, 14, 15, 18, or 19, or a cell membership manager 1450 described with reference to FIG. 14 or 15.

Thus, the method 2500 may provide for wireless communication. It should be noted that the method 2500 is just one implementation and that the operations of the method 2500 may be rearranged or otherwise modified such that other implementations are possible.

Figure 26:
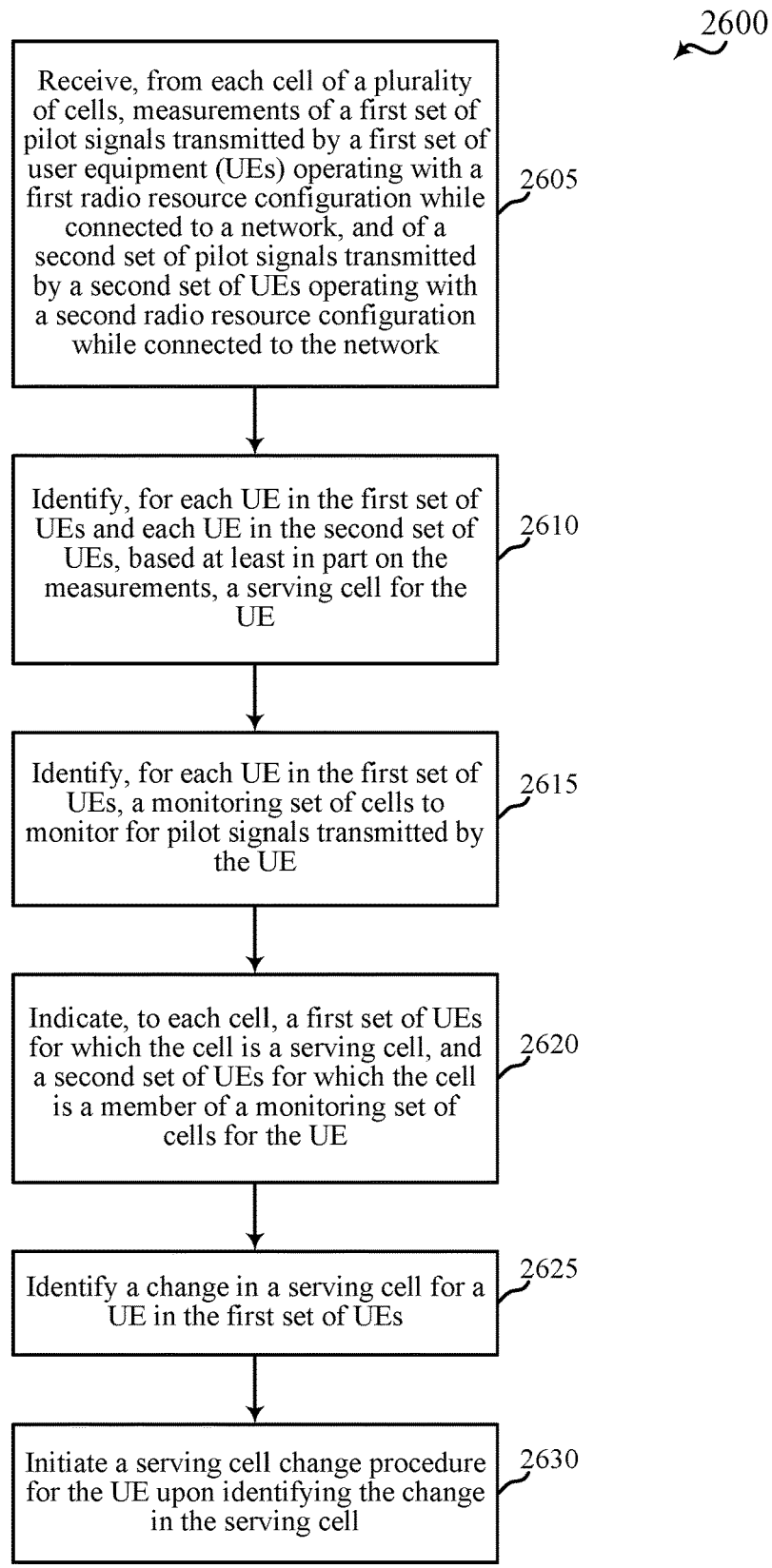

FIG. 26 shows a flow chart illustrating an example of a method 2600 that supports uplink-based mobility at a network access device 105, in accordance with various aspects of the present disclosure. For clarity, the method 2600 is described below with reference to aspects of one or more of the network access devices 105 (e.g., ANs 105-*a*, CUs 105-*b*, etc.) described with reference to FIG. 1-9, 17, 18, or 19, or the apparatus 1405 described with reference to FIG. 14, or the access node communication managers 1420 described with reference to FIG. 1, 14, 15, 18, or 19. In some examples, the method 2600 may be performed by a CU 105-*b*. In some examples, a network access device 105 may execute one or more sets of codes to control the functional elements of the network access device 105 to perform the functions described below. Additionally or alternatively, the network access device 105 may perform one or more of the functions described below using special-purpose hardware.

At block 2605, the method 2600 may include receiving measurements from each cell of a plurality of cells. The measurements may include measurements of a first set of pilot signals transmitted by a first set of UEs operating with a first radio resource configuration while connected to a network, and measurements of a second set of pilot signals transmitted by a second set of UEs operating with a second radio resource configuration while connected to the network. Operations at block 2605 may be performed using an access node communication manager 1420 described with reference to FIG. 1, 14, 15, 18, or 19, or a measurement manager 1435 described with reference to FIG. 14 or 15.

At block 2610, the method 2600 may include identifying, for each UE in the first set of UEs and each UE in the second set of UEs, based at least in part on the measurements, a serving cell for the respective UE. Operations at block 2610 may be performed using an access node communication manager 1420 described with reference to FIG. 1, 14, 15, 18, or 19, or a serving cell identifier 1440 described with reference to FIG. 14 or 15.

At block 2615, the method 2600 may include identifying, for each UE in the first set of UEs, a monitoring set of cells to monitor for pilot signals transmitted by the respective UE. In some examples, a monitoring set of cells to monitor for pilot signals transmitted by a UE may be identified based at least in part on measurements of at least one pilot signal transmitted by the UE, or a location of the identified serving cell for the UE, or a combination thereof. Operations at block 2615 may be performed using an access node communication manager 1420 described with reference to FIG. 1, 14, 15, 18, or 19, or a monitoring set identifier 1445 described with reference to FIG. 14 or 15.

At block 2620, the method 2600 may include indicating, to each cell, a first set of UEs for which the respective cell is a serving cell, and a second set of UEs for which the respective cell is a member of a monitoring set of cells for the UE. Operations at block 2620 may be performed using an access node communication manager 1420 described with reference to FIG. 1, 14, 15, 18, or 19, or a cell membership manager 1450 described with reference to FIG. 14 or 15.

At block 2625, the method 2600 may include identifying a change in a serving cell for a UE in the first set of UEs. At block 2630, the method 2600 may include initiating a serving cell change procedure for the UE upon identifying the change in the serving cell. In some examples, initiating the serving cell change procedure may include transmitting to the UE, through a source serving cell for the UE, a reconfiguration message for the UE. In some examples, initiating the serving cell change procedure may include transmitting to the UE, through a target serving cell for the UE, a reconfiguration message for the UE. The RRC reconfiguration message may identify a dedicated set of resources to be used, by the UE, after a handover of the UE to a target serving cell. Operations at block 2625 or 2630 may be performed using an access node communication manager 1420 described with reference to FIG. 1, 14, 15, 18, or 19, a serving cell identifier 1440 described with reference to FIG. 14 or 15, or a serving cell change manager 1505 described with reference to FIG. 15.

Thus, the method 2600 may provide for wireless communication. It should be noted that the method 2600 is just one implementation and that the operations of the method 2600 may be rearranged or otherwise modified such that other implementations are possible. In some examples, aspects of the methods 2500 and 2600 described with reference to FIGS. 25 and 26 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a network access device, comprising:
   identifying at least one dedicated set of resources for at least one user equipment (UE) in a first set of UEs, wherein the network access device is a member of a monitoring set of network access devices for each UE in the first set of UEs;
   measuring a first set of pilot signals received from the first set of UEs on the at least one dedicated set of resources, and a second set of pilot signals received from a second set of UEs using a common set of resources; and
   identifying, based at least in part on measurements of the first set of pilot signals and the second set of pilot signals, a third set of UEs for which the network access device operates as a serving cell.

2. The method of claim 1, wherein the third set of UEs comprises at least one UE in the first set of UEs, or at least one UE in the second set of UEs, or a combination thereof.

3. The method of claim 2, further comprising:
transmitting a dedicated keep alive signal to each UE that is a member of both the first set of UEs and the third set of UEs, or transmitting a common keep alive signal to each UE that is a member of both the second set of UEs and the third set of UEs, or a combination thereof.

4. The method of claim 1, further comprising:
determining whether a pilot signal received from a UE on the common set of resources satisfies at least one threshold; and
transmitting a keep alive signal to the UE, using the common set of resources, upon determining the pilot signal satisfies the at least one threshold.

5. The method of claim 1, further comprising:
receiving, from another network access device, a reconfiguration message for a UE that is a member of both the first set of UEs and the third set of UEs, the reconfiguration message identifying a reconfigured dedicated set of resources to be used, by the UE, after a handover of the UE from the network access device to a different network access device; and
forwarding the reconfiguration message to the UE.

6. The method of claim 1, further comprising:
receiving, from another network access device, a reconfiguration message for a UE that is being handed over to the network access device, the reconfiguration message identifying a reconfigured dedicated set of resources to be used, by the UE, after a handover of the UE to the network access device;
forwarding the reconfiguration message to the UE; and
adding the UE to the first set of UEs and the third set of UEs.

7. The method of claim 1, further comprising:
receiving a reconfiguration complete message from a UE which has been handed over to the network access device; and
forwarding the reconfiguration complete message to another network access device.

8. The method of claim 1, further comprising:
transmitting at least one of the measurements of the first set of pilot signals or at least one of the measurements of the second set of pilot signals to another network access device; and
receiving, from the other network access device, updates to the third set of UEs.

9. The method of claim 8, further comprising:
selecting the at least one of the measurements of the first set of pilot signals or the at least one of the measurements of the second set of pilot signals based at least in part on a periodic measurement reporting criteria or an event-driven measurement reporting criteria.

10. The method of claim 1, further comprising:
receiving additional measurements of the first set of pilot signals or the second set of pilot signals from at least one other network access device, wherein the identifying the third set of UEs is based at least in part on the additional measurements.

11. The method of claim 1, further comprising:
receiving, from another network access device, an update to the first set of UEs.

12. The method of claim 1, wherein the network access device comprises a distributed unit.

13. An apparatus for wireless communication at a network access device, comprising:

a processor; and
memory in electronic communication with the processor;
wherein the processor and the memory are configured to:
identify at least one dedicated set of resources for at least one user equipment (UE) in a first set of UEs, wherein the network access device is a member of a monitoring set of network access devices for each UE in the first set of UEs;
measure a first set of pilot signals received from the first set of UEs on the at least one dedicated set of resources, and a second set of pilot signals received from a second set of UEs using a common set of resources; and
identify, based at least in part on measurements of the first set of pilot signals and the second set of pilot signals, a third set of UEs for which the network access device operates as a serving cell.

14. The apparatus of claim 13, wherein the third set of UEs comprises at least one UE in the first set of UEs, or at least one UE in the second set of UEs, or a combination thereof.

15. The apparatus of claim 14, wherein the processor and memory are configured to:
transmit a dedicated keep alive signal to each UE that is a member of both the first set of UEs and the third set of UEs, or transmit a common keep alive signal to each UE that is a member of both the second set of UEs and the third set of UEs, or a combination thereof.

16. The apparatus of claim 13, wherein the processor and memory are configured to:
determine whether a pilot signal received from a UE on the common set of resources satisfies at least one threshold; and
transmit a keep alive signal to the UE, using the common set of resources, upon determining the pilot signal satisfies the at least one threshold.

17. The apparatus of claim 13, wherein the processor and memory are configured to:
receive, from another network access device, a reconfiguration message for a UE that is a member of both the first set of UEs and the third set of UEs, the reconfiguration message identifying a reconfigured dedicated set of resources to be used, by the UE, after a handover of the UE from the network access device to a different network access device; and
forward the reconfiguration message to the UE.

18. The apparatus of claim 13, wherein the processor and memory are configured to:
receive, from another network access device, a reconfiguration message for a UE that is being handed over to the network access device, the reconfiguration message identifying a reconfigured dedicated set of resources to be used, by the UE, after a handover of the UE to the network access device;
forward the reconfiguration message to the UE; and
add the UE to the first set of UEs and the third set of UEs.

19. The apparatus of claim 13, wherein the processor and memory are configured to:
receive a reconfiguration complete message from a UE which has been handed over to the network access device; and
forward the reconfiguration complete message to another network access device.

20. The apparatus of claim 13, wherein the processor and memory are configured to:

transmit at least one of the measurements of the first set of pilot signals or at least one of the measurements of the second set of pilot signals to another network access device; and receive, from the other network access device, updates to the third set of UEs.

21. The apparatus of claim 20, wherein the processor and memory are configured to:

select the at least one of the measurements of the first set of pilot signals or the at least one of the measurements of the second set of pilot signals based at least in part on a periodic measurement reporting criteria or an event-driven measurement reporting criteria.

22. The apparatus of claim 13, wherein the processor and memory are configured to:

receive additional measurements of the first set of pilot signals or the second set of pilot signals from at least one other network access device, and wherein the processor and memory are configured to identify the third set of UEs is based at least in part on the additional measurements.

23. The apparatus of claim 13, wherein the processor and memory are configured to:

receive, from another network access device, an update to the first set of UEs.

24. The apparatus of claim 13, wherein the network access device comprises a distributed unit.

25. An apparatus for wireless communication at a network access device, comprising:

means for identifying at least one dedicated set of resources for at least one user equipment (UE) in a first set of UEs, wherein the network access device is a member of a monitoring set of network access devices for each UE in the first set of UEs;

means for measuring a first set of pilot signals received from the first set of UEs on the at least one dedicated set of resources, and a second set of pilot signals received from a second set of UEs using a common set of resources; and means for identifying, based at least in part on measurements of the first set of pilot signals and the second set of pilot signals, a third set of UEs for which the network access device operates as a serving cell.

26. The apparatus of claim 25, wherein the third set of UEs comprises at least one UE in the first set of UEs, or at least one UE in the second set of UEs, or a combination thereof.

27. The apparatus of claim 26, further comprising:

means for transmitting a dedicated keep alive signal to each UE that is a member of both the first set of UEs and the third set of UEs, or transmitting a common keep alive signal to each UE that is a member of both the second set of UEs and the third set of UEs, or a combination thereof.

28. The apparatus of claim 25, further comprising:

means for determining whether a pilot signal received from a UE on the common set of resources satisfies at least one threshold; and means for transmitting a keep alive signal to the UE, using the common set of resources, upon determining the pilot signal satisfies the at least one threshold.

29. The apparatus of claim 25, further comprising:

means for receiving, from another network access device, a reconfiguration message for a UE that is a member of both the first set of UEs and the third set of UEs, the reconfiguration message identifying a reconfigured dedicated set of resources to be used, by the UE, after a handover of the UE from the network access device to a different network access device; and means for forwarding the reconfiguration message to the UE.

30. A non-transitory computer-readable medium storing computer-executable code for wireless communication at a network access device, the code executable by a processor to:

identify at least one dedicated set of resources for at least one user equipment (UE) in a first set of UEs, wherein the network access device is a member of a monitoring set of network access devices for each UE in the first set of UEs;

measure a first set of pilot signals received from the first set of UEs on the at least one dedicated set of resources, and a second set of pilot signals received from a second set of UEs using a common set of resources; and identify, based at least in part on measurements of the first set of pilot signals and the second set of pilot signals, a third set of UEs for which the network access device operates as a serving cell.

* * * * *